United States Patent
LaManna et al.

[11] Patent Number: 5,837,991
[45] Date of Patent: Nov. 17, 1998

[54] CARD TRANSPORT MECHANISM AND METHOD OF OPERATION

[75] Inventors: Richard J. LaManna, Morristown; Keith R. Ashley, Clark; Igor Pankiw, Linden; Philip M. Roth, Wallington; Edward W. Hague, Hawthorne, all of N.J.

[73] Assignee: Card Technology Corporation, Paramus, N.J.

[21] Appl. No.: 613,095

[22] Filed: Mar. 8, 1996

[51] Int. Cl.⁶ .............................. G06F 17/00; G06F 3/12; G06K 13/00
[52] U.S. Cl. .......................... 235/475; 235/375; 235/432
[58] Field of Search .................................... 235/475, 479, 235/486, 476, 480, 483, 477, 481, 485, 375; 198/369.71, 369.2, 369.1; 400/66, 73, 78

[56] References Cited

U.S. PATENT DOCUMENTS

| | | |
|---|---|---|
| 3,137,981 | 6/1964 | Johnson et al. . |
| 3,533,886 | 10/1970 | Staats et al. . |
| 3,638,563 | 2/1972 | Drillick . |
| 3,648,816 | 3/1972 | Marinoff . |
| 3,757,684 | 9/1973 | Drillick . |
| 3,921,969 | 11/1975 | Hickey et al. . |
| 4,031,993 | 6/1977 | Gürgens et al. . |
| 4,088,216 | 5/1978 | LaManna et al. . |
| 4,143,981 | 3/1979 | Hansen et al. . |
| 4,211,397 | 7/1980 | Hansen et al. . |
| 4,519,600 | 5/1985 | Warwick et al. . |
| 4,747,706 | 5/1988 | Duea . |
| 4,851,651 | 7/1989 | Gaucher ................................... 235/380 |
| 4,898,268 | 2/1990 | Kamioka et al. . |
| 4,969,760 | 11/1990 | LaManna et al. . |
| 4,980,704 | 12/1990 | Fulton et al. . |
| 5,037,216 | 8/1991 | Nubson et al. . |
| 5,043,562 | 8/1991 | Hautvast et al. ........................ 235/475 |
| 5,067,832 | 11/1991 | Baur et al. . |
| 5,094,336 | 3/1992 | Lundstrom et al. . |
| 5,146,069 | 9/1992 | Orimoto et al. ......................... 235/475 |
| 5,188,468 | 2/1993 | Dykes . |
| 5,235,519 | 8/1993 | Miura . |
| 5,266,781 | 11/1993 | Warwick et al. . |
| 5,332,889 | 7/1994 | Lundstrom et al. . |
| 5,360,969 | 11/1994 | Suzuki ..................................... 235/479 |
| 5,395,259 | 3/1995 | Casses ..................................... 235/475 |
| 5,396,369 | 3/1995 | Deland, Jr. et al. . |
| 5,466,914 | 11/1995 | Kitahara ................................... 235/483 |
| 5,468,079 | 11/1995 | Murakoshi et al. . |
| 5,648,651 | 7/1997 | Inoue ....................................... 235/475 |

FOREIGN PATENT DOCUMENTS 4233687  4/1993  Denmark .

OTHER PUBLICATIONS

Masaomi Furuya, et al., Patent Abstracts of Japan, 02–191943, Jun. 29, 1992, vol. 16, No. 293.

Kozo, Nishijima, Patent Abstracts of Japan, 02–265089, Sep. 7, 1992, vol. 16, No. 424.

Primary Examiner—Donald T. Hajec
Assistant Examiner—Thien Minh Le
Attorney, Agent, or Firm—Antonelli, Terry, Stout & Kraus, LLP

[57] ABSTRACT

The present invention is a card transport mechanism for transporting cards along a transport path and method of operation thereof. A card transport mechanism in accordance with the invention includes a pair of spaced apart channels, each channel engaging a different one of a pair of opposed edges of the cards; a carriage for holding the cards at a fixed position relative to the carriage during motion along the transport path, the carriage having first and second card contacting elements spaced apart at different positions along the transport path and projecting into the transport path for contacting and holding a card in the fixed position during motion along the transport path, the first card contacting element being compliant to move orthogonally from within the transport path to permit movement of the card along the channels while the carriage is stationary prior to contact of the card by the second card contacting element and the second card contacting element being compliant along the transport path in response to contact with the card to produce contact and holding of the opposed edges of the card with the first and second card contacting elements in the fixed position; and a carriage support, connected to the carriage, for guiding the carriage along the transport path.

68 Claims, 32 Drawing Sheets

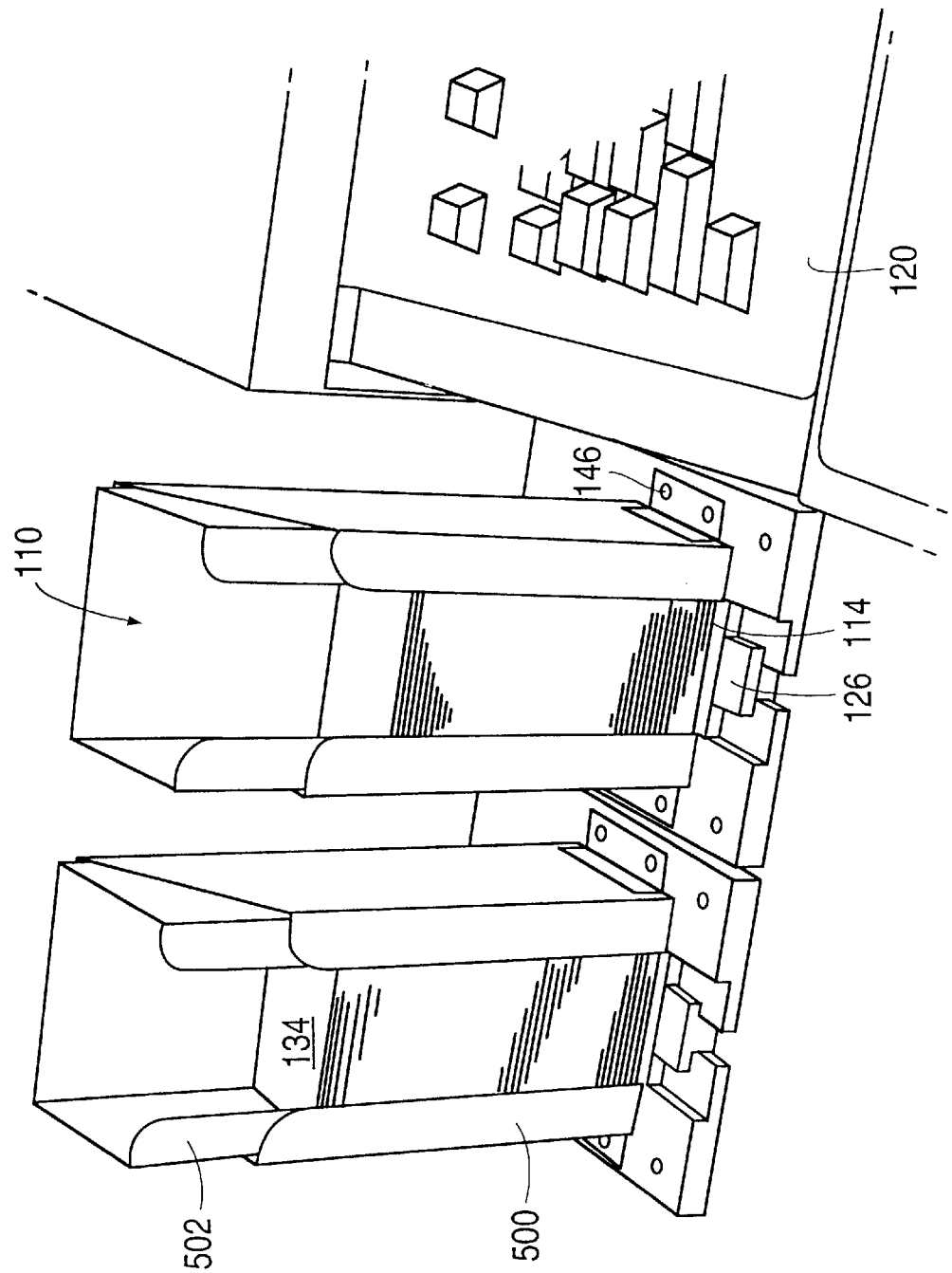

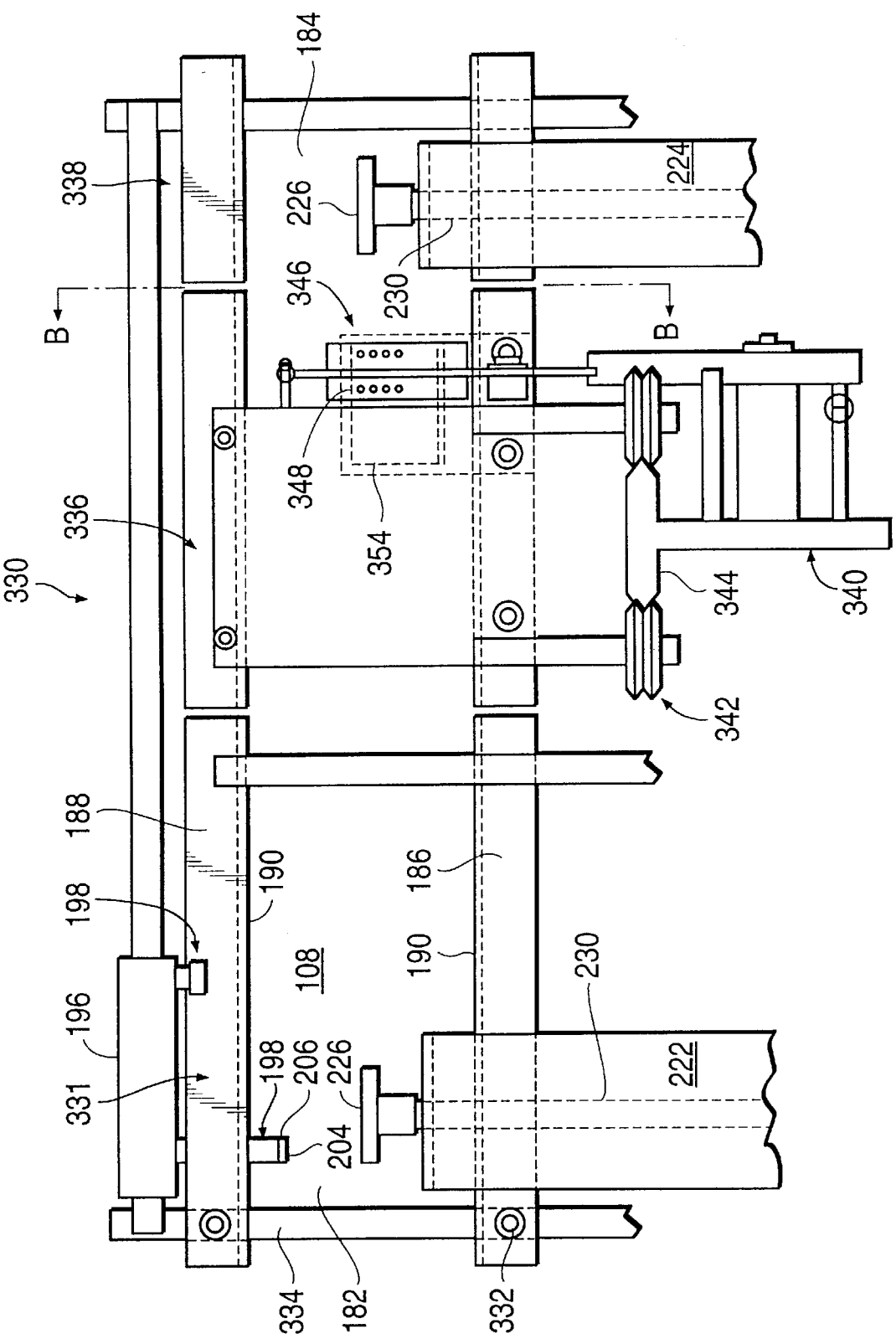

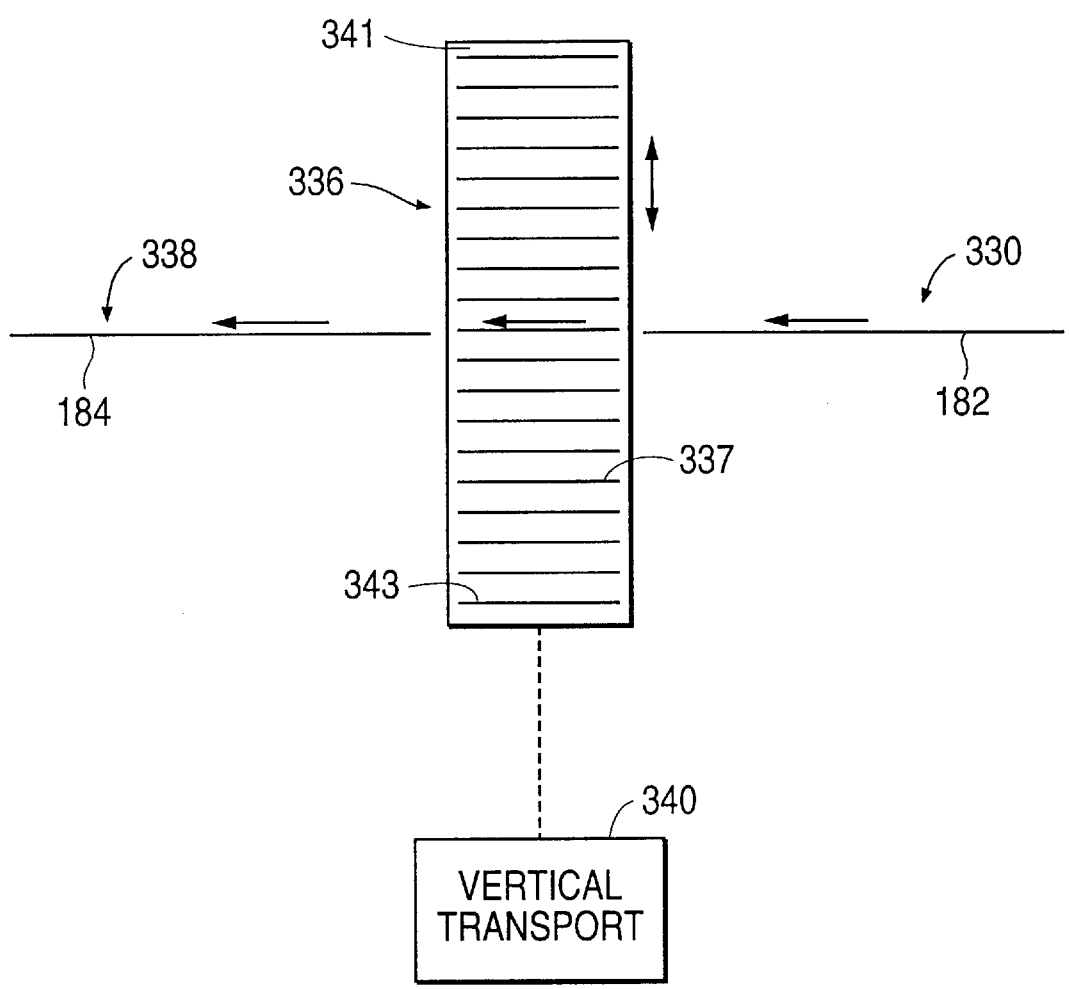

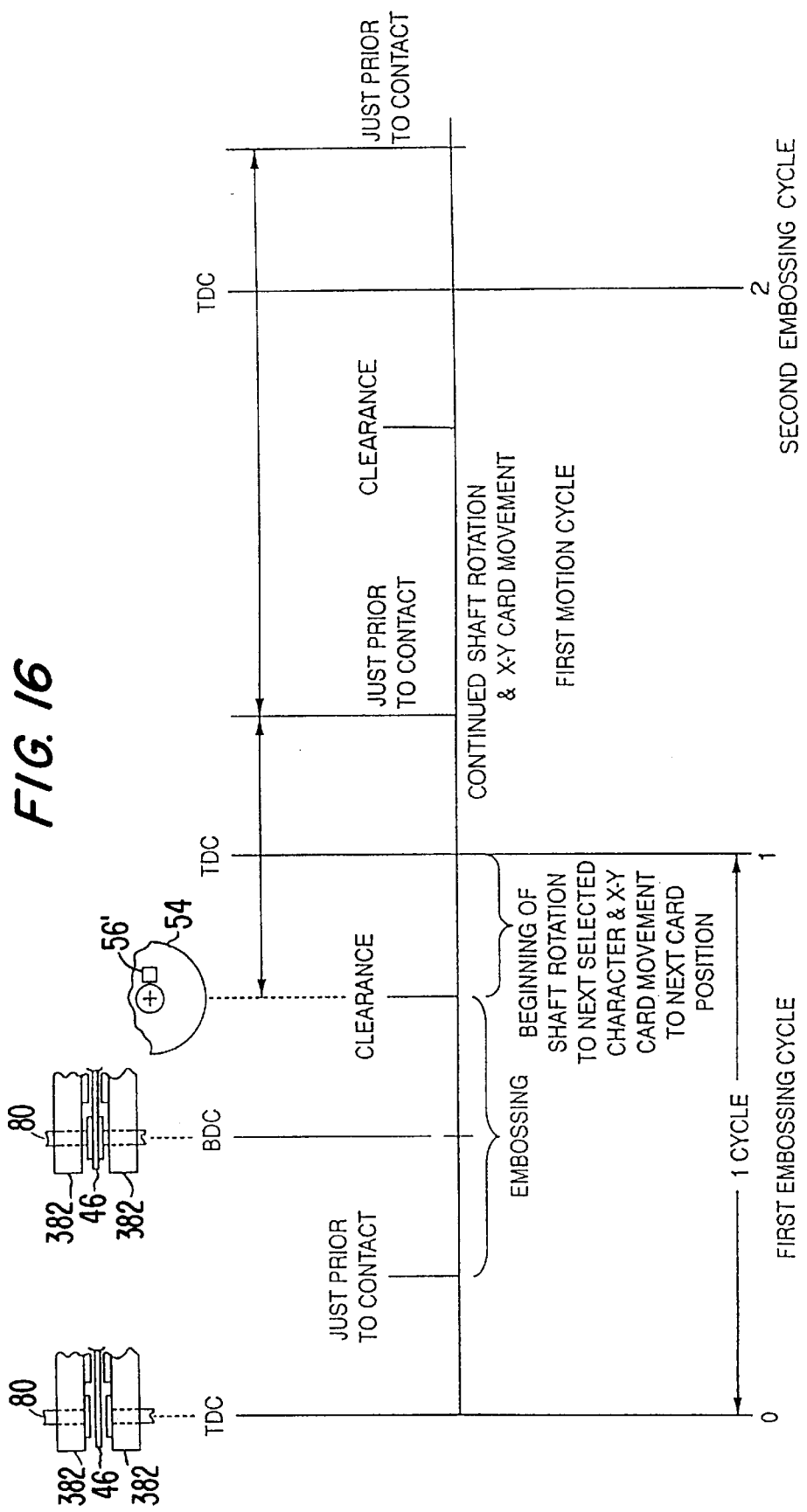

INSERT 6 AFTER 3
3: (050, 140, 520) '7'
4: (150, 140, 550) '4'
5: (170, 140, 550) '4'
6: (190, 140, 550) '4'
7: (180, 140, 560) '3'
INSERT 9 AFTER 7
7: (180, 140, 560) '3'
8: (200, 140, 560) '3'
9: (020, 140, 560) '3'
10: (130, 140, 590) '0'
INSERT 10 AFTER 8
8: (200, 140, 560) '3'
9: (130, 140, 590) '0'
10: (020, 140, 560) '3'
11: (100, 140, 590) '0'
INSERT 11 AFTER 9
9: (130, 140, 590) '0'
10: (100, 140, 590) '0'
11: (020, 140, 560) '3'
12: (090, 140, 590) '0'

FIG. 17E

```
  INSERT 17 AFTER 15
15: (030, 140, 590) 'O'
16: (062, 220, 600) 'A'
17: (140, 140, 590) 'O'
18: (125, 220, 600) 'A'
  INSERT 21 AFTER 19
19: (193, 220, 600) 'A'
20: (076, 220, 624) 'D'
21: (048, 220, 624) 'D'
22: (041, 220, 632) 'E'
  INSERT 26 AFTER 22
22: (041, 220, 632) 'E'
23: (097, 220, 664) 'I'
24: (174, 220, 632) 'E'
25: (160, 220, 648) 'G'
26: (146, 220, 656) 'H'
27: (118, 220, 664) 'I'
  INSERT 32 AFTER 30
30: (020, 220, 696) 'M'
31: (027, 220, 736) 'R'
32: (132, 220, 696) 'M'
33: (069, 220, 736) 'R'
  INSERT 33 AFTER 31
31: (027, 220, 736) 'R'
32: (069, 220, 736) 'R'
33: (132, 220, 696) 'M'
34: (167, 220, 760) 'U'
```

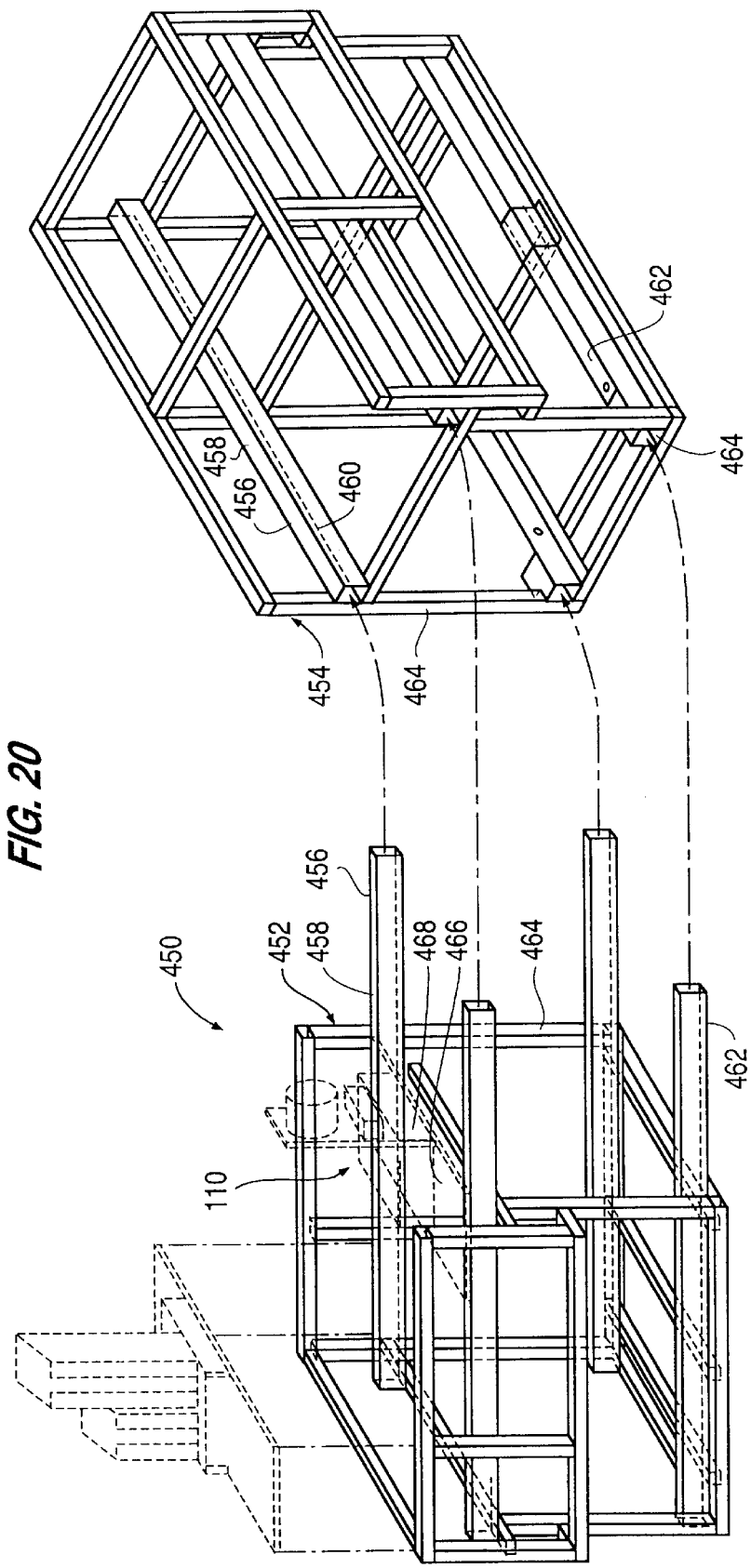

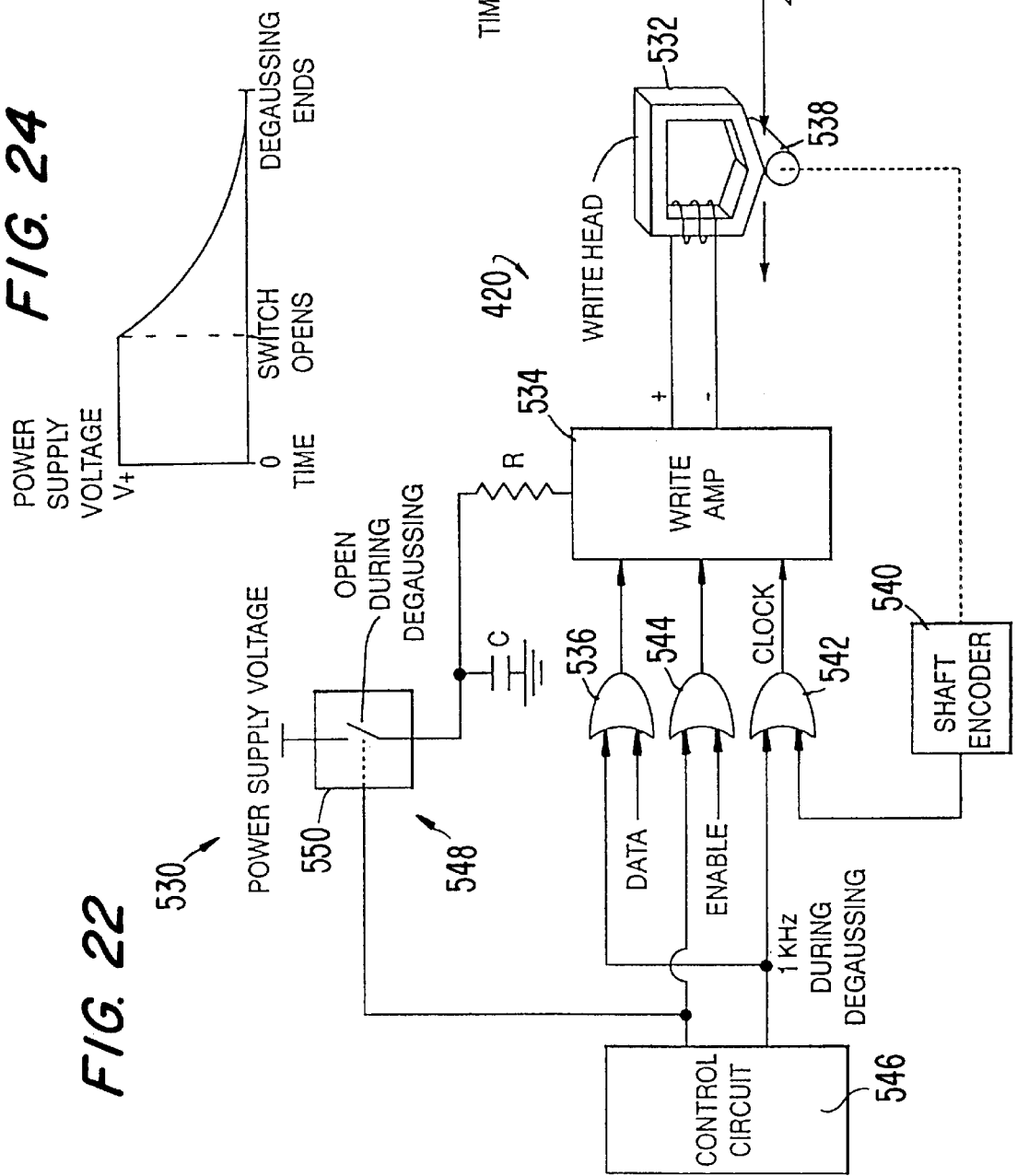
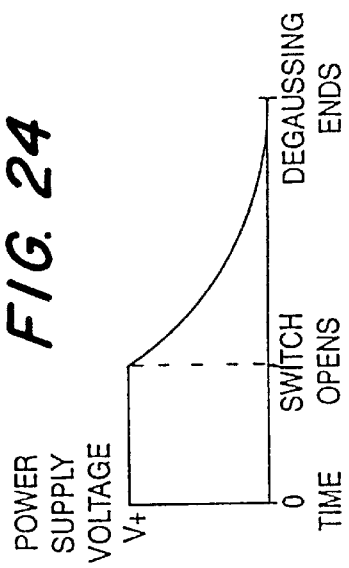
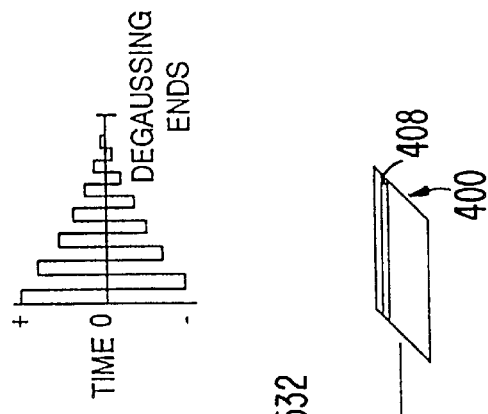
FIG. 22
FIG. 23
FIG. 24

CARD TRANSPORT MECHANISM AND METHOD OF OPERATION

TECHNICAL FIELD

The present invention relates to card processing systems and methods of operation thereof and more particularly to card processing systems and methods of operation thereof for preparing credit cards, identification cards and the like.

BACKGROUND ART

High speed plastic card embossing machines such as the assignee's model 18,000 and Data Card Corporation's model 1500 and 15,000 achieve high speed by use of multiple embossing stations (modules) to emboss different lines of characters on a card. Each embossing station is dedicated to embossing a single line, the position of which is manually preset (vertically in the Y direction) according to the card format being run. The cards are carried in separated rails having a fixed or reference bottom rail and a top compliant rail. The cards are positioned in the X direction between the rails, by pushing them with a protrusion attached to a toothed belt. Friction provided by the compliant top rail prevents the card from coasting when the belt decelerates. In these systems the cards only move in a forward direction along the transport path with the cards being passed serially past the various embossing stations.

Small desk-top embossers such as the assignee's ADVANTAGE™ series, which is described in detail in the assignee's U.S. Pat. No. 4,969,760, embossers previously manufactured by Fima Corporation of Italy and Data Card Corporation's models 280, 310 and 410 use a single embossing station and a carriage that positions the card in both the X and Y directions which allows embossing anywhere on the card. The assignee's and Data Card Corporation's small embossers use a small light weight carriage design which grips the card along one edge to facilitate high speed positioning. Fima Corporation's embossers used a carriage which framed the card with metallic members that is much heavier.

Data Card Corporation's model 9,000 is an immediate speed modular embosser which uses a single embossing station having a carriage which moves along X and Y axes directions as in its desk-top models. The modularity in the model 9,000 applies to the ability of it to add functions such as magnetic encoding, "smart" card encoding, printing, overlay lamination etc. Transporting the card in the modules therein is performed by a variety of card moving devices.

U.S. Pat. No. 5,332,889 discloses an integrated circuit card programming device for programming so called "smart" cards. Smart cards contain an integrated circuit PROM which is programmed through an external contact area on the card face which has electrical circuit connections between segments of the contact area and terminals of the integrated circuit PROM. The programming of smart cards is a time consuming operation which requires many seconds to fully program the PROM in each card. Therefore, in order to achieve production at a reasonably high speed, the programming device of the '889 patent picks cards to be programmed from a card source and places them in a plurality of radially disposed personalization stations at which programming of the memory cells within the PROM is performed over a period of typically several seconds. Thereafter, the cards are outputted through a card output platform. The buffering of the cards in the personalization stations permits throughput to be increased when compared to programming of cards with only a single programming station.

The programming device of the '889 patent is mechanically complicated. The programming device of the '889 patent is described as performing programming of individual cards in a "first-in/first-out" basis. The overall processing speed is dependent upon complicated compound movements which interfere with the high production speeds achieved with in line credit card embossing systems which perform multiple processes on credit cards which are required to complete the manufacturing of personalized credit cards such as bank cards.

U.S. Pat. No. 5,396,369 discloses a degaussing system for magnetic heads used for recording magnetic stripes on credit cards. The '369 patent discloses that degaussing residual magnetism resultant from recording cards having magnetic mediums with high coercivity, which must be cancelled to avoid harmful affects on subsequent recording of cards having magnetic mediums of low coercivity, is performed by (1) the application of a pulse signal of opposite polarity to the polarity of the last recorded data bit or (2) alternatively applying a sweep signal which increases in frequency until the response characteristic of the magnetic head which is being degaussed in exceeded.

U.S. Pat. No. 4,088,216 discloses an automatic embossing systems in which all embossable characters are processed to derive three control numbers for each character which identify the address of the character on (1) rotatable embossing wheels relative to a reference rotary position thereon, (2) the horizontal position of the card at which the character is to be embossed (X address) and (3) the line number of the card (Y address) at which the character is to be embossed. Embossing of the characters takes place with the characters being embossed in the order of the ascending wheel addresses as ordered in each ascending line location. In the first line, the character having the lowest embosser wheel address is embossed first followed by embossing successive characters in ascending wheel address order until the character with the highest wheel address in the first line is finished. Embossing proceeds in the same fashion through the remaining lines in ascending line addresses with the characters of each line being embossed in ascending wheel address on the embosser wheels. This embossing system, while providing improved efficiency by ordering the characters in an embossing order which lessens the time to emboss each card when compared to embossing the characters in an order in a line in which they occur, does not optimize the time required to emboss each card.

U.S. Pat. No. 4,747,706 discloses an embossing method and apparatus in which individual cards are embossed with the characters sorted into an order so that each of the characters in the group of characters to be embossed are selected with the shortest movement time from the current embossing position to a next embossing position. The shortest movement time is the longer of the time required for the rotatable embossing wheels to rotate to the new rotary position of the character to be embossed or to translate the card carriage from the current X and Y coordinates to the new X and Y coordinates of the next character to be embossed. While this process is an improvement over embossing characters in the order in which they appear in the lines to be embossed on a credit card, it does not provide optimal embossing speeds which are crucial to achieving the highest throughput in a credit card embossing system.

Current credit card embossing systems load cards to be embossed in a single input station where they are picked and transported to in line processing stations where successive processing operations are performed on the cards such as embossing of characters, recording of information on the magnetic stripe on the back surface of the card and applying topping material to the embossed characters followed by collection of the cards in an output station. The processed cards in the systems are checked for proper magnetic recording and embossing at various points during processing such as for example, described in the assignee's U.S. Pat. No. 4,969,760. Cards which have been erroneously processed are collected in reject bins for either reprocessing or discarding.

However, current credit card embossing systems do not allow multiple job formats to be simultaneously programmed and/or processed on cards selected from multiple input stations which are further collected in programmed selected individual output stations in a group of multiple output stations. As a result, the overall flexibility of current credit card embossing systems is limited because only a single card supply may be used in association with the programming of a card format and/or embossing thereof. This deficiency prevents the processing of cards of different types with different formats by using simultaneous or sequential processing of card blanks from different card issuers of differing physical appearance without stopping of the embosser to program the next card processing format. Therefore, the overall processing efficiency of current credit card embossing systems to process multiple card types and formats is limited in view of the requirement that the single input station must have its card blanks changed and its controller reprogrammed to provide processing of cards having different physical appearances. This process is especially inefficient when multiple jobs are to be processed with each job comprising a relatively small number of cards to be processed.

U.S. Pat. No. 3,137,981 discloses a cartoning machine in which multiple input stations are provided which may be selectively positioned over vacuum cups to supply carton blanks, which may be of different types, to the cartoning machine.

U.S. Pat. No. 4,980,704 discloses a printing apparatus in which print blanks for printing airline tickets are fed from multiple bins to permit tickets of different types to be supplied on demand.

U.S. Pat. No. 5,235,519 discloses a card vending machine in which identical card dispensers are provided with one of the dispensers being a spare when the other card dispenses is not in use.

U.S. Pat. No. 4,898,268 discloses a printed circuit board positioning apparatus in which individual circuit boards are provided by a lift unit which moves the boards vertically upward where thereafter they are held by a pair of side grooves for transporting the circuit board along a transport path for automatic electronic part mounting. Backup pins hold the circuit board at a predetermined mounting level. After mounting of the electronic components is complete, the individual circuit board is freed from the slide grooves.

U.S. Pat. No. 5,266,781 discloses a modular card processing system which is designed for processing credit cards. The system of the '781 patent is modular to permit the variation of the physical length of the machine to accommodate different numbers of modules. The various modules are mechanically connected to each other through a standard mechanical interface. The system also has an electrical interface having an AC power bus and common software. However, the system of the '781 patent achieves modularity without an expandable frame providing a fixed reference position for the mounting of modular card processing stations which are attached to the frame in a single in line transport path.

FIGS. 1 and 2 respectively illustrate side and elavational views of an embosser disclosed in FIGS. 22 and 23 of the assignee's U.S. Pat. No. 4,969,760 and used in the assignee's ADVANTAGE™ embosser. The disclosure of the assignee's U.S. Pat. No. 4,969,760 is incorporated herein by reference in its entirety. Only the upper half of the individual embosser has been completely illustrated but it should be understood that the structure of the bottom half is substantially identical. The embosser is activated synchronously with the activation of individual character pairs carried by each of the embossing wheels 34 and 36 as described below. An interposer 30 is used so that energy sufficient to activate rams 32 associated with female and male embossing wheels 34 and 36 through toggle linkage 38 and 40 can be stored as rotational kinetic energy and very rapidly connected to the individual character pairs 80 and 82 with sufficient force (e.g., 300 pounds) to provide acceptably embossed characters in a minimum amount of time without creating accessive noise or requiring a larger embossing motor (not illustrated). An embossing motor is connected to a fly wheel (not illustrated) in a known manner through a belt and pulley (not illustrated) fixed on a shaft (not illustrated) journaled to the machine frame (not illustrated). The fly wheel is continuously rotated by the embossing motor and is sized to provide the aforementioned kinetic energy which is utilized to supplement the torque of the motor and drive the toggle linkage 38 and 40 upon rapid actuation of the interposer assembly 30, as hereafter described, to emboss a card 42 positioned by a carriage (not illustrated) at a character embossing position having selected X and Y axes coordinates by moving the card between the rams 32 associated with the embossing wheels 34 and 36. The fly wheel eliminates a need for a larger embossing motor with greater torque and thereby permits the embosser to be more compact and light in weight.

Different matched character pairs 80 and 82 on the embosser wheels 34 and 36 are rotated to an rotary character embossing position on the card 42 in association with movement of the card carriage to a set of X and Y coordinates defining a card embossing position to emboss each character in a known manner by rotation of a positioning motor having an encoder (not illustrated). The motor rotating the embosser wheels is connected to the embosser wheels 34 and 36 through a belt (not illustrated). The embosser wheels 34 and 36 rotate together around a shaft 44 and have a pulley (not illustrated) around which the belt (not illustrated) is wrapped between the motor and the embosser wheels so that precise and rapid movement of the wheels can be achieved.

The toggle links 38 and 40 consist of upper and lower 4-bar linkages which are sized to provide the aforementioned substantial amount of force such as 300 pounds at the rams 32. Furthermore, a dwell is produced with the top actuator lever 46 bringing the ram 32 carried in the upper wheel 34 to its final position slightly before the actuator lever (not illustrated) of the lower wheel 36 brings its ram (not illustrated) for the matched character pair to its final embossing position.

The interposer assembly 30 is arranged between the embosser motor and the embosser wheels 34 and 36 to provide synchronous control of the connection of power from the embosser motor to the matched character pairs 80 and 82 at the proper time during at best every other rotation of the embosser motor. The above described embosser linkage is driven by the embosser motor through crank 50 mounted at the end of shaft 52 connected to the aforementioned fly wheel. A sensor disk 54 associated with a sensor 56 is used to signal when the position of the character pairs carried by the embosser wheels is at top dead center as explained below in association with FIG. 3. The crank 50 continually rotates with the embosser motor. A magnetic coil 52 is mounted on lever 46. An armature 54 is mounted to pivot about a pivot point 56'. A stop 58 is mounted on the lever 46 to prevent counterclockwise motion of the armature 54 beyond the substantially vertical position shown in FIG. 1. An interposer slide 60 is pivoted at point 62 at the bottom the armature 54. The slide 60 is horizontally slidable within di-blocks 64 held by a conventional fastener at the end of lever 46. Upon actuation of the magnetic coil 52 to rotate the armature 54 clockwise around pivot 56', the slide 60 is pushed forward to the left to position projection 68 over the ram 32. The movement of projection 68 of slide 60 into the space 66, which otherwise is insufficient to provide contact between the lever 46 and the ram 32, now transmits force from the downward rocking of the lever 46 to the ram 32 which drives its character 80 into the upper face of the card 42 simultaneously with the character 82 being driven upward. The lower assembly (not illustrated) functions in the same manner with its interposer being activated at the same time as the upper interposer 30. The projection 68 is dimensioned to slide snugly into the space 66 between the lever 46 and the ram 32 when the rocker is in the position as illustrated in FIG. 1.

The interposer arrangement provided in the lower assembly may be sized differently from the projection 68 in view of the lower lever associated with the lower wheel 36 traveling a greater distance than the end of the lever 46 associated with the wheel 34. The rams 32 are biased by spring 70 away from an embossing position after the lever 46 has moved to the illustrated open position. An adjustable stop 72 mounted on bracket 74 holds the rams 32 securely on the frame of the embosser to permit adjustment of the gap to about 0.010 inches between the ram 32 and the associated slide 60. Shims 76 may be inserted between guide blocks 64 and the levers 46 to provide the aforementioned spacing.

Actuation of the magnetic coil 52 by a signal pivots the armature 54 clockwise away from stop 58 which moves the projection 68 in line with the end of the ram 32. When the projection 68 is in line with the end of the ram 32, the downward rocking motion of the lever 46 and the upward rocking motion of the lower lever will transmit energy directly to the individual character pair 80 and 82 to emboss that character on the face of the card 42. As indicated above, the kinetic energy stored in the fly wheel is then converted into the high force necessary to emboss the character on the card 42.

The magnetic coil 52 is only momentarily activated. When the lever 46 approaches top dead center, sufficient clearance develops between projection 68, ram 32 and the lever to permit the armature 54 to rotate counterclockwise under the force supplied by spring 59 until contact with the stop 58 is made. As a result, the lever 46 and the lower lever freely reciprocate without transmitting force to a character pair 80 and 82 to emboss a character on the face of the card 42. Every other revolution of the embosser motor is used to move the wheels 34 and 36 and the embosser carriage to position the card 42 at the rotary and X and Y coordinates of the next character to be embossed.

FIG. 3 illustrates a timing diagram of the operation of the embosser of FIGS. 1 and 2. The embosser of FIGS. 1 and 2 is synchronous in that the activation of the interposer 30 by the application of a signal to the magnet 52 and the other magnet on the lower lever controls the time interval during which embossing may take place synchronized with the rotation of the crank 50 which is driven by the motor as described above. The embosser motor revolutions are indicated as cycles with the numbers 0, 1 and 2 along the abscissa indicating successive revolutions of the embosser motor. The FIRST EMBOSSING CYCLE, appearing between points 0 and 1, is equal to one revolution of the embosser motor which reciprocates the crank 50 through a complete cycle of revolution. The time between points 0 and 1 along the abscissa is when embossing of a character takes place and the time between points 1 and 2 along the abscissa is when embosser wheel and carriage motion takes place. At top dead center (TDC) the individual character pair 80 and 82 is separated from the card 42 by the greatest distance. Actual embossing of the card 46 occurs when character pair 80 and 82 is driven into contact with the faces of the card 46 during the time interval between JUST PRIOR TO CONTACT and CLEARANCE in the FIRST EMBOSSING CYCLE. The midpoint of an EMBOSSING CYCLE is bottom dead center (BDC) at which time the individual character pair 80 and 82 is driven deepest into the faces of the 42 card. The points JUST PRIOR TO CONTACT and CLEARANCE are respectively when the character pair 80 and 82 are just making and clearing surface contact with the card 42. It should be understood that the projection of the character face of the individual male characters carried by one of the wheels is not illustrated. At the end of the FIRST EMBOSSING CYCLE, the individual character pair 80 and 82 is again positioned at TDC. The sensor 56 signals when the character pairs 80 and 82 are at TDC and initiates embosser wheel rotation and carriage translation during the FIRST MOTION CYCLE.

The FIRST MOTION CYCLE is equal in time duration to the FIRST EMBOSSING CYCLE and spans time points 1 and 2. As stated above, the indication of TDC by the sensor 56 is used to time the initiation of rotation of the embossing wheels 34 and 36 around shaft 44 and the translation of the carriage which moves the card 42 to the X and Y axes coordinates of the next character to be embossed in accordance with well known practice as described for example in the after said U.S. Pat. No. 4,969,760. The time permitted to rotate the embossing wheels 34 and 36 and translate the carriage to position the card 42 at the next set of rotary and X and Y axes embossing coordinates at which the character pair 80 and 82 is to be embossed spans the FIRST MOTION CYCLE. This mode of operation does not utilize the additional time interval between CLEARANCE and TDC at the end of the FIRST EMBOSSING CYCLE and the additional time interval between TDC and JUST PRIOR TO CONTACT in the SECOND EMBOSSING CYCLE. Use of any time during an EMBOSSING CYCLE for rotation of the embossing wheels 34 and 36 and card carriage movement would increase the throughput of the embosser.

DISCLOSURE OF THE INVENTION

The present invention is an improved card embossing machine and method of operation thereof which has high embossing throughput capable of processing credit card blanks into finished credit cards along a transport path serially by a plurality of card processing stations. The embosser is of modular construction including a modular frame which permits expansion of the transport path to contain a variable number of card processing stations to fit the card processing requirements of the user by expansion or contraction of the frame parts.

A typical embosser in accordance with the invention contains a host processor for controlling the overall operation of each of the motors along the transport path and the supply of records to the various processing stations at which the records are used during embossing or other operations requiring data unique to the particular card operation being performed at that card processing station, a pair of input card supply stations for providing card blanks from different card sources which permits programming of customized card processing formats to be performed on card blanks of different types held in each of the card supply stations as described below, a magnetic stripe encoder which encodes the magnetic stripe used on credit cards to encode various known types of data, a top side printer for printing photographic images such as the face of the person to whom a card is issued, an embosser having a single pair of rotating wheels carrying matched character pairs which rotate to selected rotary character positions between which a card is translated by a carriage mechanism to select an embossing position by movement along X and Y coordinate axes, a topper which applies foil to the tops of the embossed characters to make them visible in known fashion and a pair of output card collection stations into which the cards which have been embossed without error are collected in a selected one of the pair of the output card collection stations to permit simultaneous and or sequential processing of credit cards with multiple card processing formats as described below with a program entered by an operator of a control terminal or via data inputted from individual card files or individual cards within the card files. Furthermore, additional card processing stations such as a "smart" card encoder which programs the PROM contained in a smart card may be added to the serial processing along the transport path.

Each of the card processing stations preferably transports the cards using a carriage within a card transport mechanism which may be used as a modular building block for moving the cards along the transport path. The carriage of the card transport mechanism, which is of standardized construction, may be used to hold individual cards in a fixed position where precise positioning is required for card processing operations such as embossing and magnetic stripe encoding. Alternatively the carriage may be used as a card pusher in which the carriage pushes the cards through the card processing stations where positioning requirements of the cards are not stringent and friction between cards and the channels gripping the edges of the cards is sufficient to stop the cards to permit processing without unacceptable position errors such as applications for "smart" card encoding or topping. Finally, the carriage may additionally be used to translate the cards along a Y axis such as required by embossers which emboss multiple lines of characters.

The expandable frame of the present invention permits expansion of the transport path to contain a variable number of card processing stations which are mountable on the frame in line with the card transport path without adjustment of the individual stations to permit simple and inexpensive changing of the transport path to accommodate different numbers of card processing stations without substantial modification of the embosser frame. The embosser frame is variable in length and is extended or reduced in length by standard lengths equal to the length of each modular processing station which are attached to a horizontal surface defined by horizontal frame members of the frame parts. As a result, the user of the embossing system may vary the length of the frame to accommodate a different number of modular processing stations by disconnecting connectors holding the frame parts together as a rigid assembly, sliding the frame parts longitudinally relative to each other to increase or decrease the length of the transport path to accommodate a different number of card processing stations and again attaching the frame parts together into a unitized frame when the frame has been varied to the appropriate length to accommodate the addition or deletion of card processing stations.

The card transport of the present invention precisely positions cards in a carriage to comply with requisite card processing positioning requirements at both X and Y coordinate positions. The aforementioned precise positioning facilitates high speed embossing. Furthermore, the card transport mechanism of successive card processing stations are easily aligned to facilitate card processing station modularity which passes cards from station to station with the set up of individual stations in the embossing system being easily accomplished by their attachment to the horizontal members of the parts of the frame.

The invention further provides an improved method for degaussing the head used for magnetic encoding of the magnetic stripe on a credit card blank of both high and low coercivity type. Degaussing of the magnetic head is necessary after recording of one or more credit cards having a magnetic recording stripe of high coercivity prior to subsequent embossing of one or more credit cards having a magnetic stripe of low coercivity. With the invention, pulses of alternating polarity are applied to the magnetic head which decay preferably exponentially from a fixed magnitude of the power supply potential to zero. The power supply, which is charged to an operating voltage during recording of information on the magnetic stripe of the credit card, is discharged during the application of the pulses of alternating polarity to the magnetic head which upon the complete discharge of the power supply potential to zero leaves the magnetic head in a degaussed state. Preferably, the alternating polarity pulses have a constant frequency, such as 1 KHz, which is within the recording frequency range of the magnetic head.

The invention further includes an optimized sorting process for ordering the sequence in which individual characters are embossed on a credit card to substantially improve the overall efficiency of the embossing process. In accordance with the invention, the characters of a credit card to be embossed are first sorted into a first ordered set along the Z axis to arrange the characters in an order of increasing rotary distance measured from a reference position on the embossing wheels. Thereafter, the first ordered set in which the characters are ordered in increasing distance along the Z axis is modified to produce a second ordered set in which the individual characters are partially in an order of increasing distance along the Z axis and are further partially in an order in which the distance between the X and Y axes coordinates of successive characters of the second ordered set is not greater than a maximum distance between which the card may be moved during a time interval. The characters of the second ordered set are embossed in the order in which they appear in the second set which optimizes the time required to rotate the embossing wheels to successive rotary character positions as well as to translate the card between successive character positions along the X and Y coordinate axes defining card motion produced by the carriage holding the card.

The time intervals during an embossing cycle between clearance of each matched pair of characters which has embossed a character on a card and top dead center at which the pair of characters is separated by a maximum distance and between top dead center and contact of the pair of matched characters in a next embossing cycle are utilized as additional time to position both the wheels of the embosser at the next rotary position of a character to be embossed and the card at the X and Y axes coordinates of the next character to be embossed. This use of these previously unused time intervals substantially enhances throughput because fewer motion cycles between successive embossing cycles are not successful in positioning the wheels of the embosser and the carriage at the X and Y axes coordinates of the next character to be embossed within the time interval of the motion cycle between embossing cycles which eliminates the requirement for another successive motion cycle before embossing of the next character. Furthermore, as described above with the embossing of successive numerical characters or other characters closely spaced on the embossing wheels, such as OCR 7 pitch characters which are conventionally used to identify account numbers, additional increased efficiency may be realized by completing the movement of the embosser wheels to the rotary position of the next character to be embossed and the card to the X and Y axes coordinates of the next character to be embossed within the time interval between clearance of the matched character pair from embossing a card and contact of the pair of matched characters in a next cycle which permits the next cycle, which would normally be a motion cycle, to be activated with the interposer as an embossing cycle which produces a "machine gun" effect in embossing numerical characters extremely rapidly to further enhance embosser throughput.

The combined effects of ordering the characters of individual cards to be embossed in the aforementioned second ordered set and further the controlling of the timing of initiation of the Z axis rotation of the embossing wheels and translation of the card to the X and Y axes coordinates of the next character to be embossed permits an improvement of throughput between 15 and 20% over that achievable with embossers which do not use either of the aforementioned enhancement techniques.

An encoder for programming "smart" cards each containing an integrated circuit memory having an external contact area though which information to be programmed into the memory is transmitted to the integrated circuit memory in accordance with the invention provides high throughput and uses the card transport mechanism of the invention for transporting cards between an infeed and outfeed side as described. The encoder is mechanically simpler than the prior art and provides high throughput comparable with card processing speeds achieved with other card processing stations.

A card transport mechanism for transporting cards along a transport path in accordance with the invention includes a pair of spaced apart channels, each channel engaging a different one of a pair of opposed edges of the cards; a carriage for holding the cards at a fixed position relative to the carriage during motion along the transport path, the carriage having first and second card contacting elements spaced apart at different positions along the transport path and projecting into the transport path for contacting and holding a card in the fixed position during motion along the transport path, the first card contacting element being compliant to move orthogonally from within the transport path to permit movement of the card along the channels while the carriage is stationary prior to contact of the card by the second card contacting element and the second card contacting element being compliant along the transport path in response to contact with the card to produce contact and holding of the opposed edges of the card with the first and second card contacting elements in the fixed position; and a carriage support, connected to the carriage, for guiding the carriage along the transport path. The pair of spaced apart channels respectively comprise first and second elongated strips respectively containing a different one of the pair of channels therein with the channels being attached to the carriage support; and the carriage support comprises a guide which contacts the carriage with the carriage sliding along the guide during motion of the carriage along the transport path. One of the first and second elongated strips is fixed relative to the carriage support to provide a datum position for card processing operations; and another of the first and second elongated strips is moveable orthogonally to the fixed one of the first and second elongated strips; and a mechanism biases the another of the first and second elongated strips toward the fixed one of the first and second elongated strips whereby an edge of the card held in the channels is forced toward the fixed one of the first and second elongated strips to position the card at the datum position for card processing operations. The first card contacting element is pivotally attached to the carriage to provide pivoting of the first card contacting element around an axis perpendicular to the opposed edges of the card; and the first card contacting element has an edge which slopes toward the transport path and a tip, the tip extending into the transport path when the card is not moving in the channels past the first card contacting element, the tip rotating from extending into the transport path during movement of the card past the first card contacting element until after engagement by the second card gripping element with a leading edge of the card and then the tip rotating back into the transport path to cause a leading edge of the first card contacting element to contact the trailing edge of the card. A cam is disposed at a fixed position along the transport path; the second card contacting element having a first pivot axis attached to the carriage for pivoting the second card contacting element to provide pivotal movement of the second card contacting element along the transport path after engagement with a leading edge of the opposed edges of the card; and the second card contacting element has a second pivot axis attached to the carriage for pivoting the second card contacting element orthogonally relative to the transport path for pivoting the second card contacting element from engaging the leading edge of the card in the transport path to a position out of the transport path in response to contact of a part of the carriage with the cam during movement of the carriage along the transport path to free the leading edge of the card from being contacted by the second card contacting element and to free the card for movement along the pair of channels past the second card contacting element. An infeed driver is disposed on an infeed side of the pair of channels for propelling the card along the transport path into engagement with the first and second card contacting elements; an outfeed driver is disposed on an outfeed side of the pair of channels for propelling the card along the card transport path after disengagement from the second card contacting element; a drive mechanism propels the carriage along the transport path between the infeed and outfeed sides to transport the card from the infeed side to the outfeed side and to return the carriage to the infeed side to position the carriage to hold another card with the first and second card contacting elements; and a controller controls activation of each the drivers and the drive mechanism. Another drive mechanism moves the carriage and the pair of spaced apart channels orthogonally to the transport path; and the controller also controls activation of the another drive mechanism to selectively move the carriage holding the card along the transport path and orthogonally to the transport path.

A card transport mechanism in accordance with the invention further includes an embosser having first and second rotatable wheels, the first wheel carrying characters and the second wheel carrying characters and the channels being disposed in a plane between the wheels; and wherein the controller controls movement of the carriage engaging the card along the transport path and orthogonal thereto to position the card at selected card positions to emboss characters using the first and second wheels and activation of the embosser to rotate the first and second wheels to a selected rotary position and to emboss selected characters carried by the first and second wheels at selected positions on the card.

A transport mechanism in accordance with the invention further includes a magnetic encoder having a magnetic head facing a portion of an area between the pair of channels for magnetically recording information on a magnetic medium contained on the card as the card moves along the transport path; and the drive mechanism moves the card past the magnetic encoder during recording on the magnetic medium and in an opposite direction to permit reading of the information recorded on the card; and wherein the controller controls activation of the encoder and the drive mechanism during recording and reading of information recorded on the recording medium.

Infeed and outfeed drivers move the card in only one direction along the transport path. The infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side. Each driver comprises a one way clutch for rotationally driving at least one of the first and second rollers to move the card in the one direction and preventing movement in an opposite direction while the rollers contact the card.

A card transport mechanism for transporting cards along a transport path in accordance with the invention includes a pair of spaced apart channels, each channel engaging a different one of a pair of opposed edges of the cards; a carriage for pushing the cards along the transport path, the carriage having a card contacting element spaced from the channels and projecting into the transport path for contacting and pushing one of the cards along the transport path, the card contacting element being compliant to move orthogonally from within the transport path to permit movement of the card along the channels while the carriage is stationary and then the card contacting element moving back into the transport path to contact a trailing edge of the card for pushing the card with the card contacting element along the transport path; and a carriage support, connected to the carriage, for guiding the carriage along the transport path. The pair of spaced apart channels respectively comprise first and second elongated strips respectively containing a different one of the pair of channels therein with the channels being attached to the carriage support; and the carriage support comprises a guide which contacts the carriage with the carriage sliding along the guide during motion of the carriage along the transport path. One of the first and second elongated strips is fixed relative to the carriage support to provide a datum position for card processing operations; and another of the first and second elongated strips is moveable orthogonally to the fixed one of the first and second elongated strips; and a mechanism biases the another of the first and second elongated strips toward the fixed one of the first and second elongated strips whereby an edge of the card held in the channels is forced toward the fixed one of the first and second elongated strips to position the card at the datum position for card processing operations. The card contacting element is pivotally mounted in the carriage to provide movement of the card contacting element around an axis perpendicular to the opposed edges; and the card contacting element has an edge which slopes toward the transport path and a tip, the tip extends into the transport path when the card is not moving in the channels past the card contacting element, the tip rotates from extending into the transport path during movement of the card past the card contacting element until the tip clears the trailing edge of the card and then the tip rotates back into the transport path to cause a leading edge of the card contacting element to push the trailing edge of the card during movement of the carriage along the transport path.

A topper is fixed in position with respect to the pair of channels and has a supply of topping material which is transported orthogonally to the transport path and facing a side of the card having embossed raised characters on the side to which the topping material is to be applied; and the controller also controls application of topping material to the raised characters while the card engages the card contacting element and transporting of the topping material orthogonally with respect to the card transport path.

The infeed and outfeed drivers move the card in only one direction along the transport path. The infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side. Each driver comprises a one way clutch for rotationally driving at least one of the first and second rollers to move the card in the one direction and preventing movement in an opposite direction while the rollers contact the card.

A method for transporting cards along a transport path in accordance with the invention includes engaging opposed edges of a card in a pair of spaced apart channels; moving the card along the pair of spaced apart channels to engage the card within a carriage at a fixed position relative to the carriage with first and second card contacting elements spaced apart at different positions along the transport path and projecting into the transport path for contacting and holding a card at the fixed position during motion along the transport path, the first card contacting element being compliant to move orthogonally from within the transport path to permit movement of the card along the channels while the carriage is stationary prior to contact of the card by the second card contacting element and the second card contacting element being compliant along the transport path in response to contact with the card to produce contact and holding of the opposed edges of the card with the first and second card contacting elements in the fixed position; and holding the card in the fixed position with the first and second card contacting elements while moving the carriage along the transport path. The method further includes mounting one of channels at a fixed position relative to the carriage to provide a datum position for card processing operations; mounting another of the channels at a position which is moveable orthogonal to the one of the channels; and applying a force with another of the channels orthogonal to the transport path to an edge of the card to position an edge of the card at the datum position. The first card contacting element is pivotally attached to the carriage to provide pivoting of the first card contacting element around an axis perpendicular to the opposed edges of the card; the first card contacting element has a edge which slopes toward the transport path and a tip, the tip extending into the transport path when the card is not moving in the channels past the first card contacting element, the tip rotates from extending into the transport path during movement of the card past the first card contacting element until after engagement by the second card contacting element with a leading edge of the card and then the tip rotates back into the transport path to cause a leading edge of the first contacting element to contact the trailing edge of the card. The invention further includes mounting a cam at a fixed position along the transport path; pivoting the second card contacting element around a first pivot axis attached to the carriage to provide pivotal movement of the second card contacting element along the transport path after engagement with a leading edge of one of the opposed edges of the card; pivoting the second card contacting element around a second pivot axis attached to the carriage for pivoting the second card contacting element orthogonally relative to the transport path from engaging the leading edge of the card to a position out of the transport path in response to contact of a part of the carriage with the cam during movement of the carriage along the transport path to free the card from being contacted by the second contacting element and to free the card for movement along the pair of channels past the second card contacting element; moving the carriage along the transport path to contact the cam to free the leading edge of the opposed edges of the card from contact with the second card contacting element; and moving the card along the transport path by contact with the first card contacting element. The card is propelled along the transport path into engagement with the first and second card contacting elements with an infeed driver disposed on an infeed side of the transport path; the card is propelled along the card transport path after disengagement from the second card contacting element with an outfeed driver disposed on an outfeed side of the transport path; and the carriage is propelled along the transport path between the infeed and outfeed sides to transport the card from the infeed side to the outfeed side and to return the carriage to the infeed side to position the carriage to hold another card with the first and second card contacting elements with a drive mechanism.

The method of the invention further includes an embosser having first and second rotatable wheels which are rotated with the first wheel carrying characters and the second wheel carrying characters and the channels being disposed in a plane between the first and second wheels; and wherein controlling movement of the carriage along the transport path and orthogonal thereto and activation of the embosser to rotate the first and second wheels to a rotary position to emboss selected characters carried by the first and second wheels at selected card locations on the card with a controller.

The method of the invention further includes a magnetic encoder fixed in position with respect to the pair of channels and having a magnetic head facing a portion of an area between the pair of channels for magnetically recording information on a magnetic medium contained on the card as the card moves along the pair of channels along the transport path; and a drive mechanism for moving the card past the magnetic encoder during recording on the magnetic medium and in an opposite direction to permit reading of information recorded on the card; and controlling activation of the encoder and the drive mechanism during the recording and reading of information recorded on the recording medium with a controller.

A method for transporting cards along a transport path in accordance with the invention includes engaging opposed edges of a card in a pair of spaced apart channels; moving the card along the pair of spaced apart channels to engage the card with a card contacting element within a carriage, the card contacting element being spaced from the channels and projecting into the transport path for contacting and pushing one of the cards along the transport path, the card contacting element being compliant to move orthogonally from within the transport path to permit movement of the card along the channels while the carriage is stationary and then the card contacting element moving back into the transport path to contact a trailing edge of the card for pushing the card with the card contacting element along the transport path; and pushing the one card along the pair of spaced apart channels by moving the carriage along the transport path. Mounting one of channels at a fixed position relative to the carriage to provide a datum position for card processing operations; mounting another of the channels at a position which is moveable orthogonal to the one of the channels; and causing the another of the channels to apply a force orthogonal to the transport path to an edge of the card to position an edge of the card at the datum position. The card contacting element is pivotally attached to the carriage to provide pivoting of the card contacting element around an axis perpendicular to the opposed edges of the card; and the card contacting element has a edge which slopes toward the transport path and a tip, the tip extending into the transport path when the card is not moving in the channels past the card contacting element, the tip rotating from extending into the transport path during movement of the card past the card contacting element during which the tip contacts a face of the card and then rotating back into the transport path to cause a leading edge of the card contacting element to contact a trailing edge of the card. Propelling the card along the transport path into engagement with the card contacting element with an infeed driver disposed on an infeed side of the transport path; propelling the card along the card transport path after disengagement from the card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to contact another card with the card contacting element with a drive mechanism. A topper is fixed in position with respect to the pair of channels and has a supply of topping material which is transported orthogonally to the transport path and faces a side of the card which has embossed raised characters on the one side to which the topping material is to be applied; and application of topping material to the raised characters is controlled while the card engages the card contacting element and of the topping material is transported orthogonal to the transport path with a control.

An encoder for programming cards each containing an integrated circuit memory having an external contact area through which information to be programmed into the memory is transmitted to the integrated circuit memory in accordance with the invention includes a card transport for guiding the cards along a transport path from an infeed side to an outfeed side of the encoder, the card transport having a first section which is mounted in a fixed position on the infeed side, a second section containing a plurality of card receiving sections which are vertically separated and a third section which is mounted in a fixed position on the outfeed side in line with the infeed side; a vertical transport, coupled to the second section, from vertically moving the second section to vertically align individual card receiving sections with the first and third sections along the transport path; and an electrical contact assembly connected to the second section having a plurality of electrical contactors which individually are associated with a different one of each of plurality of card receiving sections and which contact the external contact area of individual cards while the individual cards are held in the plurality of card receiving sections. A mechanism holds each of the electrical contactors in an open position, when an associated card receiving section is in line with the first and third sections, to not contact the external contact area of the card and closes the electrical contactor from the open position to contact the external contact area of the card in the card receiving section in line with the first and third sections as the card receiving section associated with the open electrical contactor is moved vertically from being in line with the first and third sections. Each electrical contactor comprises a clamp which is biased in a normally closed position for contacting the external contact area of the card; and further comprises an actuator which contacts the clamp of each electrical contactor as the second section is moved vertically with movement of the second section in a first vertical direction causing each electrical contactor to be opened as each card receiving section is moved vertically in line with the first and third sections and movement of each card receiving section, in a second vertical direction, opposite the first direction, does not open the electrical contactors as each card receiving section is moved vertically in line with the first and third sections. A pivotally mounted member, biased to a home position, extends into a path of travel of the plurality of electrical contactors during movement of each electrical contactor and an associated card receiving station past the first and third sections and is rotatable permitting each electrical contactor to remain closed in response to vertical movement of the second section in the second vertical direction and to remain at the home position during vertical movement in the first vertical direction with contact between the pivotally mounted member and each electrical contactor causing each electrical contactor to open as the associated card receiving section moves in line with the first and third sections. A carriage contacts a card to push the card along the first section during motion of the carriage along the first section to the second section. The carriage pushes the card along the first section during motion of the carriage along the first section to the second section. A card contacting element is spaced from the card transport and projects into the transport path for contacting and pushing the card along the transport path, the card contacting element contacting the card being compliant to move orthogonally from within the transport path to permit movement of the card along the first section while the carriage is stationary and then the card contacting element moving back into the transport path to contact a trailing edge of the card for pushing the card with the card contacting element along the transport path; and a carriage support, connected to the carriage, guides the carriage along the first section of the transport path after the card is contacted with the card contacting element. The first and third sections respectively comprise first and second elongated strips respectively containing a pair of channels attached to the carriage support; and the carriage support comprises a guide which contacts the carriage with the carriage sliding along the guide during motion of the carriage along the transport path. The card contacting element is pivotally mounted in the carriage to provide movement of the card contacting element around an axis perpendicular to the opposed edges; and the card contacting element has an edge which slopes toward the transport path and a tip, the tip extends into the transport path when the card is not moving in the channels past the card contacting element, the tip rotates from extending into the transport path during movement of the card past the card contacting element until the tip clears the trailing edge of the card and then the tip rotates back into the transport path to cause a leading edge of the card contacting element to push the trailing edge of the card during movement of the carriage along the transport path. An infeed driver is disposed on an infeed side of the encoder for propelling the card along the transport path into contact with the card contacting element; an outfeed driver is disposed on an outfeed side of the encoder for propelling the one card along the card transport path after the card is pushed from one of the plurality card receiving sections; a drive mechanism propels the carriage along the transport path along the first section to transport the one card from the infeed side to the second section and to return the carriage to the infeed side to position the carriage to contact another card with the card contacting element; and a controller controls activation of each the drivers and the drive mechanism. A vertical transport moves the second section vertically relative to the first and third sections to align individual card receiving sections with the first and third sections; a controller controls the card transport and the vertical transport to move cards along the first section and successively into different ones of the plurality of card receiving sections and out of different ones of the plurality of card receiving sections to the third section while controlling movement of the vertical transport to move the second section upward and downward to load the cards in a first in first out sequence in the plurality of card receiving sections and controls the programming of the information into the integrated circuit memory of each of the cards within the plurality of card receiving sections by transmitting individual card records to be programmed through the electrical contactors and the external contact area to the integrated circuit memory of each card while the individual cards are contained in one of the plurality of card reading sections.

A method for programming with an encoder a plurality of cards each containing an integrated circuit memory having an external contact area through which information to be programmed into the memory is transmitted to the integrated circuit in accordance with the invention includes guiding a plurality of cards along a transport path from an infeed side to an outfeed side of the encoder with the cards passing through a first section which is mounted in a fixed position on the infeed side, a second section containing a plurality of card receiving sections which are vertically separated and are movable vertically to receive individual cards in individual card receiving sections and passing from the second section to a third section which is mounted in a fixed position on the outfeed side in line with the infeed side; moving the second section vertically to align individual card receiving sections with the first and third sections along the transport path; and causing an electrical contact assembly, having a plurality of electrical contactors, to have individual electrical contactors electrically contact the external contact area of each card held in the plurality of card receiving sections. The method further includes holding each of the electrical contactors to an open position, when an associated card receiving section is in line with the first and third sections, to not contact the external area of the card and to close the electrical contactor from the open position to contact the external contact area of the card in the card receiving section in line with the first and third sections as the card receiving section associated with the open electrical contactor is moved vertically from being in line with the first and third sections. Each electrical contactor comprises a clamp and the clamp is biased in a normally closed position for contacting the external contact area of the card; and further comprises an actuator which contacts the clamp of each electrical contactor as the second section is moved vertically and moving the second section in a first vertical direction to cause each electrical contactor to be opened by contact with the actuator as each card receiving section is moved vertically in line with the first and third sections and moving each card receiving section in a second vertical direction, opposite the first direction, while not opening the electrical contactors as each card receiving section is moved vertically in line with the first and third sections. A pivotally mounted member is provided which is biased to a home position and extends into a path of travel of the plurality of electrical contactors during movement of each electrical contactor and an associated card receiving station past the first and third sections and which is rotatable permitting each electrical contactor to remain closed during vertical movement of the second section in the second vertical direction and to remain at the home position during vertical movement in the first vertical direction with contact between the pivotally mounted member and the electrical contactor causing each electrical contactor to open as the associated card receiving section moves in line with the first and third sections. Each card is contacted with a carriage to push the card along the first section to the second section. Each card is contacted with a carriage to push the card along the first section to the second section.

A process for degaussing a magnetic head in accordance with the invention includes recording information with the magnetic head onto a magnetic medium; and after the recording of the information by the magnetic head onto the magnetic medium, degaussing the magnetic head by applying a pulse train of alternating polarity to the magnetic head which decreases in magnitude over a time interval from an initial magnitude to zero. The pulse train contains current supplied from discharging of a power supply used to provide electrical power to the magnetic head during recording of the information with the decrease in magnitude over the time interval being from an operating voltage, supplied by the power supply to the magnetic head during the recording of the information, to zero. The pulse train has a constant frequency with the constant frequency being within a range of frequencies which are recordable by the magnetic head. The pulse train may have a frequency of 1 KHz. The magnetic medium is a magnetic stripe on a card and the magnetic head is an encoding head in a credit card processing system. The decrease in magnitude over the time interval is preferably an exponential decay.

A system for degaussing in accordance with the invention includes a magnetic head for recording an information signal on a magnetic medium; an amplifier, coupled to the magnetic head, for amplifying the information signal to a recording level for recording the information signal on the magnetic medium and for applying a pulse signal of alternating polarity which decreases in magnitude over a time interval from an initial magnitude to zero to the magnetic head for degaussing residual magnetism of the magnetic head caused by the recording of the information signal on the magnetic medium; a power supply, coupled to the amplifier, for providing electrical power to the amplifier to amplify the information signal to the recording level and for supplying electrical power within the pulse signal of alternating polarity; and a control for controlling application of the information signal and pulse signal to the amplifier. The system further includes a switch, coupled between a power supply voltage and a storage capacitance of the power supply, which is charged to the power supply voltage during recording of the information signal by the magnetic head, the switch being closed during recording and open during supplying of the pulse signal of alternating polarity to the magnetic head; and wherein opening and closing of the switch is controlled by the control.

A process for sequentially embossing a card with individual characters contained in a character set by rotating an embosser to a series of selective rotary positions at which individual characters of the character set are aligned with selected card positions at which the individual characters of the character set are embossed in accordance with the invention includes sorting the set of characters to form a first ordered set containing the characters in an order of increasing distance between a reference rotary position of the embosser and a rotary position of each individual character of the first ordered set on the embosser relative to the reference rotary position; sorting the first ordered set to form a second ordered set having the characters in a new order in which the individual characters of the second ordered set increase in distance measured relative to the reference rotary position from a distance of the first character in the second ordered set to a distance of the last character in the second ordered set with at least some of the individual successive characters from the first character to the last character in the second ordered set not being located farther from the reference rotary position than an immediately preceding character of the second ordered set; and embossing the characters of the second ordered set with the embosser in an order beginning from the first character of the second ordered set successively to the last character of the second ordered set by coordinated rotary motion of the embosser and rectilinear motion of the card to sequentially position the embosser and card at selected rotary and rectilinear positions respectively to emboss the individual characters of the character set. The process further includes inserting a subsequent character in the first ordered set between each pair of successive characters of the first ordered set which are separated by a distance along X and Y axes of motion of a carriage holding the card, which is too great to be moved during the time interval, with each inserted character being deleted for an original position thereof in the first ordered set and being located a distance along the X and Y axes spaced from the first character of the character pair which may be moved by the carriage during the time interval; and moving all characters in a group of characters between the second character of each character pair and a character immediately before a position of the deleted character in the first ordered set down one character position in the first ordered set to form the second ordered set. The time interval comprises a time interval which the carriage may be moved between successive time intervals during which the carriage cannot be moved while successive characters are being embossed.

A process for sequentially embossing a card with individual characters contained in a character set by rotating an embosser to a series of selected rotary positions at which individual characters of the character set are aligned with selected card positions at which the individual characters of the character set are embossed in accordance with the invention includes sorting the set of characters to form a first ordered set containing the characters in an order of increasing distance between a reference rotary position of the embosser and a rotary position of each individual character of the first ordered set on the embosser relative to the reference rotary position; sorting the first ordered set to form a second ordered set having the characters in a new order which partially has successive characters of the second ordered set in an order of increasing distance measured relative to the reference rotary position and partially has successive characters of the second ordered set in an order with a distance between embossing coordinates of the successive characters on the card not being separated by a distance measured along orthogonal coordinate axes which exceeds a maximum distance that the card may be moved during a time interval; and embossing the characters of the second ordered set with the embosser in an order beginning from the first character of the second ordered set successively to the last character of the second ordered set by coordinated rotary motion of the embosser and rectilinear motion of the card to sequentially position the embosser and card at selected rotary and rectilinear positions respectively to emboss the individual characters of the character set. The process further includes inserting a subsequent character in the first ordered set between each pair of successive characters of the first ordered set which are separated by a distance along X and Y axes of motion of a carriage, which is too great to be moved during the time interval, with each inserted character being deleted for an original position thereof in the first ordered set and being located a distance along the X and Y axes spaced from the first character of the character pair which may be moved by the carriage during the time interval; and moving all characters in a group of characters between the second character of each character pair and a character immediately before a position of the deleted character in the first ordered set down one character position in the first ordered set to form the second ordered set. The time interval comprises a time interval which the carriage may be moved between successive time intervals during which the carriage cannot be moved while successive characters are being embossed.

A card processing system for processing cards at a plurality of card processing stations disposed at spaced apart locations along a card transport with the card processing stations performing card processing operations on the cards during transporting of the cards along the card transport path in accordance with the invention includes a plurality of card supply stations located at an infeed side of the card transport with each card supply station containing a plurality of cards to be selectively individually supplied therefrom to the card transport; a plurality of card collection stations located at an outfeed side of the card transport with each card collection station selectively collecting individual cards from the card transport after processing by the processing stations; and a controller, coupled to the plurality of card supply stations, to the plurality of card collection stations and to the card transport, for controlling individual selection of a next card from any one of the card supply stations and supply thereof to the card transport, the transporting of the individually selected cards by the card transport to the plurality of card processing stations and the transporting of the individually selected cards, after error free processing, to any selected one of the plurality of card collection stations for collection therein. The controller is further coupled to the plurality of card processing stations and controls processing of individual cards at the plurality of card processing stations. Each card supply station comprises a magazine holder connected to the processing system and positioned adjacent to the card transport at the infeed side and a magazine, which is removably mounted in the magazine holder, for containing the plurality of cards held by card supply station with the magazine having an opening at a bottom thereof for passing individual selected cards from the card supply station to the card transport; and each card collection station comprises a magazine holder connected to the processing system and positioned adjacent to the card transport at the outfeed side and a magazine, which is removably mounted in the magazine holder, for containing the plurality of cards collected by the card collection station with the magazine having an opening at a bottom thereof for passing individual collected cards received from the card transport into the magazine. The card supply station magazine comprises a rectangular cross section defined by four corners which respectively engage four corners of each of the plurality of cards held by the magazine with a top of the magazine being open for receiving a stack of cards; and the card collection station magazine comprises a rectangular cross section defined by four corners which respectively engage four corners of each of the plurality of cards held by the magazine with a top of the magazine being open for removing a stack of processed cards. A plurality of bent members extend from the bottom thereof inward into the rectangular cross section for supporting a bottom card in a stack of cards contained by the magazine with a pair of the members extending from sides of the magazine adjacent a side from which individual cards pass to the card transport with the pair of members extending below the side by a distance greater than a thickness of an individual card but less than twice the thickness of an individual card to define an opening for individual cards to pass from or into the magazine. The magazine of each of the card supply stations has a capacity for holding an integer number of groups of cards held in a stack in a full supply box of cards to be processed with each group comprising a plurality of cards which are loaded into the magazine. The controller includes a system control processor, the system control processor being programmable to set individual card processing formats for controlling all of the processing operations by the card processing stations to be performed on cards selected from each individual one of the plurality of card supply stations such that cards from each of the individual card supply stations may be selectively processed with a card processing format by the card processing stations which is uniquely assigned to that individual card supply station.

A card processing system containing a plurality of card processing stations disposed along a card transport path in accordance with the invention includes a frame having a plurality of parts with each part comprising connected horizontal and vertical members, the frame extending along the card transport path and having a variable length extending along the transport path for supporting a variable number of the card processing stations disposed along the card transport path and at least two parts of the frame each having at least one pair of horizontal members which are connected to each other; each card processing station comprising at least one support plate to provide a rigid base for the card processing station with a plurality of the support plates being attached to the at least two parts of the frame in a plane having a top surface parallel to the card transport path, each of the card processing stations being attached to the top surface of at least one of the support plates; and each of the plurality of processing stations having a card transport mechanism for transporting the cards parallel to the top surface along the card transport path. Each of the at least two parts of the frame has opposed vertical sides with at least one pair of the horizontal members of one part of the at least two parts of the frame projecting past one of the opposed vertical sides of another part of the at least two parts of the frame and each pair of the at least one pair of horizontal projecting members of the one part being connected to another pair of the horizontal members of the another part of the at least two parts. Each part of the at least two parts of the frame has an upper pair and a lower pair of horizontal members with the upper pair of horizontal members of the one part and the upper pair of horizontal members of another part being aligned so that an upper surface of the upper pairs of aligned horizontal members is in a plane parallel to the top surface to which the plurality of support plates are attached. The lower pair of horizontal members of at least one part of the frame projects past one of the opposed vertical sides of the another part of the frame and is connected to another pair of the lower horizontal members of the another part of the frame. Each of the lower pair of horizontal members of at least one part of the frame projects past one of the opposed vertical sides of the another part of the frame and is connected to another pair of the horizontal members of the another part of the frame. The invention further includes a pair of spaced apart channels, each channel engaging a different one of a pair of opposed edges of the cards; a carriage for holding the cards at a fixed position relative to the carriage during motion along the transport path, the carriage having first and second card contacting elements spaced apart at different positions along the transport path and projecting into the transport path for contacting and holding a card in the fixed position during motion along the transport path, the first card contacting element being compliant to move orthogonally from within the transport path to permit movement of the card along the channels while the carriage is stationary prior to contact of the card by the second card contacting element and the second card contacting element being compliant along the transport path in response to contact with the card to produce contact and holding of the opposed edges of the card with the first and second card contacting elements in the fixed position; and a carriage support, connected to the carriage, for guiding the carriage along the transport path. The first card contacting element is pivotally attached to the carriage to provide pivoting of the first card contacting element around an axis perpendicular to the opposed edges of the card; and the first card contacting element has an edge which slopes toward the transport path and a tip, the tip extending into the transport path when the card is not moving in the channels past the first card contacting element, the tip rotating from extending into the transport path during movement of the card past the first card contacting element until after engagement by the second card gripping element with a leading edge of the card and then the tip rotating back into the transport path to cause a leading edge of the first card contacting element to contact the trailing edge of the card. A cam is disposed at a fixed position along the transport path; the second card contacting element has a first pivot axis attached to the carriage for pivoting the second card contacting element to provide pivotal movement of the second card contacting element along the transport path after engagement with a leading edge of the opposed edges of the card; and the second card contacting element has a second pivot axis attached to the carriage for pivoting the second card contacting element orthogonally relative to the transport path for pivoting the second card contacting element from engaging the leading edge of the card in the transport path to a position out of the transport path in response to contact of a part of the carriage with the cam during movement of the carriage along the transport path to free the leading edge of the card from being contacted by the second card contacting element and to free the card for movement along the pair of channels past the second card contacting element.

The invention further includes a pair of spaced apart channels, each channel engaging a different one of a pair of opposed edges of the cards; a carriage for pushing the cards along the transport path, the carriage having a card contacting element spaced from the channels and projecting into the transport path for contacting and pushing one of the cards along the transport path, the card contacting element being compliant to move orthogonally from within the transport path to permit movement of the card along the channels while the carriage is stationary and then the card contacting element moving back into the transport path to contact a trailing edge of the card for pushing the card with the card contacting element along the transport path; and a carriage support, connected to the carriage, for guiding the carriage along the transport path.

The pair of spaced apart channels respectively comprise first and second elongated strips respectively containing a different one of the pair of channels therein with the channels being attached to the carriage support; and the carriage support comprises a guide which contacts the carriage with the carriage sliding along the guide during motion of the carriage along the transport path. One of the first and second elongated strips is fixed relative to the carriage support to provide a datum position for card processing operations; another of the first and second elongated strips is moveable orthogonally to the fixed one of the first and second elongated strips; and further comprises a mechanism biasing the another of the first and second elongated strips toward the fixed one of the first and second elongated strips so that an edge of the card held in the channels is forced toward the fixed one of the first and second elongated strips to position the card at the datum position for card processing operations.

An infeed driver is disposed on an infeed side of the pair of channels for propelling the card in the first direction along the transport path into engagement with the first and second card contacting elements; an outfeed driver is disposed on an outfeed side of the pair of channels for propelling the card along the card transport path in first direction after disengagement from the second card contacting element; a drive mechanism propels the carriage along the transport path between the infeed and outfeed sides to at least transport the one card from the infeed side to the outfeed side and to return the carriage to the infeed side to position the carriage to hold another card with the first and second card contacting elements; and a controller controls activation of each the drivers and the drive mechanism. The infeed and outfeed drivers move the card in only one direction. The infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side. Each driver comprises a one way clutch for rotationally driving at least one of the first and second rollers to move the card the one direction and preventing movement in a direction opposite the one direction while the rollers contact the card. The rolling surfaces of the first and second rollers of the infeed driver are not mounted in surface contact when the card is not positioned at the infeed side and the rolling surfaces of the first and second rollers of the outfeed driver are not mounted in surface contact when the card is not positioned at the outfeed side.

A card processing system in accordance with the invention further includes an embosser having first and second rotatable wheels, the first and second wheels carrying characters and the channels being disposed in a plane between the wheels; and wherein the controller controls movement of the carriage engaging the card along the transport path and orthogonal thereto to position the card at selected card positions to emboss characters using the first and second wheels and activation of the embosser to rotate the first and second wheels to a selected rotary position and to emboss selected characters carried by the first and second wheels at selected positions on the card.

A card processing system in accordance with the invention further includes a magnetic encoder having a magnetic head facing a portion of an area between the pair of channels for magnetically recording information on a magnetic medium contained on the card as the card moves along the transport path; and the drive mechanism moves the card past the magnetic encoder during recording on the magnetic medium and in an opposite direction to permit reading of the information recorded on the card; and wherein the controller controls activation of the encoder and the drive mechanism during recording and reading of information recorded on the recording medium.

A card processing system in accordance with the invention further includes a topper fixed in position with respect to the pair of channels and having a supply of topping material which is transported orthogonally to the transport path and facing a side of the card having embossed raised characters on the side to which the topping material is to be applied; and the controller also controls application of topping material to the raised characters while the card engages the card contacting element and transporting of the topping material orthogonally with respect to the card transport path.

An embossing system in accordance with the invention includes an embosser having first and second rotatable wheels carrying pairs of matched characters which may be selectively embossed and which are rotated in unison to a selected rotary position to emboss a selected character from the pairs of matched characters on a card disposed between the wheels, each matched character pair being activated to emboss a selected character when positioned at the selected rotary position to drive each character pair into contact with opposed surfaces of the card and away from contact with the card to emboss the card disposed between the first and second rotating wheels with the selected character; a motor, coupled to the embosser wheels, for selectively rotating the wheels to the selected rotary position to position the selected character for embossing; a power source and power transmission for transmitting power produced by the power source to a pair of matched characters of the selected character positioned at the selected rotary position to emboss the selected character at the selected rotary position on the card disposed between the first and second rotary wheels; a carriage and carriage drive for holding individual cards at a position between the first and second rotating wheels and for translating each card held by the carriage selectively along orthogonal coordinate axes to selectable individual positions on the card held by the carriage at which each selected character positioned at the selected rotary position is embossed on the card held by the carriage; a detector for indicating when each pair of matched characters at the selected rotary position has first cleared opposed faces of the card being embossed; and an embosser controller, responsive to the detector, for controlling the motor, the power source, and the carriage drive, for controlling activation of the motor and the carriage drive to begin rotation of the first and second rotatable wheels from a selected rotary position at which a selected character has been embossed on the card to a next selected rotary position at which a next selected character is to be embossed on the card and to begin translation of the card held by the carriage by the carriage drive from a card position at which the selected character has been embossed along at least one of the orthogonal coordinate axes to a next card position at which a next selected character is to be embossed on the card in response to the detector indicating that the pair of matched characters, which embossed the selected character, has first cleared engagement with the opposed surfaces of the card. The power transmission comprises at least one interposer, which is periodically activated by the embosser controller, to connect the power source to a pair of matched characters of a selected character for an embossing time interval. The detector indicates a rotary position of a drive shaft of the power source at which each pair of matched characters which has embossed a character has first cleared opposed faces of the card being embossed.

A method of embossing cards with a plurality of selected characters in accordance with the invention includes positioning a card to be embossed at selected card positions with the plurality of selected characters between a pair of rotatable embossing wheels respectively carrying pairs of matched characters which emboss the plurality of selected characters and rotating the pair of rotatable embossing wheels to a selected rotary position at which a selected character is to be embossed at a selected card position with a selected pair of the pairs of matched characters; providing power from a power source to a matched pair of the selected character positioned at the selected rotary position to drive the matched pair into opposed surfaces of the card to emboss the selected character at a selected card position; indicating when the matched pair of the selected character has first cleared opposed surfaces of the card during the providing of power to the matched pair of the selected character; and responsive to the indication that the matched pair of the selected character has first cleared the opposed surfaces of the card, beginning rotation of the pair of rotatable embossing wheels to a selected rotary position where a next selected character is to be embossed and in response to the indication that the matched pair of the selected character has first cleared the opposed surfaces beginning translation of the card to a next selected card position where a next selected character is to be embossed thereon. Periodically providing the power from the power source to a pair of the matched characters of the selected character by activating an interposer to connect the power source to a pair of matched characters of the selected character. A detector indicates a rotary position of a drive shaft of the power source at which a pair of matched characters embossing a selected character on the card first clears opposed faces of the card.

BRIEF DESCRIPTION OF THE DRAWINGS

FIG. 7 illustrates a front elevational view of the card supply stations including picker mechanism.

FIG. 16 illustrates a timing diagram illustrating the improved operation of an embosser in accordance with the invention.

FIG. 20 illustrates a frame utilized by the embossing system of the present invention which may be expanded or contracted to vary the number of card processing stations along the transport path.

FIGS. 22–24 illustrate the degaussing system of the present invention.

BEST MODE FOR CARRYING OUT THE INVENTION

Figure 4:
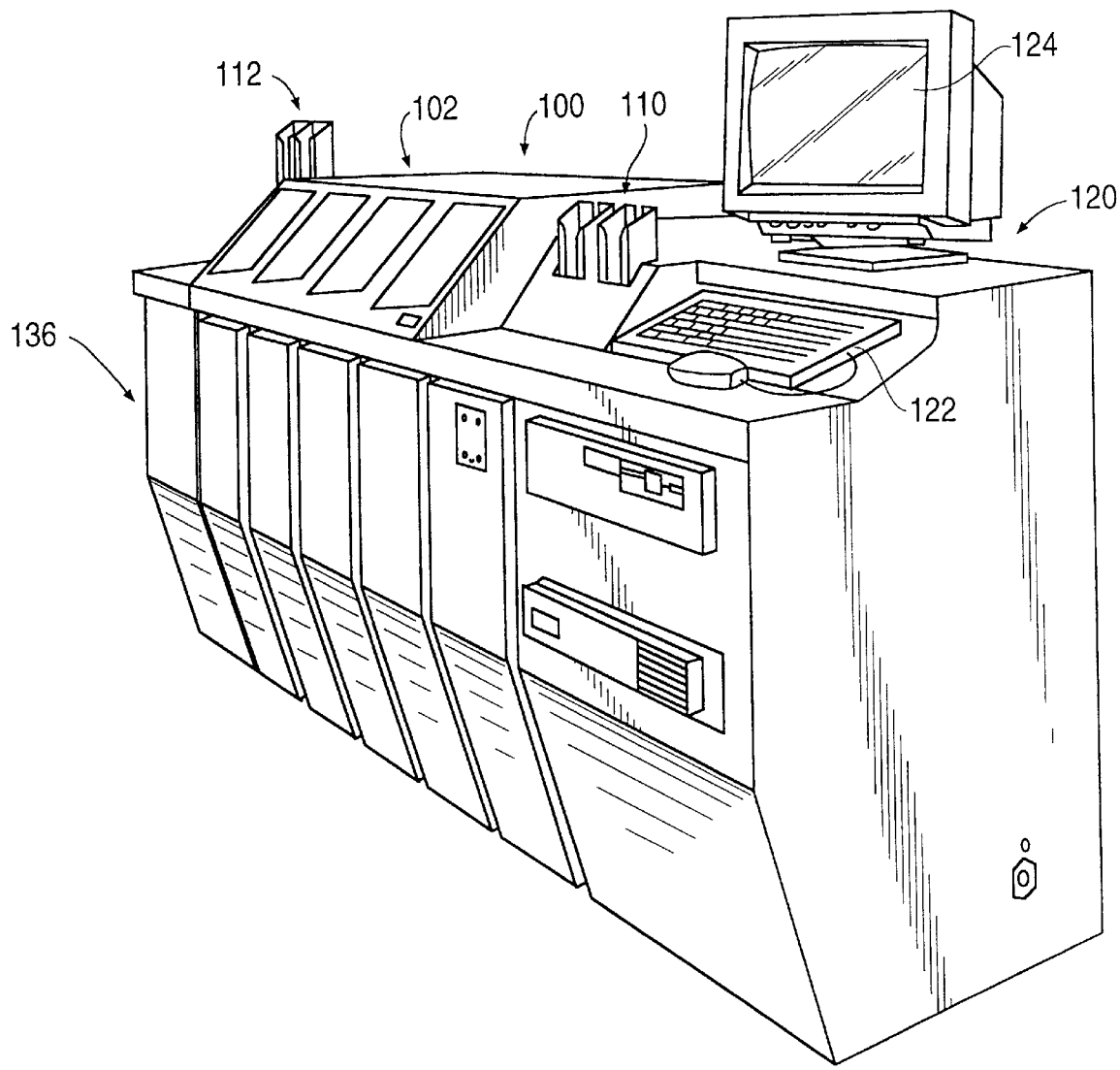
FIGS. 4 and 5 illustrate a perspective view of a preferred embodiment of an embossing system in accordance with the present invention respectively with the cover lid closed and in the open position.
Figure 5:
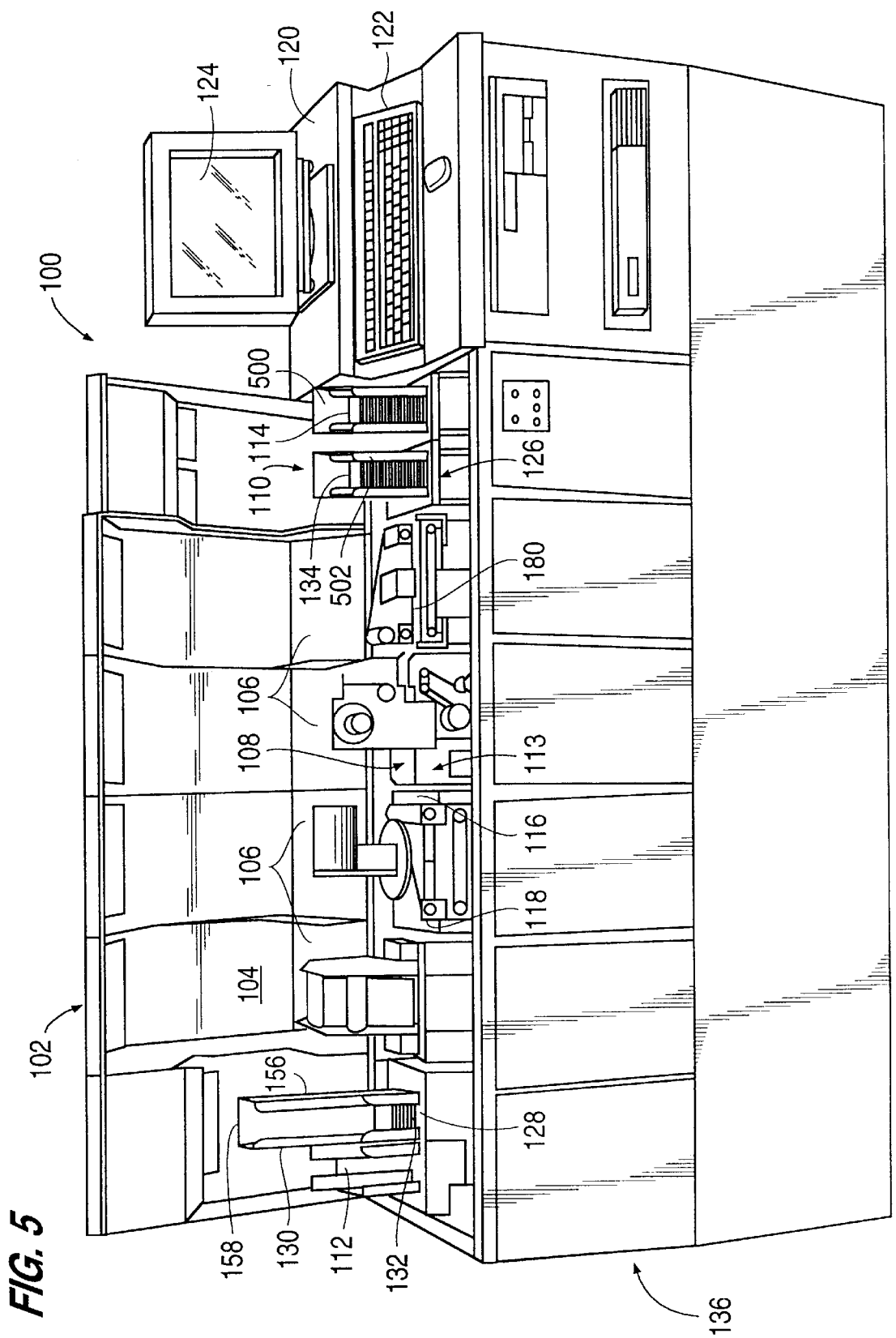

FIGS. 4 and 5 respectably illustrate views of a card processing system 100 containing multiple card processing stations 106 in accordance with the present invention with the cover lid 102 in a closed and open position. The cover lid 102 has multiple segments 104 which are pivoted from a closed position as illustrated in FIG. 4 to an open position as illustrated in FIG. 5. The card processing stations 106 are disposed along a transport path 108 which extends between a plurality of card supply stations 110 and a plurality of card collection stations 112. A card transport 113 comprised of a plurality of in line card transport mechanisms 180 moves individual cards 114 from the card supply stations 110 to the card collection stations 112. The card transport 113 is preferably used by each of the card processing stations 106 to move cards at each card processing station from an infeed side 116 to an outfeed side 118 while the card processing station performs a dedicated card processing operation on the card or cards therein. The details of the individual card transport mechanisms 180, the card supply stations 110 and card collection stations 112 are described below.

Figure 8:
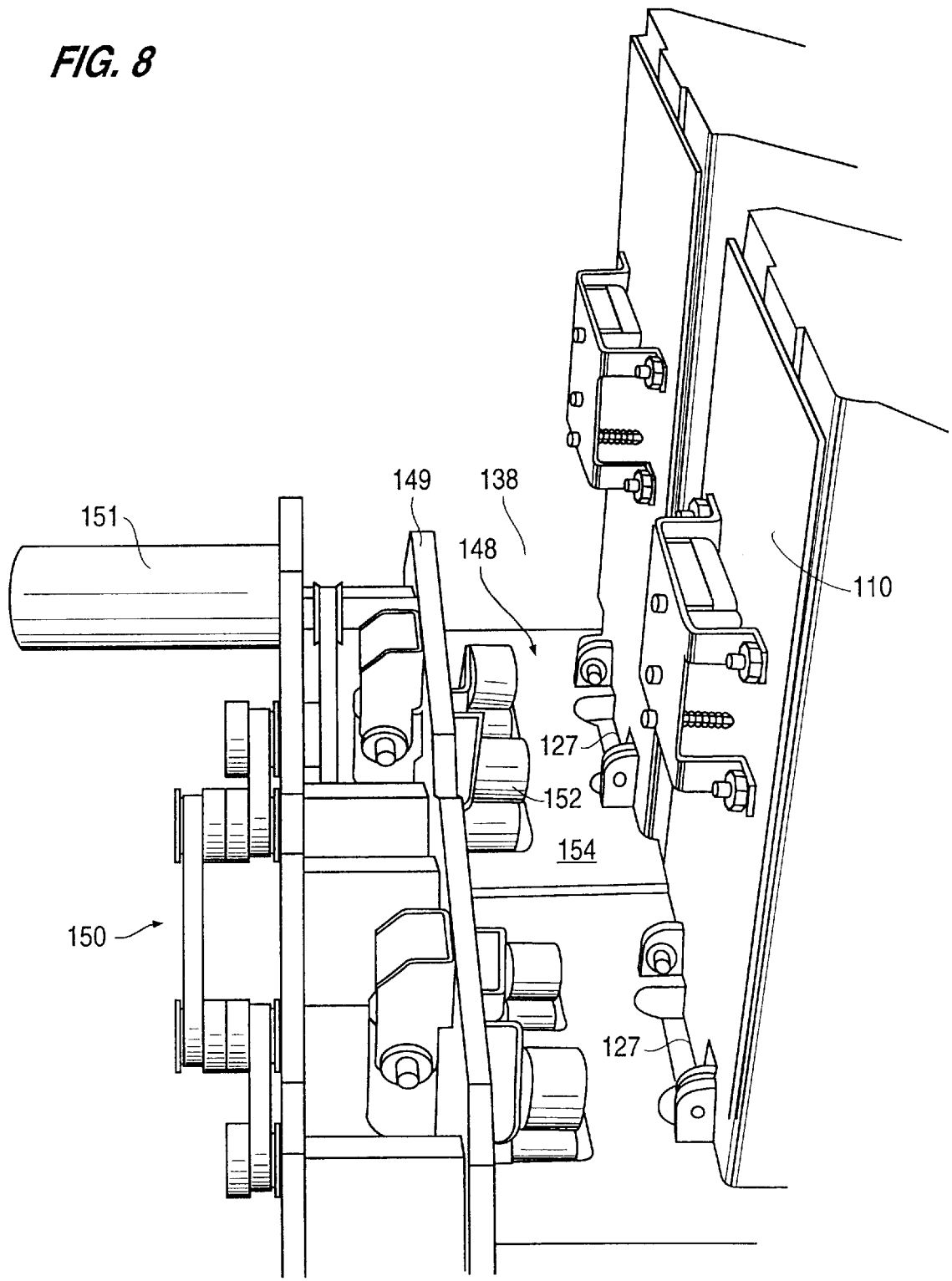
FIG. 8 illustrates a view of the infeed side of the transport path including the rear side of the card supply stations.

A control terminal 120 including an input device 122 such as a keyboard and a display 124 are used by an operator to control and program the overall series of processing operations which are performed by the card processing system 100 on individual cards 114 which are selected from the card supply stations 110 and collected after processing in the card collection stations 112. Each of the card supply stations 110 has a picker 126 which is illustrated in FIG. 7 which may be of conventional construction which selects an individual card 114 from a stack of cards 134 at its associated card supply station 110 which moves the selected individual card through an opening 127 in the back of the card supply station as illustrated in FIG. 8 to an infeed side 138 of the transport path 108. The feeding of cards along the transport path 108 is discussed in more detail below. The control terminal 120 permits the operator, data inputs to the control terminal or data within the card files to be processed to selectively program individual card processing formats for the cards which are supplied from the individual card supply stations 110. The formats may include processing operations performed by some or all of the card processing stations 106 on the individuals cards 114 as they are selected from the plurality of card supply stations 110 and transported along the transport path 108 to the outfeed side 140 of the transport path where the individual cards are selectively collected in a specified one of the card collection stations 112 in accordance with the card processing formats controlling embossing of cards selected from the card supply stations. The individual cards 114 at the card collection stations 112 are pushed upward by a paddle mechanism 128 described in more detail below which reciprocates vertically upward when a card is directly below the bottom opening of the individual card collection station in which the card is to be collected to force it upward into the collection magazine 158 as described below. The upward movement of the paddle mechanism 128 forces the card past a pair of compliant members described below which project into the cross sectional area of one of the magazines 158 held by collection station magazine holder 156 which are located at each of the card collection stations 112 into the bottom of the stack of cards 132.

The programmability afforded to the operator of the control terminal 120 to selectively pick individual cards 114 from the bottom of the stack 134 of card blanks in each of the card supply stations 110 enables multiple card processing jobs to be simultaneously or serially processed with different card processing formats without the shutting down of the card processing system 100. For example, stacks 134 of individual cards 114 may be placed in different ones of the card supply stations 110 for processing by unique card processing formats dedicated to a particular bank's card embossing and processing requirements. As a result, card processing operations involving differing numbers of cards may be simultaneously processed by the card processing system 100 under the programmable control of the control terminal 120 as specified by the operator or otherwise. Alternatively, while one card processing job involving cards contained in one of the card supply stations 110 is being processed the operator of the control terminal 120 may simultaneously program the subsequent card processing job to be performed on cards selected from the stack of cards 134 in the other card supply stations 110 without loss of throughput of the one card processing job. While as illustrated the number of card supply stations 110 and card collection stations 112 is equal in number, it should be understood that differing numbers of a plurality of card supply stations 110 and card collection stations 112 may be utilized in the practice of the invention.

The individual card processing stations 106 may be, for example, without limitation a magnetic stripe encoder, a top side printer to print photographic or images or graphics, an embosser, and a topper all as commercially sold by the assignee of the present invention as stand alone units or alternatively as part of credit card embossing systems such as used in the assignee's ADVANTAGE™ embossing system as described in U.S. Pat. No. 4,969,760. The present invention is not limited to any particular choice or type of card processing stations 110 and as described below in FIG. 20 the frame of the card processing system 100 may be varied in length along the transport path 108 to accept a variable number of card processing stations 106 which provides modular expansion and contraction of the card processing system as the needs of the user change or as additional technologies or card processing operations are developed which may be implemented at individual card processing stations as cards are moved along the transport path. Details of a preferred form of an embosser 380, magnetic stripe encoder 420, "smart" card encoder 330, and topper 430, which are not illustrated in the card processing system 100 in FIGS. 4 and 5, are described in more detail below. The housing 136, which includes the cover lid 102, covers the expandable frame of the invention as described below in FIG. 20.

Figure 6:
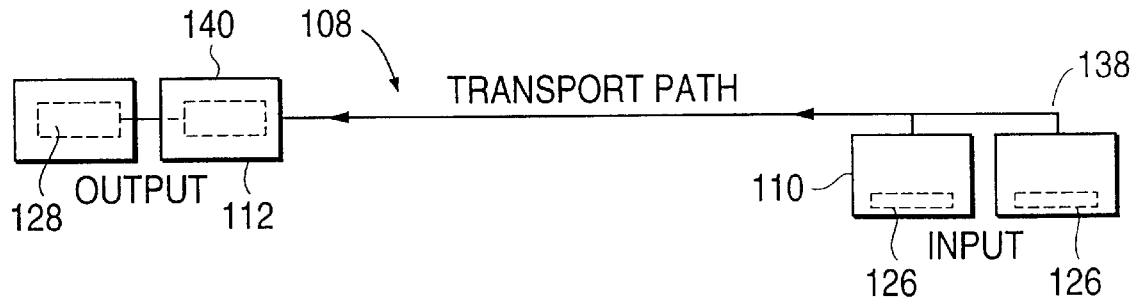
FIG. 6 illustrates a diagram of the transport path of the present invention.

FIG. 6 illustrates the overall transport path 108 of the present invention which extends from the infeed side 138 adjacent the back side of the card supply stations 110 from which individual cards 114 are selectively picked by the activation of the individual pickers 126 as controlled by the programming of the control terminal 120. The individual cards 114 are transported along the transport path 108 by the control of the individual card transport mechanisms 180 as described below under the overall system control provided by the control terminal 120 to convey the cards to the outfeed side 140 where the individual cards are collected in the card collection stations 112 by the activation of the paddle mechanism 128 to force the cards from a position along the transport path 108 vertically in line with the opening in the bottom of one of card collection stations 112 up into the magazine 158 thereof. Each of the card processing stations 106 contains motors for activating infeed and outfeed drivers, carriage translation movements and movements required to perform the various unique card processing functions performed by each of the card processing stations 106 as described below.

Figure 21A:
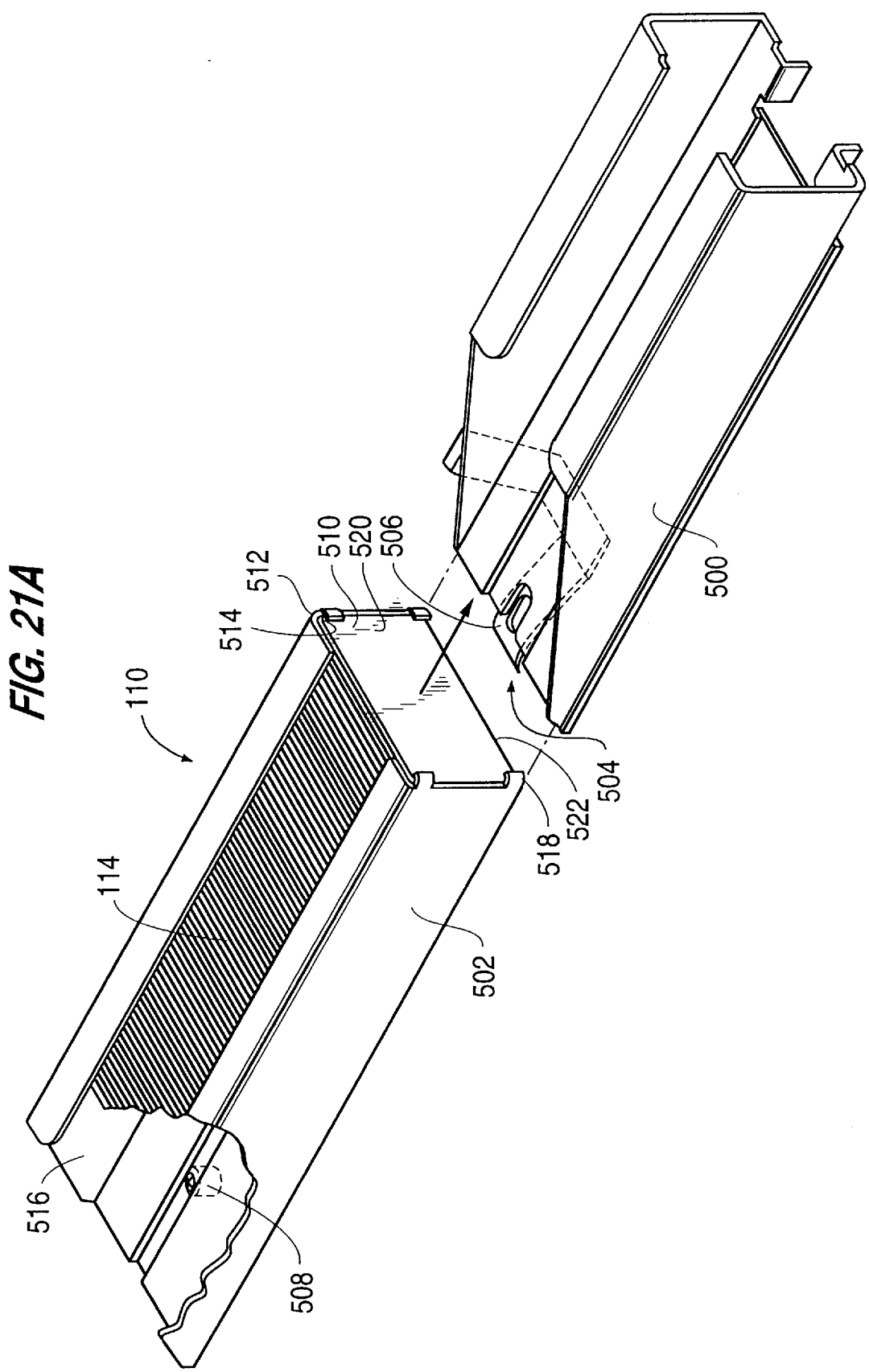
FIGS. 21A and 21B illustrate the method of loading cards from a card supply box into the card supply station magazine of the present invention.

FIGS. 7 and 8 illustrate in detail the mechanism for picking individual cards 134 held within the card supply stations 110 and supplying them to the infeed side 138 of the transport path 108. In FIG. 7 the picker 126 reciprocates from the position as shown backward toward the infeed side 138 of the transport path 108 to deliver an individual card thereto. The picker 126 has a lip which grabs an edge of the bottom card in the stack of cards 134 to force the bottom card backward toward the infeed side 138. Each card supply station 110 is comprised of a magazine holder 500 and a magazine 502 which are described in more detail below. The magazine 502 is removably mounted in the magazine holder by a latch (illustrated in FIG. 21A) and contains a plurality of individual cards 114 in a stack of cards 134 held by the card supply station 110. The magazine holder 500 is connected to the card processing system 100 by suitable fasteners 146. As is described in detail below, the magazine 502 has an opening at the bottom thereof (illustrated in FIG. 21A) for passing individually cards 114 which are picked by the picker 126 for movement to the infeed side 138 of the transport path 108.

FIG. 8 illustrates the infeed side 138 of the transport path 108 which receives individual picked cards from the card supply stations 110. Activation of the picker 126, which reciprocates toward the back of FIG. 7 and from right to left in FIG. 8, causes an individual card 114 to be passed through opening 127 to channel 148 which is formed by the backside of the individual card supply stations 110 and vertical members 149 which are part of a infeed drive mechanism. The infeed drive mechanism 150 is split in two parts with each part having pairs of opposed power driven rollers 152 which are driven by motor 151 which are activated by timed commands from the control terminal 120. The motor 151, within the two parts of the infeed drive mechanism 150, is activated to move the individual cards 114 from the infeed side 138 to the first of the card processing stations 106 wherein the individual card transport mechanism 180 of each card processing station are sequentially activated in a timed sequence under the control of the processor within the control terminal 120 to move the individual cards through the card processing stations. The power driven rollers 152 are rubber and contact opposed faces of one of the individual cards 114 from the stack 134 with the bottom face of the card being supported by a channel base 154. Rotation of the rollers 152 moves the individual cards 114 from the top toward the bottom of FIG. 8 where the card is transferred from the infeed side 138 to the card transport mechanism 180 of the first card processing station as described below in detail.

Figure 9:
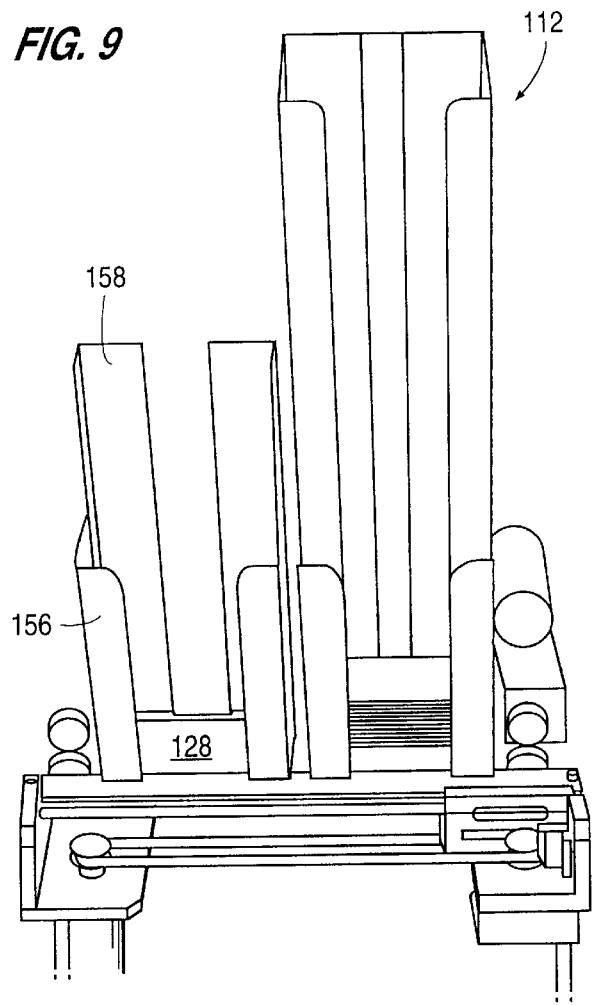
FIG. 9 and FIGS. 10A–C illustrate views of the card collection stations and method of operation thereof.
Figure 10B:
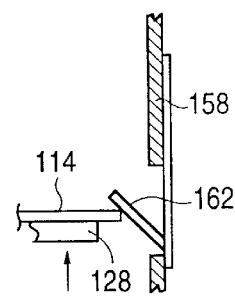
Figure 10A:
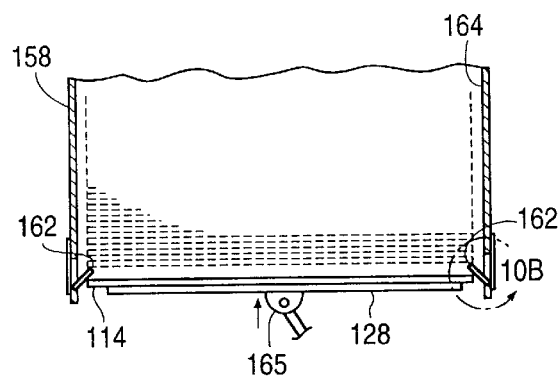
Figure 10C:
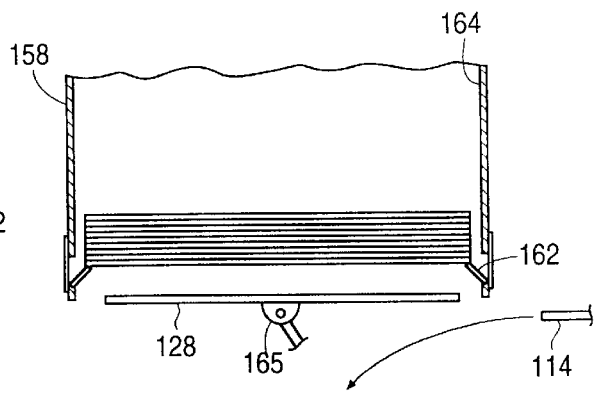

FIGS. 9 and 10A–C illustrate details of the outfeed side 140 of the transport path 108 including the individual card collection stations 112. Each card collection station 112 is similar in construction to the card supply stations 110 and comprises the magazine holder 156 and a removable magazine 158 which receives the individual cards 114 which have been processed without detected error. The magazine holder 156 is attached to the card processing system 100 with suitable fasteners (not illustrated). The paddle 128 in the bottom of the left hand card collection station 112 in FIG. 9 is positioned to force an individual card 114 on the top surface thereof after card processing without error into the magazine 158 as illustrated in FIGS. 10A and B. The magazine 158 has a pair of springy metal members 162 which project inward from opposed sides 164 of the collection station magazine 158 into the bottom of the cross sectional area through which the individual cards 114 are forced upward into the card collection magazine by the paddle mechanism 128. The paddle mechanism 128 is connected to a cranking mechanism 165 which permits it to be moved upward from the position as illustrated in FIG. 10A to force individual cards 114 which are resting on the top surface thereof past the springy metal members 162 into the bottom of the collection station magazine 158. FIG. 10C illustrates the paddle mechanism 128 moved upward by the cranking mechanism 165, prior to a card 167 being transported to a position underneath the individual card collection station, to permit an erroneously processed card to drop below the individual card collection station 112 into a reject area.

Figure 11A:
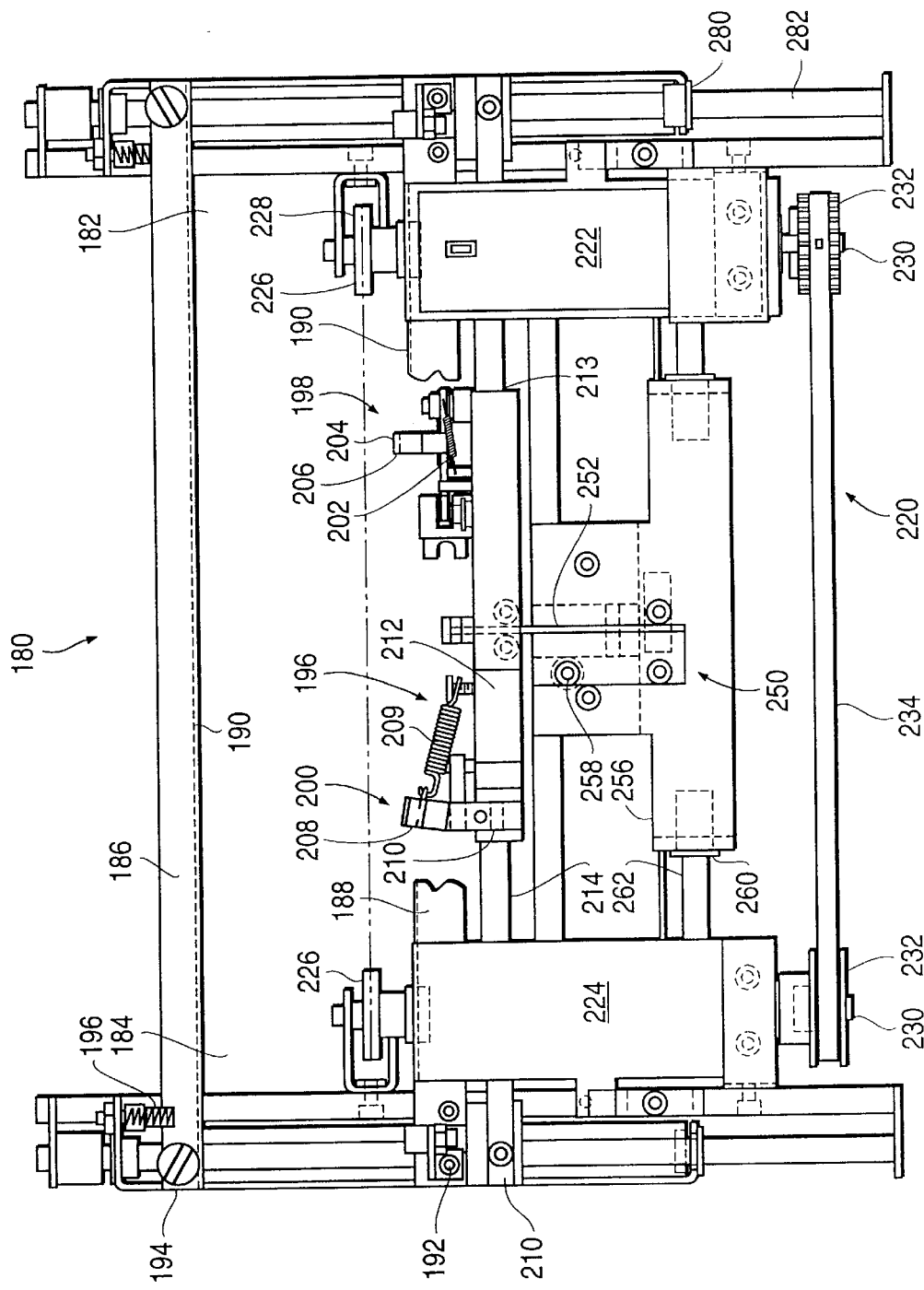
FIGS. 11A–D illustrate respectively a top plan view, a front elevational view, a left side elevational view and right side elevational view of a card transport mechanism in accordance with the invention.
Figure 11B:
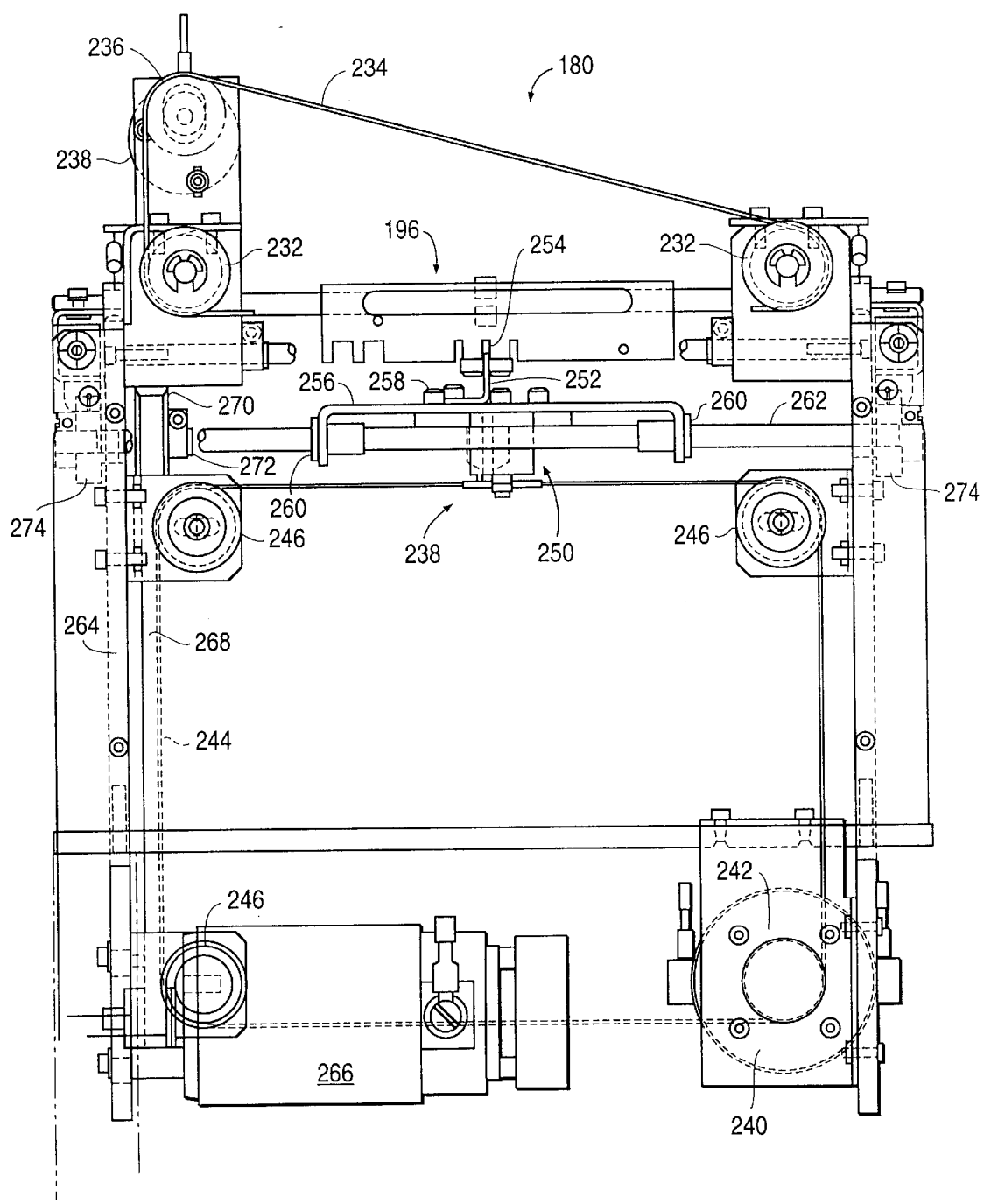
Figure 11C:
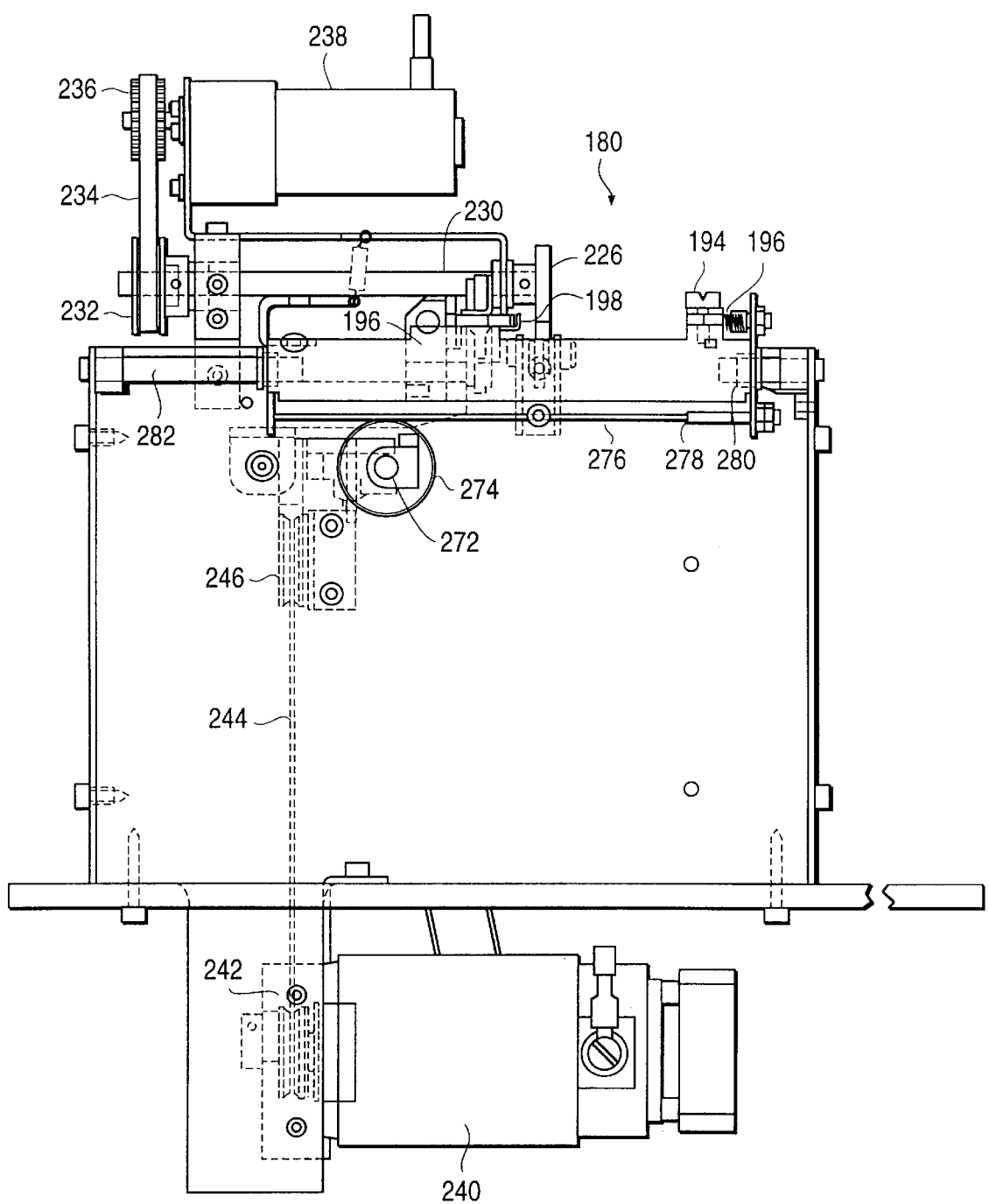
Figure 11D:
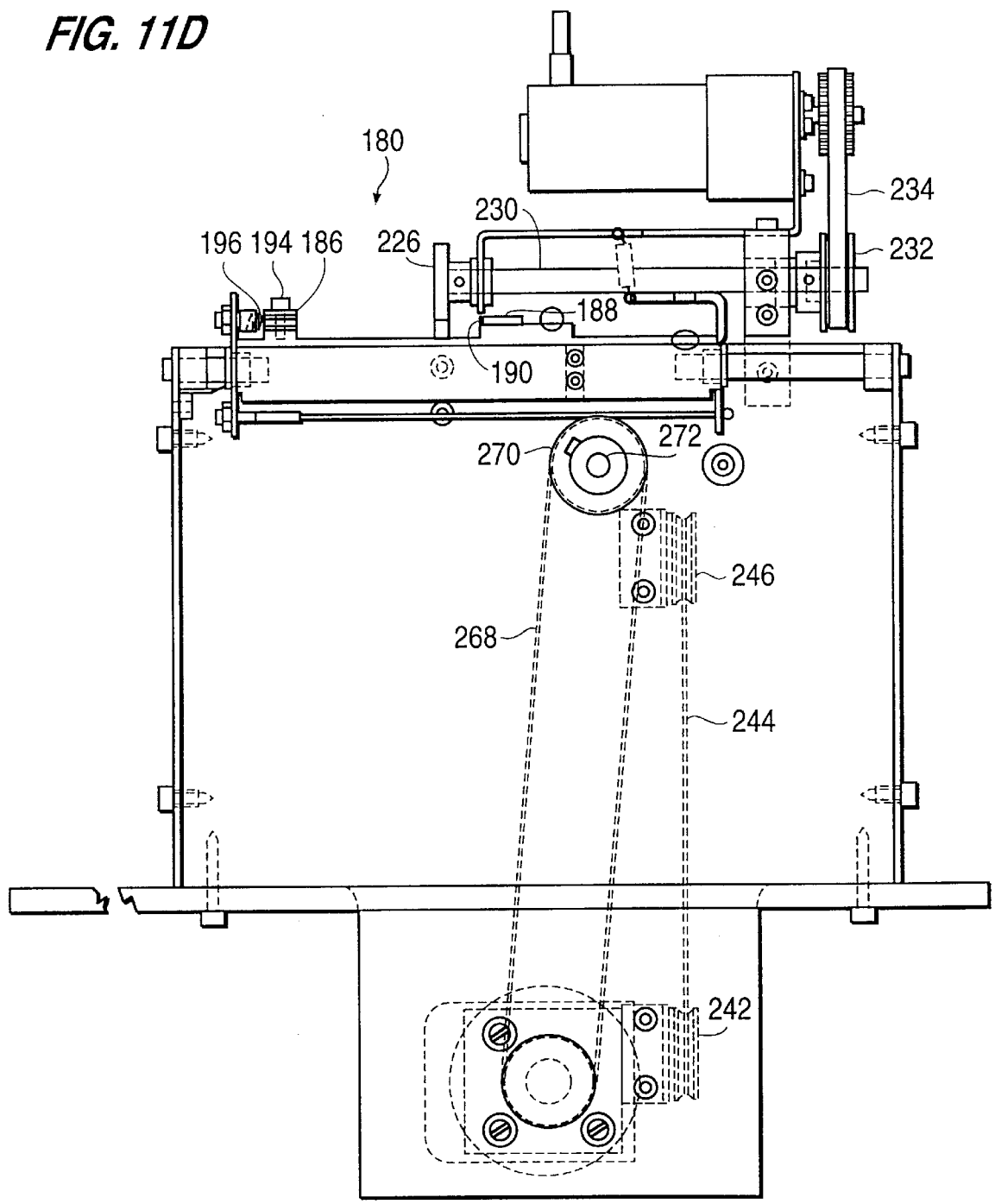

FIGS. 11A–11D illustrate a card transport mechanism 180 which is preferably used to transport individual cards through individual card processing stations 106 in the card processing system 100. FIG. 11A illustrates a top view of the card transport mechanism; FIG. 11B illustrates a rear elevational view of the card transport mechanism; FIG. 11C illustrates a left side elevational view of the card transport mechanism; and FIG. 11D illustrates a right side front elevational view of the card transport mechanism 180. The card transport mechanism 180 is used to transport individual cards 114 along the card transport path 108 by passing each card from an infeed side 182 to an outfeed side 184. It should be understood that the individual card processing stations 106 perform different functions with the card transport mechanism 180 being a sub assembly thereof which does not include specific card processing devices such as a card embosser as described above. A pair of spaced apart channels 186 and 188, which are part of an elongated strip, have grooves 190 which receive opposed edges of individual cards 114 as they are transported between the infeed side 182 and the outfeed side 184. Depending upon the use of the card processing station 106 which contains the card transport mechanism 180, one of the pair of channels 186 and 188 is fixed in position relative to the carriage support as described below to provide a datum position for card processing operations. As illustrated, channel 188 is fixed in position by fasteners 192 and the other channel 186 is moveable orthogonally relative to the fixed channel. An elongated slot (not illustrated) extends orthogonally to channel 186 underneath fasteners 194 to permit movement in the aforementioned orthogonal direction relative to the channel 188. Springs 196 apply a biasing force to the moveable channel 186 to force an inner edge containing groove 190 toward the fixed channel 188. The springs 196 function as a mechanism for biasing the channel 186 toward the channel 188 to force an edge of the card engaged in groove 190 of channel 188 to the datum position for card processing operations. Establishing of a datum position for card processing operations such as encoding of a magnetic stripe on a credit card blank and embossing of characters on a credit card blank is important to satisfy user requirements.

Figure 12:
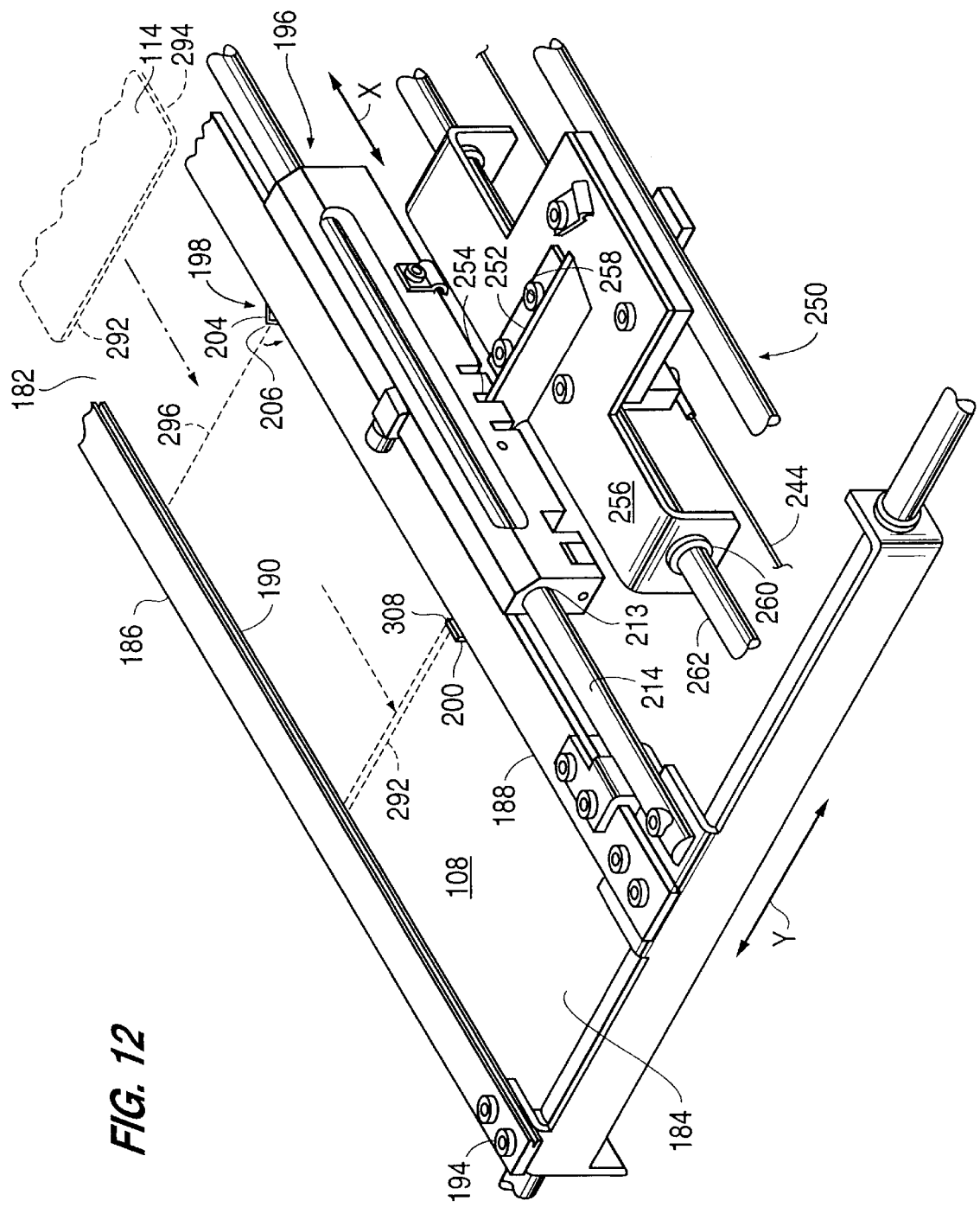
FIG. 12 illustrates the operation of the card transport mechanism of the present invention.

A carriage 196 is provided for holding cards at a fixed position relative to the carriage during motion along the transport path. The carriage has a first card contacting element 198 located closer to the infeed side 182 and a second card contacting element 200 located closer to the outfeed side 184. Each of the card contacting elements 198 and 200 project into the transport path 108 which is located in a plane between the grooves 190 and the channels 186 and 188. The card contacting elements 198 and 200 contact and hold a card in a fixed position during motion of the carriage 196 along the transport path as illustrated in FIG. 12. The first card contacting element 198 is compliant to move orthogonally from within the transport path during initial motion of a card along the transport path 108 to a point where a top edge 204 of the first card contacting element 198 is rotated downward below the transport path as the card moves toward the outfeed side 184 past the first card contacting element. Spring 202 biases the first card contacting element 198 to a home position with tip 206 extending into the transport path 108. The first card contacting element 198 is pivotally attached to the carriage to provide pivoting around an axis (element 302 in FIG. 13B) perpendicular to opposed edges of the card and perpendicular to the transport path 108. The first card contacting element 198 has the edge 204 which slopes upward to the tip 206 which faces the second card contacting element 200. The tip 206 extends into the transport path 108 when a card is not moving in the channels 186 and 188 past the first card contacting element 198. The tip 206 rotates from extending into the transport path 108 against the biasing force applied by spring 202 during movement of the card 114 past the first card contacting element 198 until after engagement by the second card contacting element 200 with a leading edge of the card. The tip 206 rotates back into the transport path 108 to cause a leading edge of the first card contacting element 198 to contact the trailing edge of the card (296 in FIG. 12) to complete the holding of the card in a fixed position in the carriage 196. The second card contacting element 200 is compliant along the transport path 108 in the direction toward the outfeed side 184 and has a first pivot axis 208 attached to the carriage 196 for pivoting the second card contacting element to provide pivotal movement of the second card contacting element along the transport path 108 after engagement with a leading edge (292 in FIG. 12) of the opposed edges of the card 114 to accommodate cards of varying longitudinal dimensions. The second card contacting element 200 is also compliant in a direction orthogonal to the transport path 108 and also has a second pivot axis 210 for pivoting the second card contacting element orthogonally relative to the transport path. A cam (element 300 in FIG. 13B discussed below) is disposed at a fixed position along the transport path 108 in proximity to the outfeed side 184. The second card contacting element 200 pivots orthogonally relative to the transport path 108 for pivoting the second card contacting element from engaging the leading edge 292 of the card 114 in the transport path to a position out of the transport path in response to contact of a part of the carriage with the cam 300 during movement of the carriage along the transport path to free the leading edge of the card from being contacted by the second card contacting element and to free the card for movement along the pair of channels 186 and 188 past the second card contacting element.

As described, the card transport mechanism 180 has a carriage 196 including the first card contacting element 198 and the second card contacting element 200 which is used in applications for transporting cards 114 through card supply stations 106 where it is necessary to locate the card at a fixed position relative to the carriage such as movement which occurs during embossing of a card or recording and reading information recorded on a magnetic stripe of a credit card blank. These operations require movement forward and backward along the transport path 108 which necessitates precise holding of the card 114 by the carriage 196 because of the high dimensional locational tolerances which are necessary for successful embossing of characters on cards and recording of magnetic information on the magnetic recording stripe (408 in FIG. 17A) of a credit card blank.

In other applications in which it is not necessary to move a card 114 in both forward and backward directions along the card transport path 108, the second card contacting element 200 and the cam 300 may be eliminated. This modification converts the carriage into a pushing device which only moves the card in one direction along the X axis. The friction between the grooves 190 of the channels 186 and 188 in this application is relied upon to stop the card 114 instantaneously as soon as motion of the carriage 196 is stopped. Card processing stations 106 which require the carriage to only function as a pushing device are stations such as a topper or a picture printing station.

A carriage support 210 is connected to the carriage 196 for guiding the carriage along the transport path 108. As illustrated, the carriage body 212 has aperture 213 which receives the elongated carriage support in the form of a rod 214 of circular cross section to guide the carriage 196 along the transport path.

The card transport mechanism 180 has a drive mechanism 220 for propelling the carriage 196 along the transport path 108 between the infeed side 182 and the outfeed side 184 and to return the carriage to the infeed side to position the carriage to hold another card 114 with the first and second card contacting elements 198 and 200 or alternatively to push the card using only the first contacting element 198 with the second card contacting element having been eliminated. The drive mechanism 220 includes an infeed driver 222 disposed on the infeed side 182 of the pair channels 186 and 188 for propelling the card 114 along the transport path 108 into engagement with at least the first card contacting element 198 and the second card contacting element 200 when holding of cards is required. An outfeed driver 224 is disposed on the outfeed side 184 of the channels 186 and 188 for propelling the card 114 along the card transport path 108 after disengagement from the second card contacting element 200 when the card is held at a fixed position by the carriage 196 with the first and second card contacting elements 198 and 200 or alternatively for propelling the card along the transport path after disengagement from the first card contacting element when the carriage is used to push the cards along the transport path. As will be described in detail below, the processor within the control terminal 120 controls the overall activation of the drive mechanism 220 and the infeed and outfeed drivers 222 and 224.

The drive mechanism 220 includes two pairs of rollers 226 which are respectably disposed on the infeed side 182 and the outfeed side 184 above and below the card transport path 108 such that an outer peripheral surface 228 of each roller is in rolling contact with a card 114 as it is being moved at the infeed side 182 and the outfeed side 184. Each of the rollers 226 is rotatably mounted to roll freely with movement of the card 114 in only one direction from the infeed side 182 to the outfeed side 184. The top rollers 226 at the infeed side and the outfeed side are attached at one end of a shaft 230. The other end of the shaft 230 at both the infeed side 182 and the outfeed side 184 is attached to a one way clutch 232 which permits rotation of the shaft 230 in only the direction which will permit the card 114 to move from the infeed side 182 to the outfeed side 184. Belt 234 is attached to pulley 236 which is driven by a motor 238 to rotate the top rollers 226 upon receiving of an activation signal under the control of the processor in the control terminal 120 to move a card 114 located at the infeed side 182 into engagement with at least the first card contacting element 198 so as to permit the carriage 196 to push the card or further to be held by the first card contacting element 198 and the second card contacting element 200 to permit the carriage 196 to move the card which is held in the card contacting elements in opposite directions along the transport path 108.

The control mechanism 238 for controlling motion of the carriage 196 along the X axis parallel to the transport path 108 is described as follows. Motor 240 is controlled by the processor within the control terminal 120 to selectively move the carriage 196 when processing requirements require the card 114 to be moved along the X axis parallel to the transport path 108. The motor 240 has a pulley 242 which drives cable 244 in an endless fashion around pulleys 246. The cable 244 is attached to a Y axis translation mechanism 250 to be described below. The Y axis translation mechanism 250 has an upwardly projecting blade 252 which fits snugly within a vertical slot 254 such that as described below the Y axis translating mechanism 250 may move orthogonally to the slot 254. The tightness of the fit between the vertical blade 252 and the vertical slot 254 prevents play along the transport path 108 when the carriage 196 is being moved along the transport path 108 along the X axis by movement of the Y axis translation mechanism 250 parallel to the transport path when pulley 242 of motor 240 drives the cable 244.

The Y axis translation mechanism 250 is used for applications such as an embosser which requires the carriage 196 to be selectively moveable to sets of X and Y coordinates to define new character embossing positions on the card 114. The Y axis translation mechanism 250 has a generally U-shaped member 256 to which the aforementioned blade 252 is attached by fasteners 258. The U-shaped member 256 has a pair of apertures 260 which are circular in cross section and which engage a guide rod 262 which is attached to the sides 264 of the card transport mechanism 180. The guide rod 262 provides a sliding surface which supports the U-shaped member 256 sliding motion along the X axis to drive the carriage 196 along the X axis through the contact between the vertical blade 252 and the vertical slot 254. Motor 266, which is activated under the control of the processor within the control terminal 120, drives a pulley 266 which engages belt 268 which drives pulley 270 to drive shaft 272 which drives pulley 274 which is connected to cable 276. The cable 276 is connected to a frame 278, which has an aperture 280 which slides along rod 282, to provide translation along the Y axis to move the carriage 196 along the Y axis.

FIG. 12 illustrates an operational sequence of a card 114 as it moves from the infeed side 182 toward the outfeed side 184 in the grooves 190 of the elongated channels 186 and 188. As may been seen, the leading edge 292 of the card 114 first contacts the lowest portion of the edge 204, which as the card 290 continues to move toward the outfeed side 184, forces the first card contacting element 198 to rotate out of the transport path 108. As the leading edge 292 moves past the tip 206, the tip 206 rides on the bottom face 294 of the card 114. As the leading edge 292 contacts a trailing edge of the second card contacting element 200 under power supplied by the infeed driver 222, the second card contacting element 200 rotates around the first pivot axis 208 to a point at which the trailing edge 296 of the card 114 drops below the tip 206 at which point the card is securely held in a fixed location relative to the carriage 196 between opposed vertical edges of the first and second card contacting elements 198 and 200.

Figure 13C:
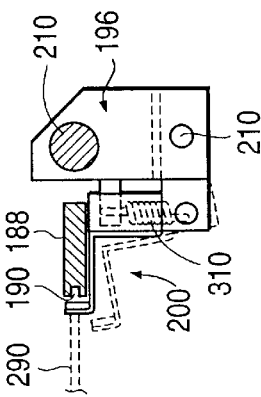
FIGS. 13A–C illustrate respectively a top plan view, front elevational view and sectional view of a carriage in accordance with the present invention.
Figure 13A:
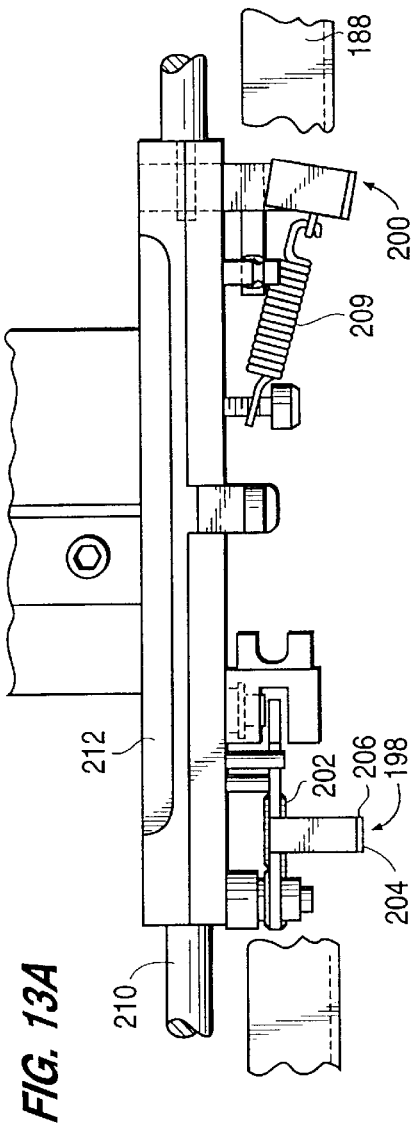
Figure 13B:
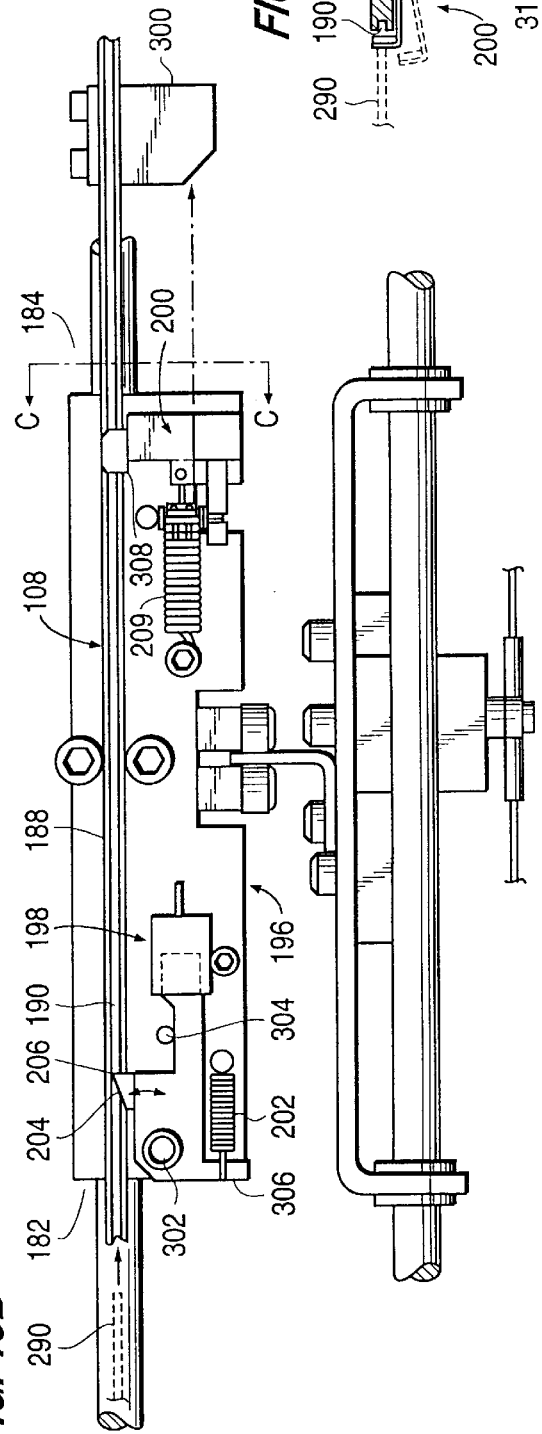

FIGS. 13A–C illustrates respectively an enlarged top view, a front elevational view, and a fragmentary view of the operation of the first and second card contacting elements 198 and 200 and cam 300. In FIG. 13B, the first contacting element 198 is pivotable about axis 302. Spring 202 biases the first card contacting element 198 against stop 304 at a position at which tip 206 extends into the transport path 108. The spring 202 is connected between an extension 306 of the first card contacting element 198 and the carriage 196. The second card contacting element 200, pivots toward the outfeed side 184 against the bias supplied by spring 209 when the leading edge 292 of the card 114 contacts the trailing edge 308 of the second card contacting element 200. In FIG. 13C, the second card contacting element 200 pivots downward from within the transport path 108 around pivot axis 210 to free the leading edge 292 of the card 114 upon contact with the cam 300. At that point, the outfeed driver 224 is activated to propel the card 114 by rotary contact with the pair of wheels 226 outward away from the outfeed side 184. Spring 310 biases the second card contacting element 290 to a position at which it extends into the transport path 108. Similarly, spring 209 biases the vertical trailing edge 308 of the second card contacting element 200 facing toward the leading vertical edge of the first card contacting element 198. Pivoting of the second card contacting element 200 along the X axis toward the outfeed side 184 permits individual cards 114 of less than perfect longitudinal dimensional tolerances to be firmly held in the first and second card contacting elements 198 and 200 precisely as a consequence of compliance of the second card contacting element along the transport path 108 toward the outfeed side 184. As discussed above, the first and second card contacting elements 198 and 200 are compliant in one and two directions respectively to move within and outside of the transport path 108 defined by the plane between the grooves 190 in the opposed elongated elements which form the channels 186 and 188. Furthermore, it should be understood that either of the channels 186 or 188 may be used as a fixed datum with the other channel being movable orthogonal thereto.

Figure 14B:
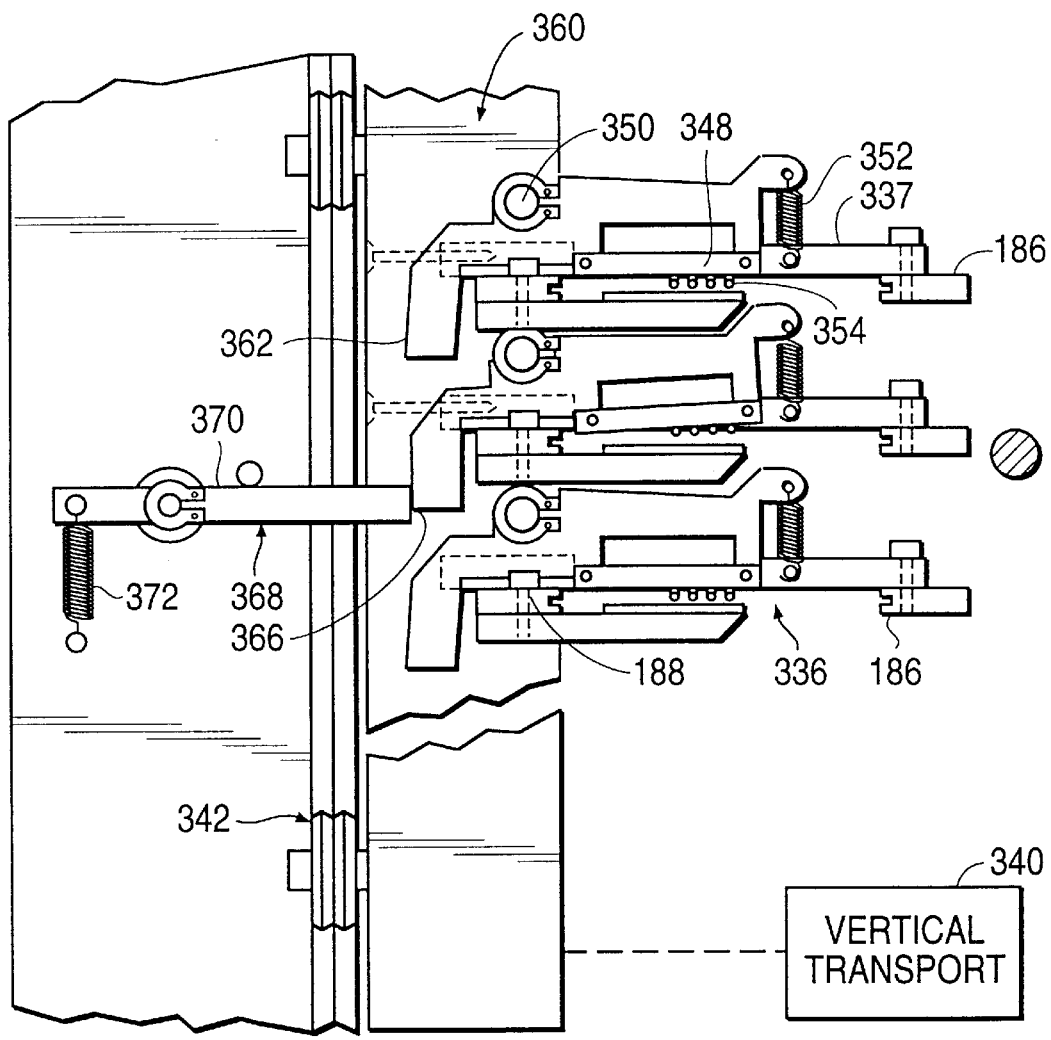
FIGS. 14A and B illustrate respectively a top plan view and a side elevational view of a smart card encoder in accordance with the present invention.
FIG. 14C illustrates a plan view of a smart card.
FIG. 14D illustrates a schematic view of the operation of the encoder for programming the memory of a group of smart cards in accordance with the present invention.
Figure 14C:
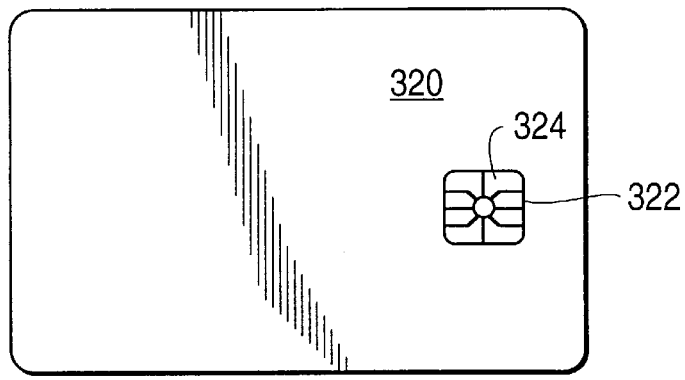

FIGS. 14A–14D illustrate an encoder 330 for programming "smart" cards which contain an integrated circuit memory (PROM). As illustrated in FIG. 14C, a smart card blank 320 has the same shape, size and dimensions as a conventional credit card. An external contact area 322 is comprised of a plurality of insulated segments 324 that are individually connected to an integrated circuit memory of the PROM type which is contained within the plastic material from which the smart card is fabricated. It should be understood that the smart card 320 as illustrated in FIG. 14C is conventional and well known in the art. The configuration of the smart card itself including its contact area 322 is not part of the present invention. The encoder 330 provides a card buffer for holding a plurality of smart cards in a vertical array for an extended time interval during which programming of each individual smart card integrated circuit memory is performed simultaneously. The only time during which it is not possible to program the plurality of smart cards 320 which are held in the vertical array is when the cards are being moved into and out of the array as described below. The encoder 330 is based upon a modification of the card transport mechanism 180 described above, and has many elements in common. The common elements will not be described in detail. As viewed from the top, a card transport guides the cards along the transport path 108 from the infeed side 182 to the outfeed side 184. An infeed driver 222 and an outfeed driver 224 operates in the same manner as described above in conjunction with the card transport mechanism 180 to selectively propel cards 320 from the infeed side 182 along the transport path 108 and from the outfeed side 184 along the transport path 108. Carriage 196 is of a similar construction to that described above in conjunction with the card transport mechanism 180 except that it is shorter in length and contains only a first card contacting element 198 as described above because a card pushing function is used to move the cards along the transport path 108. The first card contacting element 198 operates in the same manner as described above when a card is moved along the transport path 108 in the channels 186 and 188 within grooves 190. The friction between the card and the grooves 190 is sufficient to stop card movement as soon as the carriage 196 is stopped.

The encoder 330 has a first section 331 which extends from the infeed side 182 to close to a midpoint of the card transport. The first section 331 is fixed in position in a horizontal plane by attachment to a support frame by suitable fasteners 332 which are connected to an underlying frame 334. A second section 336 contains a plurality of card receiving sections 337 which are vertically separated and function as the buffer for holding individual cards for an extended programming time period. The number of card receiving sections 337 is chosen to permit the storage of a number of cards 320 which are sufficient to permit individual cards to be moved along the transport path 108 at the desired throughput while providing sufficient time to program the memory in each card when held in the card receiving sections. The larger the number of card receiving sections 337, the higher the throughput of the card encoder 330 for any given required time to download the data to be stored in the integrated circuit memory of the cards 320 under the control of the processor in the control terminal 120. A third section 338 is mounted in a fixed position on the outfeed side 184 in line with the infeed side. A vertical transport 340, which may be any suitably accurately controlled drive mechanism such as a rack and pinion (not shown) under the control of the processor in the control terminal 120, translates the individual card receiving sections 337 vertically to be in line with the first section 331 and the third section 338 to permit the carriage 196 to move a card into the individual card receiving section 337 in line with the first and third sections while pushing out the card 320 which was previously in the individual card receiving section in line with the first and third sections after the programming of the memory therein is complete. The vertical transport 340 as illustrated in FIG. 14A includes a pair of grooved bearings 342 which ride on a stationary rail 344.

An electrical contact assembly 346 is connected to the second section 336 and has a plurality of electrical contactors 348 which are pivoted about axis 350. A spring 352 associated with each individual electrical contactor 348 biases the contactor 348 into a horizontal position at which contact elements 354 engage the individual insulated segments 324 of the external contact area 322 of each card 320 to permit programming information to be transmitted from the processor of the control terminal 120 or a memory associated with the encoder through the contact elements 354 through the insulated segments 324 into storage in the integrated circuit contained in the card 320. Each of the individual electrical contactors 348 are associated with a different one of each of the card receiving sections 337. A wiring harness (not illustrated) connects each of the individual electrical contactors to a data source for providing the individual card records to be programmed into the memory of the card 320 to each of the individual electrical contactors 348 which as described above may be a memory associated with the encoder 330 or the processor of the control terminal 120.

A electrical contactor control mechanism 360 holds each of the electrical contactors 348 in an open position, when the associated card receiving section 337 is in line with the first section 331 and the third section 338, to not contact the external contact area 324 of the card 320 and closes the external contactor from the open position to contact the external contact area of the card in the card receiving section in line with the first and third sections as the card receiving section associated with the opened electrical contactor is moved vertically from being in line with the first and third sections. In FIG. 14B the middle electrical contactor 348 is in the open position and the top and bottom electrical contactors are in the closed position. The mechanism 360 includes a cam surface 362 which slopes down and to the left in FIG. 14B.

The cam surface 362 engages an end 366 of actuator 368 as the second section 336 is translated vertically upward which causes the individual electrical contactor 348, which functions as a clamp which is normally in the closed position as the result of the force applied by spring 352, to rotate counterclockwise to the open position to permit a card 320 held in the individual card receiving section 337 in line with the first section 331 and the third section 338 to be pushed out and a new card to be pushed therein under the action of the carriage 196 moving from the infeed side 182 toward the second section 336. The actuator 368 contacts the movable clamp structure of the individual electrical contactors 348 which pivots about pivot 350 as the second section 336 is moved vertically in a first upward vertical direction causing each electrical contactor 348 to be opened as each card receiving section 337 is moved vertically in line with the first section 331 and the third section 338.

Movement of each card receiving section 337, in a second downward vertical direction, does not open the electrical contactors 348 as each card removing sections is moved vertically in line with the first and third sections because actuator 368 is free to pivot counterclockwise. The actuator 368 includes a pivotally mounted member 370 which is biased to a home position by spring 372, which extends into a path of travel of the plurality of individual electrical contactors 348 during movement of each electrical contactor and an associated card receiving section 337 past the first section 331 and the third section 338 and is rotatable counterclockwise permitting each electrical contactor 348 to remain closed in response to vertical movement of the second section 336 in the second downward vertical direction and to remain at the home position during vertical movement in the first upward vertical direction with contact between the pivotally mounted member and each cam surface 362 of each electrical contactor causing each electrical contactor to open as the associated card receiving section moves in line with the first and third sections.

FIG. 14D illustrates the sequence of card and vertical motions of the plurality of the card receiving sections 337 of the second section 336. Cards are translated along the transport path 108 by the carriage 196 from the infeed side 182 to the outfeed side 184 with the carriage pushing a card 320 from the infeed side 182 into the card receiving section 337 which is in line with the first section 331 and the third section 338 as illustrated in FIG. 14D. The infeed driver 222 propels the card into engagement with the first card contacting element 198. Thereafter, the motor 240 activates motion of the carriage 196 to push the card into the card receiving section 337 and at the same time push the card 320, which is within the card receiving section which is in line with the first section 331 and the third section 338, out of the in line card receiving section of the second section 336 after its programming is complete. The card 320 which has been pushed out of the card receiving section 337 toward the outfeed side 184 is propelled along the card transport path 184 by activation of the outfeed driver 224. Sequentially, the vertical transport 340 indexes the second section 336 beginning with the top card receiving section 341 being in line with the first section 331 and the last section 338. The carriage 196 is sequentially used to load individual cards into each of the card receiving sections 337 after the vertical transport 340 has indexed each empty card receiving section 337 to be in line with the first section 331 and the third section 338. The upward movement of the second section 336 causes each individual contactor 348 to open as the contactor moves past the end 366 which rides on cam surface 362 to position the contactor in the open position as illustrated in FIG. 14B. As each individual card receiving section 337 is moved vertically upward by the vertical transport 340, the contactor 348 closes once the card receiving section 337 has moved above being in line with the first section 331 and the third section 338. As soon as the individual card contactors 348 close, which causes the electrical contact elements 354 to contact the individual insulated segments 324, programming of the integrated circuit memory within the individual cards begins. The vertical transport 340 and the carriage 196 are sequentially activated to move the second section 336 upward until the bottom card receiving section 343 contains a card. Immediately thereafter, the vertical transport 340 moves the second section 336 all the way to the bottom so that the top card receiving section 341 is now again in line with the first section 331 and the third section 338. The process of sequentially loading individual card receiving sections 337 in a vertical upward direction again repeats which now results in the cards 320 which have been resident in the vertically separated individual card receiving sections 337 being pushed out after their programming is complete toward the outfeed side 184 where the activation of the outfeed driver 224 causes the cards to be propelled along the transport path 108. As can be seen from this mode of operation, programming of the integrated circuit memory within the individual card 320 may be continuously accomplished for the time interval required to sequentially load each of the individual card receiving sections 337. Therefore, a high throughput of programmed cards may be achieved while at the same time providing the substantial time required to program the individual circuit memories within each card 320 by holding the cards in the individual card receiving sections as the vertical movement cycle is repeated.

Figure 1:
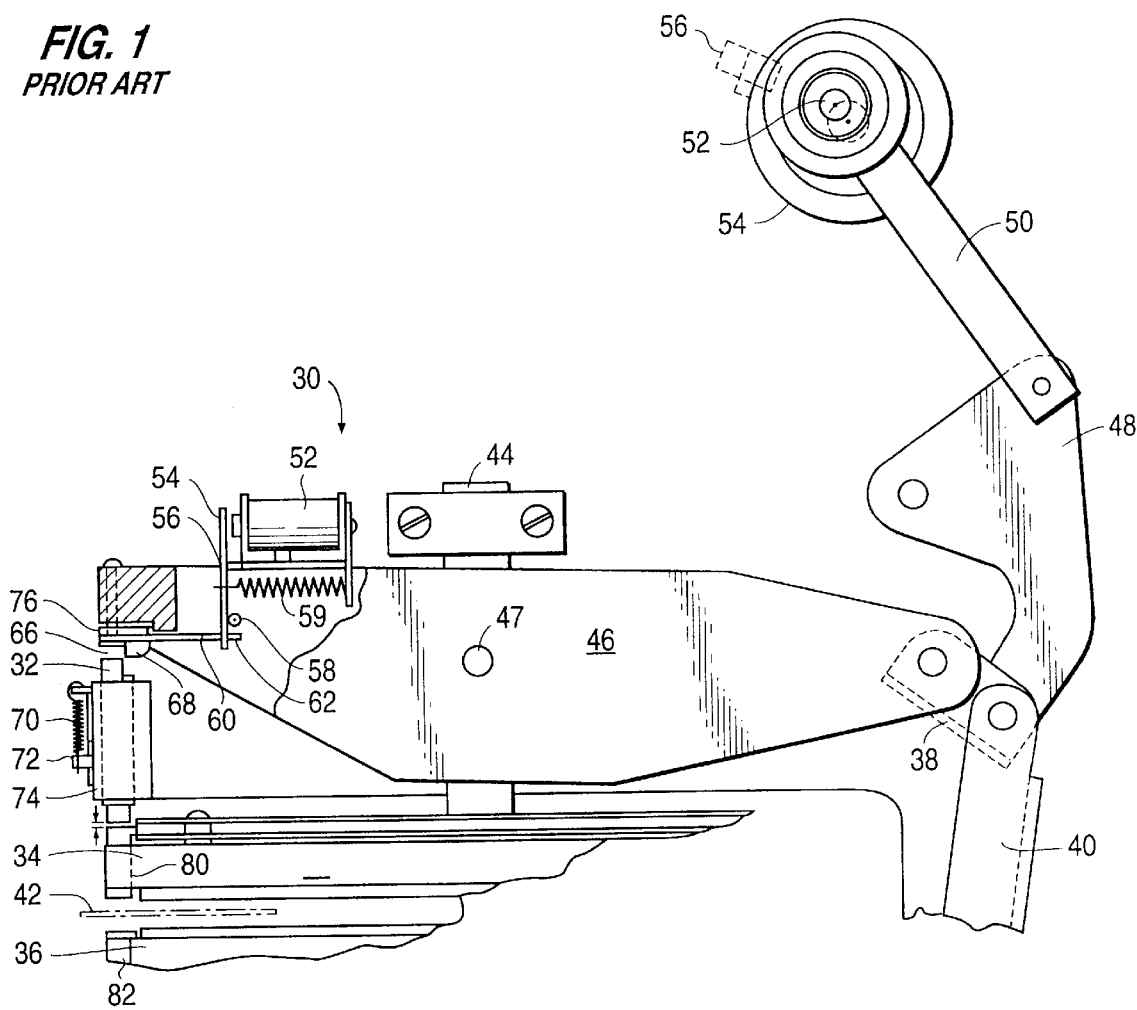
FIGS. 1 and 2 illustrate a prior art embosser disclosed in the assignee's U.S. Pat. No. 4,969,760.
Figure 2:
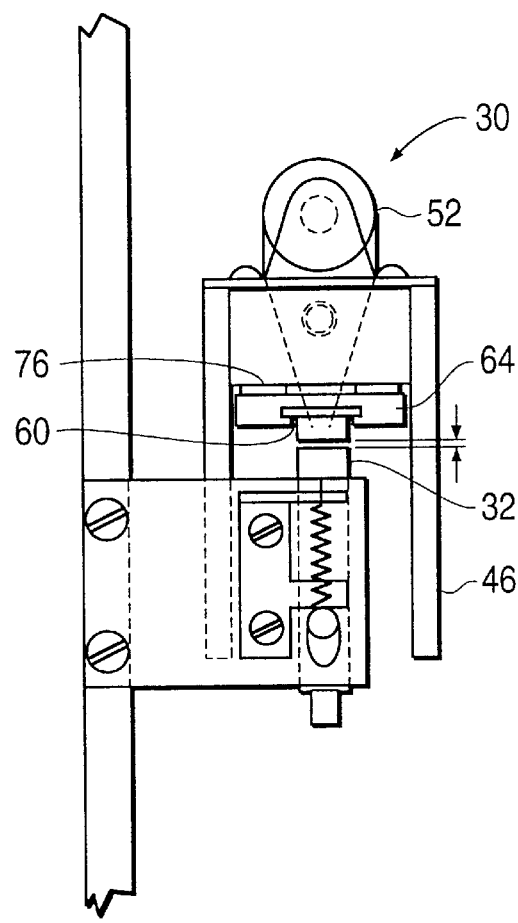
Figure 15:
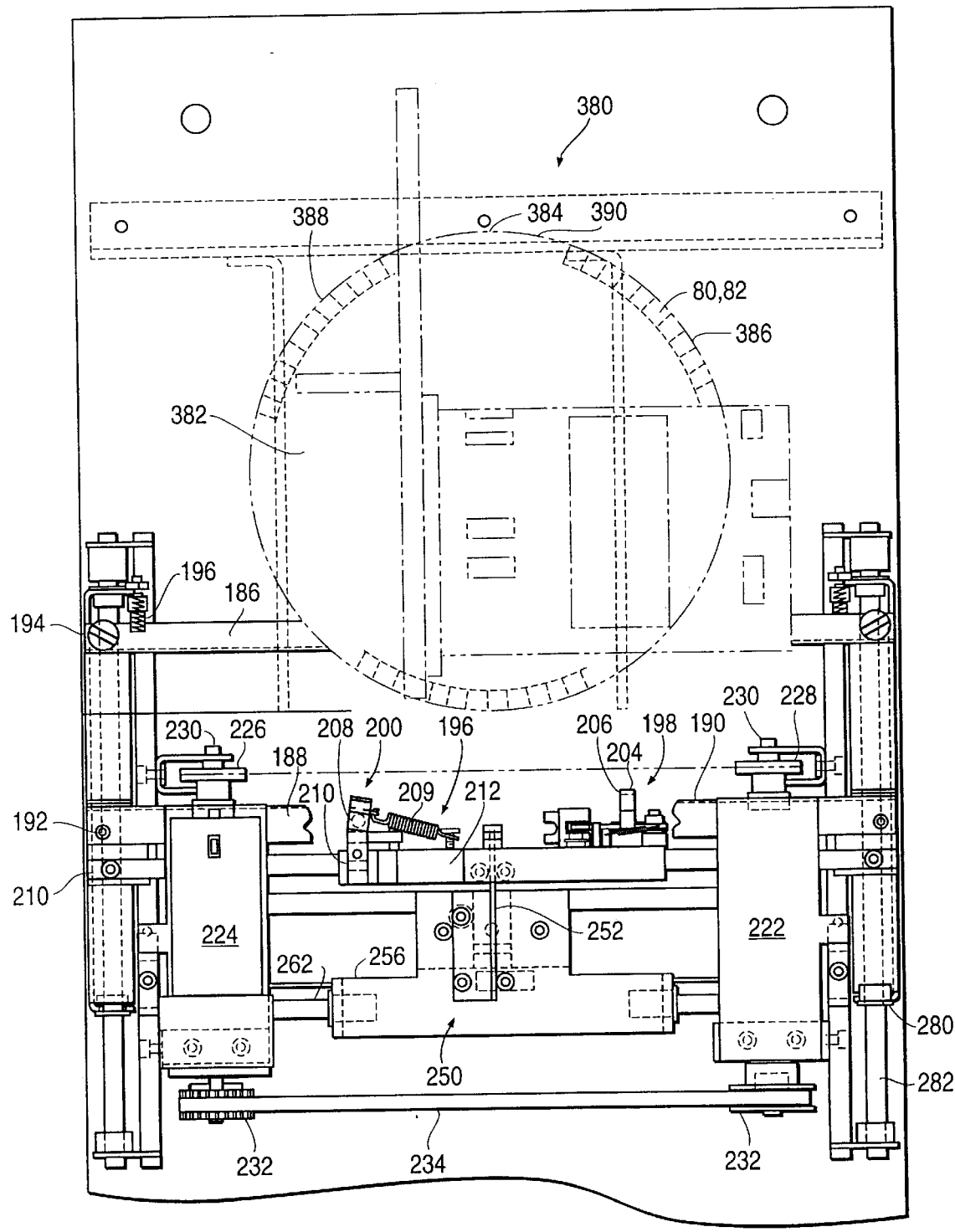
FIG. 15 illustrates a top plan view of an embosser in accordance with the present invention including the transport mechanism of the present invention.

FIG. 15 illustrates a top view of a preferred embodiment of an embosser 380 in accordance with the invention. The embosser wheels 382 are generally in accordance with the prior art of FIGS. 1 and 2 including the interposer assembly which is not illustrated. The difference between the embosser 380 and the prior art of FIGS. 1 and 2 resides its the association with the card transport mechanism 180 as described above as the mechanism for translating cards along an X and Y coordinate axes to position a card 114 held in the carriage 196 for embossing multiple lines of characters, the control of movement of the embosser wheels 382 and the carriage 196 and the sorting of the characters of each card to be embossed into a new order to optimize embossing as described below. The embossing wheels 382 have a plurality of matched pairs of characters 80 and 82. The characters include OCR characters which are 7 pitch, alpha numeric characters which are 10 pitch and punctuation marks which are 10 pitch. The OCR characters are disposed between points 384 and 386 on an arc on the periphery of the wheels 382; the alphanumeric characters are disposed along an arc between points 386 and 388, the punctuation mark characters are disposed on an arc between points 388 and 384. Additionally, so called indent characters and other characters may be disposed around the wheel for indent embossing of characters into the face of the bottom of the card blank as in known etc. Typically, a reference position 390 on the embossing wheels is located between one of the OCR characters disposed between points 384 and 386.

The operation of the embosser 380 to rotate the character wheels 382, which is Z axis movement, and the translation of a card 114 held in the carriage 196 by the first and second card contacting elements 198 and 200 along the X and Y coordinate axes is generally in accordance with the prior art discussed above except that the timing of the beginning of rotation of the wheels 382 along the Z axis and the beginning of the translation of the carriage 196 along at least one of the X and Y axes has been changed as described below in FIG. 16 to substantially improve the throughput of the embosser 380.

Figure 3:
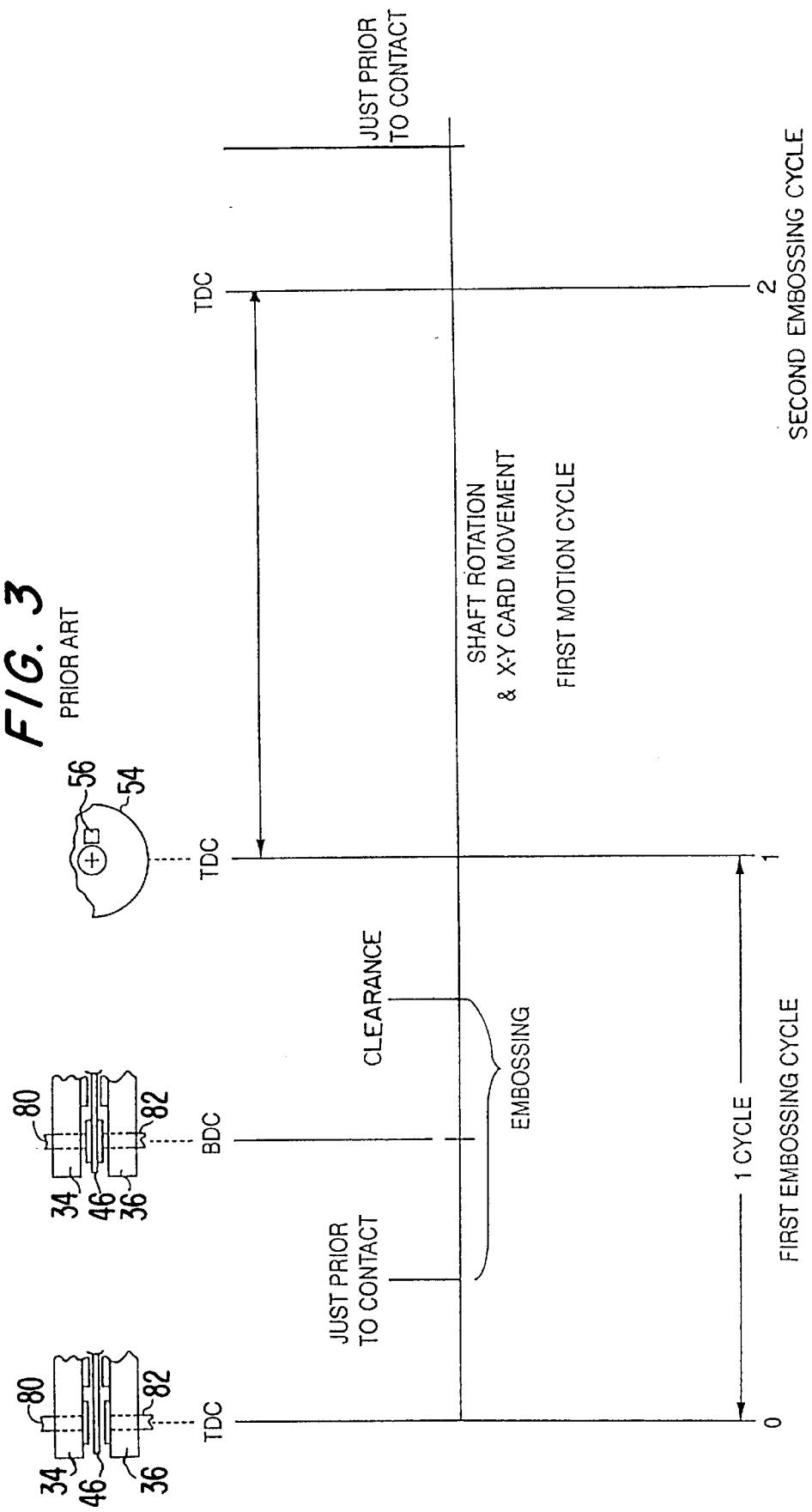
FIG. 3 is a timing diagram of the prior art embosser illustrated in FIGS. 1 and 2.

FIG. 16 illustrates the improved operation of the embosser 380 of FIG. 15. The operation of the embosser of FIG. 16 is an improvement over the prior art of FIG. 3 in that the time period in each embossing cycle between CLEARANCE and TDC in each EMBOSSING CYCLE is used for the beginning of Z axis movement to a next selected character rotary position on the embossing wheels 382 and movement of the carriage 196 to the coordinates of the next character to be embossed. Additional time is available to complete motion from TDC and JUST PRIOR TO CONTACT in the subsequent EMBOSSING CYCLE. In the prior art, these time intervals in the EMBOSSING CYCLES were not used for the Z axis movement of the embosser wheels and/or the carriage which lowered efficiency. Z axis rotation of the embosser wheels 382 and translation of the carriage 196 along at least one of the X and Y coordinate axes may continue as stated above until JUST PRIOR TO CONTACT in the SECOND EMBOSSING CYCLE. Because of the additional time permitted to rotate the embosser wheels 382 and to translate the carriage 196 in each EMBOSSING CYCLE, it is possible to move to additional characters with a given number of EMBOSSING and MOTION CYCLES. In the prior art of FIG. 3, if the distance between successive character positions along the X, Y or Z axes is longer than the distances along the X, Y or Z axes which could be traveled during the FIRST MOTION CYCLE, then the FIRST MOTION CYCLE was ineffective to produce the required distance of movement to the next character position on the embossing wheels 34 and 36 and the movement of the carriage along at least one of the X or Y axes to the coordinates of the next character position. As a result, the time interval to complete motion to the next character at X, Y and Z axes coordinates extends over into an additional MOTION CYCLE which would occur in the time interval marked SECOND EMBOSSING CYCLE in FIG. 3. MOTION CYCLES which are too short to complete the required distance of movement decrease the throughput of an embosser 380 in proportion to the number of MOTION CYCLES in which positioning of the embosser wheels 382 and carriage 196 at the next character in one MOTION CYCLE could not accomplished.

Furthermore, when numerical characters such as OCR characters are being embossed, which typically occur in a credit cards as four groups of four adjacent OCR characters, it is possible with the invention to accomplish the required rotation of the wheels 382 to the next character position and the translation of the carriage 196 to the next X axis character position (no Y axis translation is required when characters are being embossed on the same line) during the time interval between CLEARANCE and JUST PRIOR TO CONTACT which eliminates the requirement for any MOTION CYCLE to follow an EMBOSSING CYCLE. In this circumstance, the time between CLEARANCE in the FIRST EMBOSSING CYCLE and JUST PRIOR TO CONTACT in the beginning of the FIRST MOTION CYCLE are sufficient to complete the requisite embosser wheel rotation and X axis carriage motion. This mode of operation substantially increases the throughput of embossed cards by eliminating a MOTION CYCLE sequenced between adjacent EMBOSSING CYCLES each of one cycle in length as indicated in FIG. 16.

FIG. 17 illustrates an embossed credit card 400 which has been embossed with the embosser 380 of the present invention using a sorting process which orders the individual characters of the card as a function of the rotary position (Z axis) of the individual characters on the embosser wheels 382 with reference to the reference zero rotary position 390 and also as a function of the distance between successive characters measured along the X and Y axes which define the coordinates of motion of the carriage 196. As illustrated, the embossed credit card 400 has a line of OCR readable numerical characters 402, an additional line 404 defining the issue date and expiration of the card and a line 406 of alphanumerical characters which are the name of the card recipient. Finally, the backside of the card has a magnetic stripe 408 which is encoded with a magnetic stripe encoder in accordance with the present invention as described below in FIG. 18. The lines of characters 402, 404 and 406 are embossed by activating of individual matched pairs of characters disposed around the periphery of embosser wheels 382 in a manner as described in conjunction with the prior art of FIGS. 1 and 2 and FIG. 15.

The overall throughput of embossing of the lines of characters 402, 404 and 406 may be optimized in accordance with the present invention by sorting of the characters in a preferred order of embossing. In accordance with the invention, the square boxes 410 containing a number as illustrated in FIG. 17 identify the order in which the individual characters are embossed in accordance with the optimized embossing process of the present invention. Embossing of sequential characters can only be accomplished with a synchronous type of embosser of the present invention, which uses an interposer as described above, by selectively disabling the mechanical coupling between the embosser motor and the matched character pairs for a time sufficient to permit the embosser wheels 382 and the carriage 196 to be moved to the position for the next character to be embossed.

With respect to the embossed card 400 of FIG. 17, all embossing information is stored as a collection of ordered triples which define the X, Y and Z axes coordinates of the individual characters. The Z axis is the wheel position of the character to be embossed measured with respect to the reference point 390. Ideally, all of the characters should be embossed as rapidly as possible using as few as possible MOTION CYCLES between the embossing of successive characters. As explained above in conjunction with FIG. 16, the availability to emboss a character occurs synchronously at regular intervals between MOTION CYCLES. With the above described exception of the possible high speed embossing of closely spaced purely numerical characters such as OCR characters 402, the time available for motion extends from CLEARANCE in the FIRST EMBOSSING CYCLE to JUST PRIOR TO CONTACT in the SECOND EMBOSSING CYCLE. The time available for possible high speed embossing extends from CLEARANCE in the FIRST EMBOSSING CYCLE to JUST PRIOR TO CONTACT in the FIRST MOTION CYCLE. A time period available for permissible motion may be called a TSTATE. Because of the mass of the embosser wheels 382, the most difficult motion to accomplish between adjacent characters is the rotary motion of the embosser wheels during a TSTATE.

Figure 17A:
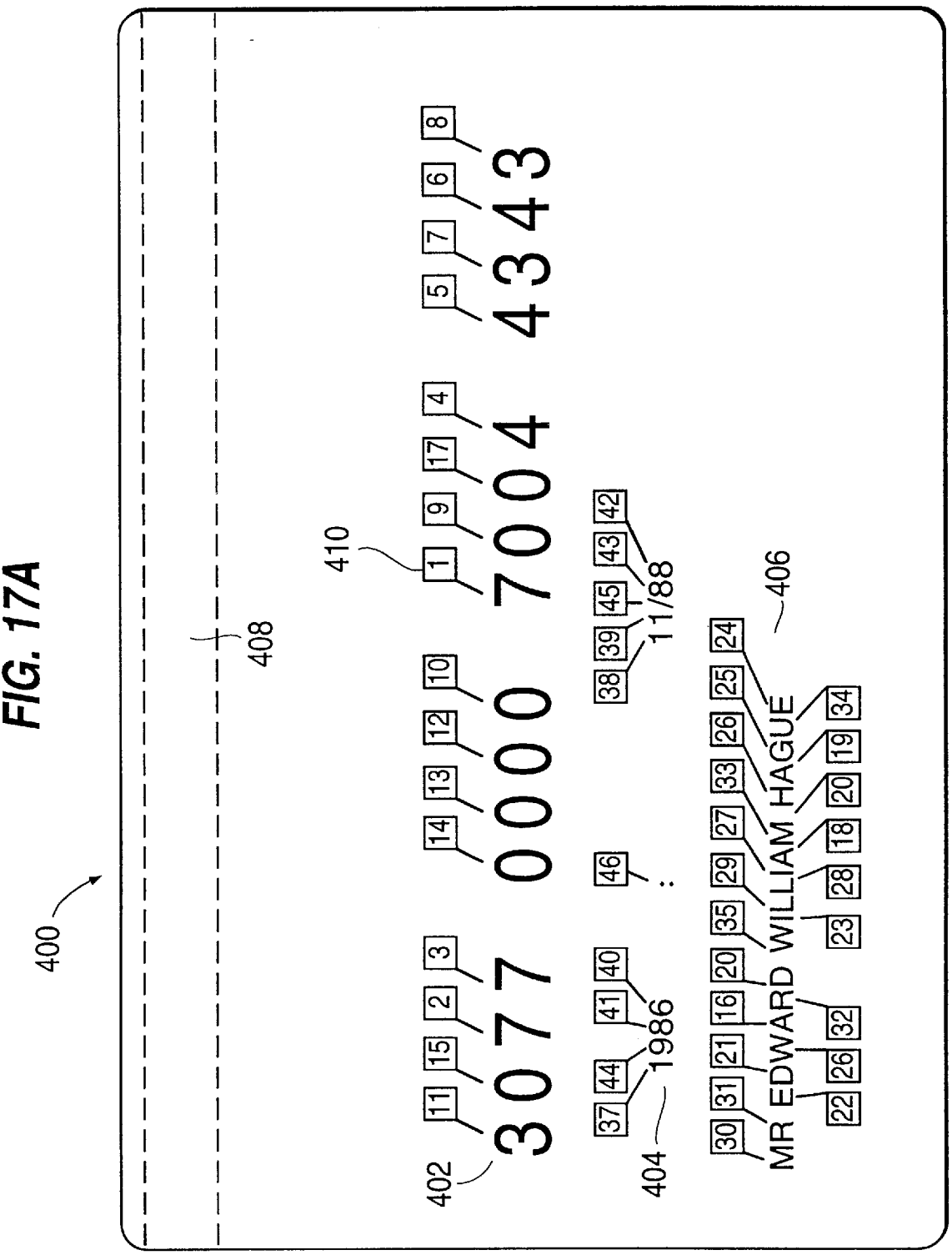
FIG. 17 illustrates a credit card embossed with the characters in a order of embossing which has been optimized in accordance with the present invention.
FIGS. 17B and 17C illustrate a first ordered set of the characters of the card of FIG. 17A which have been sorted along the Z axis.
FIGS. 17D and 17E illustrate the alteration of the first ordered set of FIGS. 17A and B to change the order of individual characters so that the distance between sequential characters is not more than a maximum distance which may be moved by the carriage along either the X or Y axes during the embossing of characters.
FIGS. 17F and G illustrate the second ordered set in which the individual characters have been sorted into the optimized order for embossing as illustrated by the numbers contained in square boxes in FIG. 17A.

An algorithm for sorting the characters of the credit card 400 to emboss them in the numbered order as indicated in the square boxes 410 of FIG. 17A is described as follows. Let C be the set of ordered triples whose domain is all of the embossing information of the characters on card 400. Let "a" be a triple in the set C. Let "b" be a triple in the set C with "a" not being equal to "b". Let "n" be the number of characters in C. The TSTATES required to move between successive characters such as from "a" to "b" along the X, Y and Z axes is calculated as follows:

$TSTATES_x[a, b] = (C[a]x - C[b]x)/V_x$
$TSTATES_y\{a, b\} = (C[a]y - C[b]y)/V_y$
$TSTATES_z\{a, b\} = (C[a]z - C[b]z)/V_z$ where $V_x$ is the velocity on the x-axis (carriage 196)
$V_y$ is the velocity on the y-axis (carriage 196)
$V_z$ is the velocity on the z-axis (embossing wheels 382)

The optimization algorithm attempts to order the set of triples in such a way that the number of TSTATES for moving to each next successive character up to character "n" along each of the X, Y or Z axes is not greater than 1. In other words only a FIRST MOTION CYCLE, as indicated in FIG. 16, is required to move to each successive character from the FIRST EMBOSSING CYCLE along the X, Y and Z axes to the SECOND EMBOSSING CYCLE. The first step in the algorithm is to sort each of the "n" characters within the set C in order of increasing Z axis distance between the reference rotary position 390 and the position of each individual character to create a first ordered set relative to the reference rotary position in which all successive Z axis motions between characters occurs during one TSTATE.

Figure 17B:
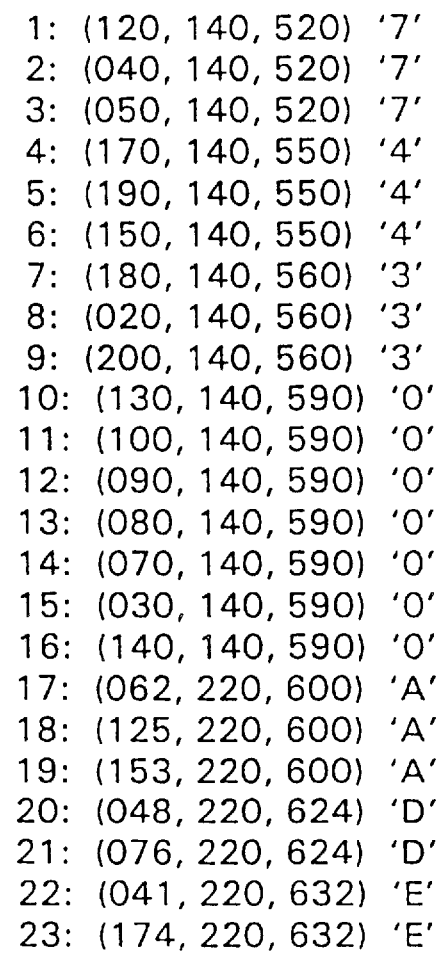
Figure 17C:
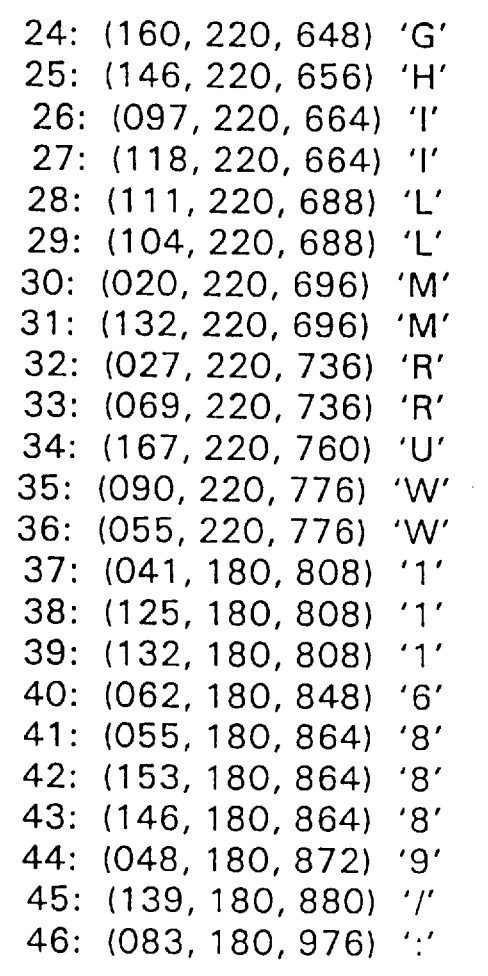

FIGS. 17B and 17C illustrated the first ordered set. The number all the way to the left indicates the number of the character in the first ordered set with the number "1" at the top of FIG. 17B illustrating the first character in the first ordered set, and the number "46" at the bottom of FIG. 17C identifying the last character in the first ordered set. The three numbers from left to right immediately to the right of the number identifying the order of a character in the set, which are in parenthesis, are respectively X, Y and Z axes coordinates. Finally, the last character all the way to the right is the identification of the character. As may be seen by comparing the Z axis coordinates in FIG. 17B and C as the number of the character increases from the top to the bottom, the Z axis distance from the reference position 390 increases which represents the sorting of the set of forty six characters by increasing distance along the Z axis with reference to the reference rotary position.

The first ordered set is sorted to form a second ordered set which has the characters of the credit card 400 in a new order which optimizes the embossing time required by minimizing the number of TSTATES greater than one required to complete motion between successive characters along each of the X and Y axes. It should be understood that the first ordered set of FIGS. 17B and C contains several character pairs which are spaced apart by distances over which the carriage 196 can not be moved during one TSTATE. For example, FIGS. 17D and E identify the changing of the order of the characters in the first ordered set of FIGS. 17B and C into the second ordered set at positions where it is not possible to move to a new character position along the X axis (the example does not illustrate movement between successive characters along the Y coordinate axis which exceeds the maximum distance which the carriage 196 can be moved along the Y axis during one TSTATE) because the distance between the successive characters along the X coordinate axis could not be accomplished during the time of one TSTATE which is equal to a time interval which the carriage 196 may be moved between successive time intervals during which the carriage cannot be moved while successive characters are being embossed when the matched character pairs are contacting the card. In FIGS. 17D and E, the fourth character position, the eighth character position, the ninth character position, the tenth character position, the sixteenth character position, the twentieth character position, the twenty-third character position, the thirty-first character position and the thirty-second character position all represent distances along the X axis, e.g. greater than 100 units, which are too far to be traveled during a TSTATE.

A subsequent character is inserted in the first ordered set between each pair of successive characters of the first ordered set which are separated by a distance, e.g. 100 X axis units, along X and Y axes of motion of the carriage, which is too great to be moved during the TSTATE time interval. Each inserted character is deleted for an original position thereof in the first ordered set and is located a distance along the X and Y axes spaced from the first character of the character pair which may be moved by the carriage during one TSTATE time interval. All characters in a group of characters between the second character of each character pair and a character immediately before a position of the deleted character in the first ordered set are moved down one character position in the first ordered set to form the second ordered set. For example, with reference to FIG. 17B, it may be seen that the distance between character numbers 3 and 4 is beyond the maximum distance of 100 X axis distance units and that character number 6 is within 100 X axis distance units. Character number 6 is inserted between character number 3 and character number 4 character pair as illustrated in FIG. 17D. The position of character number 6 is now vacated and character numbers 4 and 5 are moved one character position down in the first ordered set to the position of the character numbers 5 and 6 in FIG. 17F. Other insertion operations are performed in the same manner as identified by the designation "insert" in various places in FIGS. 17D and E.

The overall effect of the sorting of the first ordered set to form a second ordered set having the characters in a new order is that the second ordered set characters are partially in an order of increasing distance measured relative to the reference rotary position 390 and partially have successive characters in an order with a distance between embossing coordinates on the X and Y axes of the successive characters on the card 400 not exceeding a maximum distance that the card may be moved during one TSTATE time interval. Furthermore, as may be seen from inspection of FIGS. 17F and G, some of the characters in the second ordered set are closer to the reference position than the preceding character e.g. character numbers 11, 17, 24 and 33. The embosser 380 embosses the characters sequentially in the order of the second ordered set which appears in FIGS. 17F and G beginning from the first character to the last character of the second ordered set by coordinated rotary motion of the wheels 382 of the embosser 380 and rectilinear motion of the card by the carriage 196 to sequentially position the embosser wheels and card at selected rotary and rectilinear character positions respectively to emboss individual characters of the character set.

Figure 18:
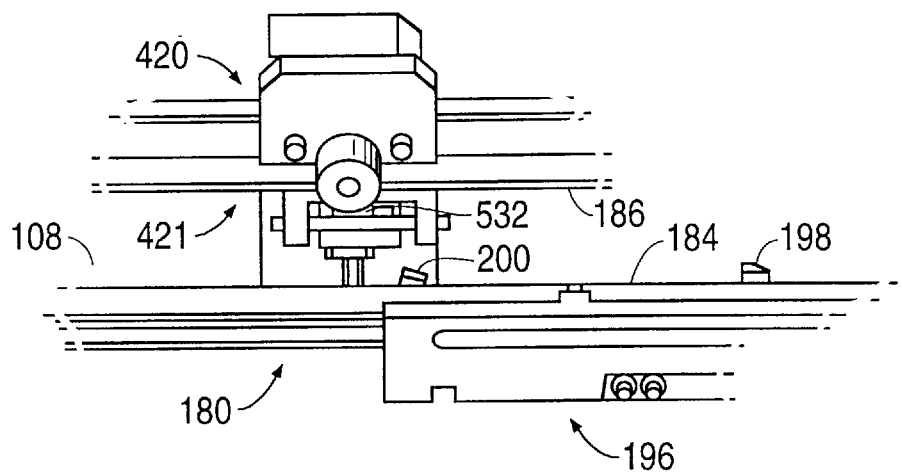
FIG. 18 illustrates a magnet stripe encoder in accordance with the present invention including the transport mechanism of the present invention.
Figure 25:
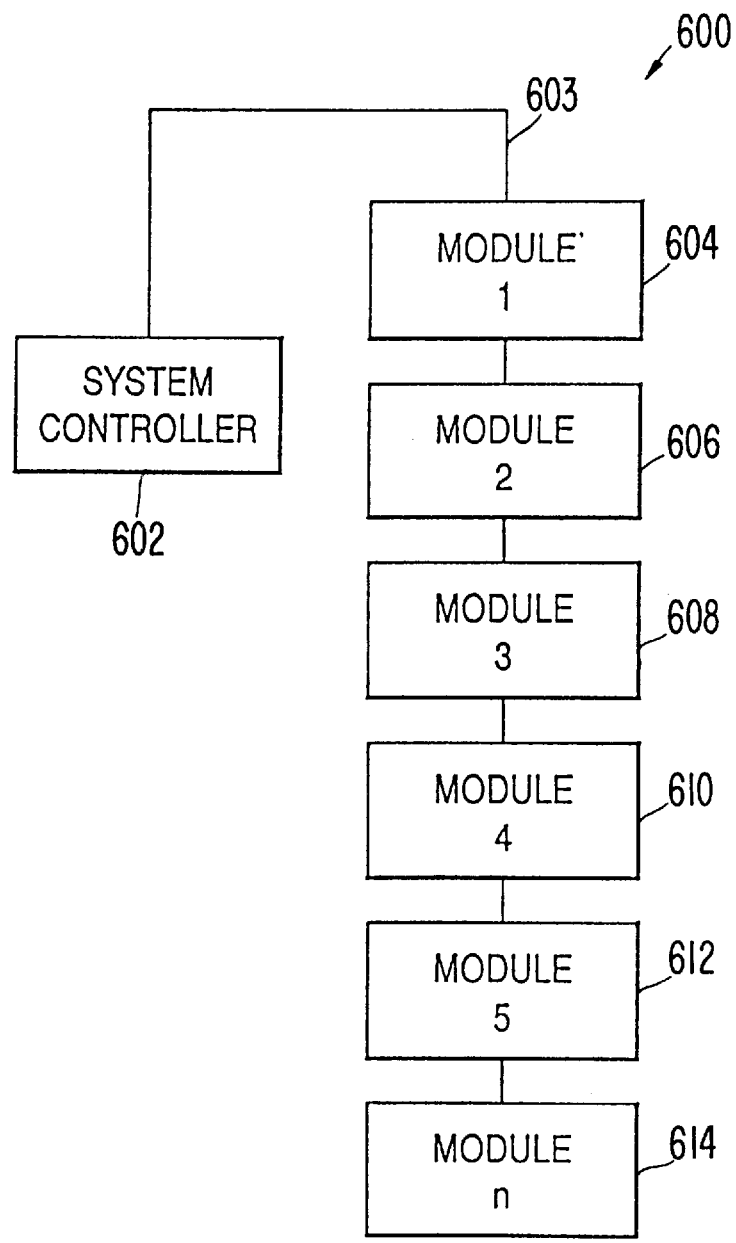
FIG. 25 illustrates an electrical block diagram of the electrical control of the present invention.

FIG. 18 illustrates a magnetic encoder station 420 for encoding the magnetic stripe 408 of the card 400 illustrated in FIG. 17A in accordance with the present invention. The card transport mechanism 180 is in accordance with FIGS. 11A–11D except that there is no Y axis translation mechanism required. The card is held by the first and second card contacting elements 198 and 200 and is moved past a magnetic stripe encoder 421 which may be in accordance with magnetic stripe encoding devices sold by the assignee such as, for example, in the ADVANTAGE™ embossers. The design of the magnetic head 532 and associated circuitry of the magnetic stripe encoder 421 with the exception of the degaussing system described below in FIGS. 23–25 is not part of the present invention. The magnetic encoder station 420 utilizes the transport mechanism 196 to move cards in both forward and backward directions during the recording and reading process of information which is recorded on the magnetic stripe 408. As illustrated in FIG. 18, the magnetic head 532 faces in an upward direction a portion of an area between the channels 184 and 186 in the transport path 108 for magnetically recording information on the magnetic stripe 408 on the backside of the card 400 as the card moves along the transport path 108. The drive mechanism for the carriage 196, as discussed above, moves the card past the magnetic head 532 during recording on the magnetic stripe 408 and in an opposite direction to permit reading of the information recorded on the card. The processors within the magnetic encoder station 420 and control terminal 120 control activation of the encoder and the drive mechanism during recording and reading of the information recorded on the magnetic stripe 408.

Figure 19:
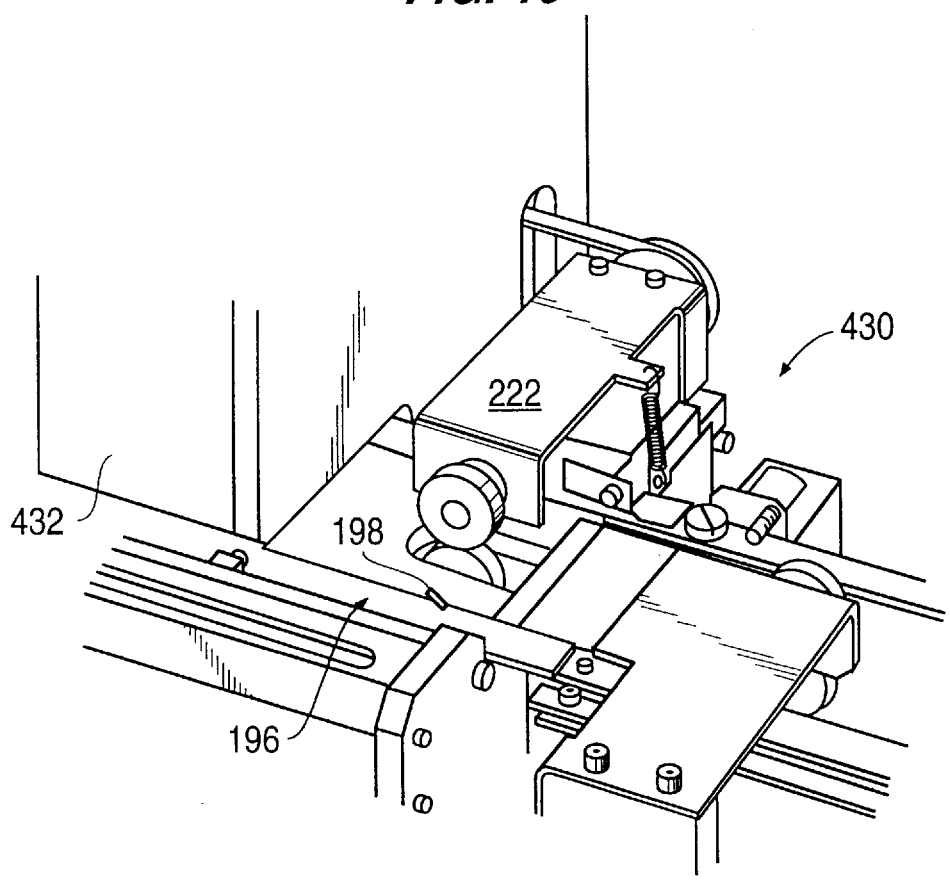
FIG. 19 illustrates a topper in accordance with the present invention including the transport mechanism of the present invention.

FIG. 19 illustrates a topper 430 in accordance with the invention. The topper 430 uses the transport mechanism 180 as described above in FIGS. 11A–D. As a consequence of the positioning of a card 224 in a topper 430 not being critical, the carriage 196 uses only the first card contacting element 198 to push each card sequentially past the topper in a forward direction in a known manner. Topping material 432 is transported orthogonally to the transport path 108 and faces the side of the card 400 illustrated in FIG. 17A having embossed raised characters. The topping material 432 is applied in a known manner to the top face of the characters as illustrated in FIG. 17A. The topper 430 includes a known mechanism for lowering the topping material 432 into contact with the raised embossed characters to cause transfer of the topping material to the top surfaces of the raised embossed characters. Only the infeed driver 222 is illustrated.

FIG. 20 illustrates a system frame 450 which is comprised of at least a first part 452 and a second part 454 which are assembled together by fasteners such as bolts (not illustrated) to provide a planar top surface for supporting a variable number of modular card processing stations 106 as described above. The frame 450 is variable in longitudinal dimension along the transport path 108 to permit individual card processing stations 106 to be added to or taken out of the transport path to provide a high degree of modularity which only requires reattachment of horizontal frame members relative to each other to vary the length to accommodate different numbers of card processing stations. The at least two parts 452 and 454 of the frame 450 each have at least one pair of upper horizontal members 456 which are connected to each other typically by the placement of fasteners through abutted sides with the top surfaces 458 being in line with each other to define a planar top surface which is parallel to the card transport path 108 when the individual card processing stations 106 are assembled as illustrated in FIGS. 4 and 5. Fasteners are placed through pre-drilled holes (not illustrated) in the vertical sides 460 of the horizontal frame members 456 to rigidly attach them together to provide a transport path 108 having a length equal to the number of card processing stations 106 in the system. The upper horizontal members 456 of the first frame part 452 fit between the horizontal members 456 of the second frame part 454 with their respective vertical sides 460 being abutted. Each of the frame parts includes additional horizontal and vertical members which are connected together provide a rigid space frame, which preferably may be made of aluminum stock. Additionally, as illustrated in FIG. 20, each of the first frame part 452 and second frame part 454 has a second pair of lower horizontal frame members 462. The lower horizontal frame members 460 of the first frame part 452 fit inside of the hollow cross section 464 of the lower horizontal frame members of the second frame part 454. Suitable fasteners (not illustrated) are used to attach the lower horizontal frame members 462 together.

Each of the at least first frame part 452 and second frame part 454 has opposed vertical sides 464. At least the pair of upper horizontal frame members 456 and preferably also the pair of lower horizontal frame members 462 of one part of the at least two parts of the frame project past one of the opposed vertical sides 464 of another part of the at least two parts of the frame. Each pair of the at least one pair of horizontal frame members of the one frame part which project past the vertical sides 464 are connected to another pair of the horizontal frame members of the another part of the at least two parts as discussed above.

As illustrated in FIG. 20, the shortest transport path 108 provided by the frame 450 is when the opposed vertical sides 464 are abutting each other. In this position, the extension of the top and bottom horizontal frame members 456 and 462 of the part 452 past the vertical members 464 is a maximum producing the longest surface contact with the vertical sides 460 of the second frame part 454 to provide a highly rigid space frame for receiving and supporting individual card processing stations 106. When it is desired to lengthen the frame 450, all that is necessary is that the fasteners holding the first frame part 452 and the second frame part 454 rigidly together are removed and the frame parts are pulled apart such that the opposed vertical sides 464 no longer abut, and further are spaced apart by a distance equal to an integer number times the longitudinal dimension along the transport path 108 of each card processing stations 106.

Each card processing station 106, which may be any known card processing station such as the processing stations discussed above or any subsequently developed processing station, includes a metallic support plate 466 which provides a rigid base for the sides 468 of the processing station which are attached to the support plate by suitable fasteners such as bolts. Fasteners (not illustrated) connect the support plate 466 to the top horizontal frame members 456 such as bolts which extend through apertures (not illustrated) in the horizontal frame members. Typically, the horizontal frame members 456 have a series of pre-drilled holes along the top surface 458 which permits alignment with predrilled holes in the metallic support plates 466 to attach the individual card processing stations 106 to the top support surface with the aforementioned fasteners which facilitates the modular expansion or contraction of the system. The attachment together of the rigid metallic support plate 466 to the upper horizontal frame members 456 and the box structure provided by the horizontal and vertical members creates a highly rigid and modular expandable support frame which facilitates the location of individual card processing stations 106 on the plane defined by the top surfaces 458 of the top horizontal frame members 456 which is parallel to the transport path 108 as described above. Each of the card processing stations 106 includes preferably the card transport mechanism 180 as described above in its various forms permitting card holding or pushing along only the X axis which is parallel to the transport path 108 or orthogonal thereto for applications such as embosser 380 which requires motion also along the Y axis as described above.

FIGS. 21A illustrates a preferred form of the card supply station 110 which includes a magazine holder 500 which is attached to the card processing system 100 as described above by fasteners not illustrated in FIG. 21A and a magazine 502 which is removably mounted in the magazine holder and held therein by a latch 504 which may be of any desired construction. A deflectable spring member 506 is movable away from the back underneath surface of the magazine 502 to clear projection 508 to permit removal of the magazine 502 from the magazine holder 500. The magazine 502 contains a plurality of individual cards 114 which are in a single stack 134. The magazine 502 has a bottom opening 510 for passing individual cards from the card supply station to the card transport 108 as discussed above. The magazine 502 has a rectangular cross section defined by four corners 512 which respectively engage four corners 514 of the plurality of individual cards 114 held by the magazine with a top 516 of the magazine being open for receiving the stack of cards 114. A plurality of bent members 518 extend from the bottom 510 inward into the rectangular cross section for supporting a bottom card 520 in a stack of cards. A pair of the frame members 518 extend from each of sides of the magazine 502 adjacent a side 522 from which the individual bottom card 520 passes to the card transport 108 through opening 127. The pair of members 518 extend below the side 522 by a distance greater than a thickness of an individual card but less than twice the thickness of the individual card to define an opening for individual cards to pass from the magazine 502 through the opening 127.

Figure 21B:
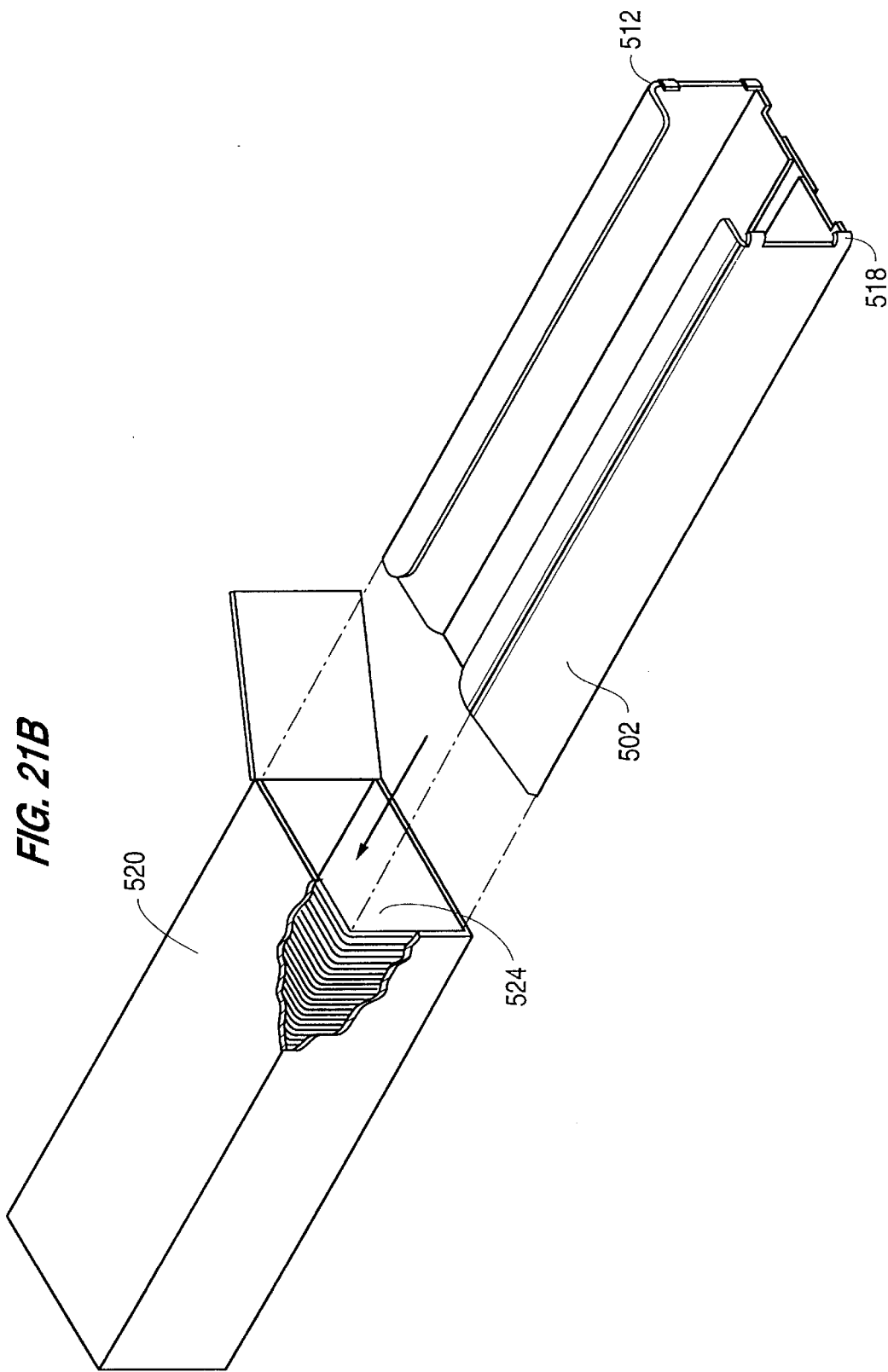

FIG. 21B illustrates the loading of the magazine 502 with a stack of card blanks 524 which are contained in a full supply box of cards 526. The magazine 502 has a capacity for holding an integer number of groups of cards held in the stack 524 of cards provided from the full supply box 526. Each group contains a plurality of cards. The capacity of the magazine 502 is preferably 250 cards which permits the industry standard card supply box 526, which holds 500 cards, to provide two groups of cards 524 each of 250 cards which are loaded in a pair of the magazines simply by inserting sequentially two magazines 502 as illustrated in FIG. 21B into the box 526 from the card supply stations 110. For example, if a single format of cards is being processed, each of the pair of card supply stations 110 of FIGS. 4 and 5 may have their magazine 502 removed and inserted sequentially into the box 526 to completely transfer all of the 500 cards therein as two groups of 250 cards into the respective magazines in a highly efficient manner.

FIGS. 22–24 illustrate a degaussing system and a method of operation having a preferred application for degaussing the magnetic head 532 used in the encoder 422 of the present invention. Degaussing is necessary when high coercivity type magnetic stripes 408 are encoded followed by encoding of low coercivity type magnetic stripes on credit card blanks. The residual magnetism consequent from the recording of a high coercivity magnetic stripe 408 with the encoder 422 is sufficient to prevent the magnetic head 532 from properly subsequently recording a magnetic stripe of a low coercivity type material. In accordance with the present invention, the magnetic head 532 used to encode the magnetic stripe 408 is degaussed after each magnetic stripe 408 is recorded. For purposes of illustration, the magnetic head 532 has been illustrated facing a top surface of the card 400 when in practice it faces a bottom surface as illustrated in FIG. 18. The degaussing system 530 contains the magnetic head 532, which may also be used for purposes of reading back the information encoded on the magnetic medium 408. The magnetic head 532 is driven by a amplifier 534 which functions to amplify a DATA information signal which is applied through OR gate 536 to the amplifier 534. The OR gate 536 has another input from a pulse source of alternating polarity of a constant frequency such as 1 KHz within the frequency band which may be recorded by the magnetic head 532 which is used for degaussing as explained below. The pulse source is control circuit 546. A shaft 538 moves at the same surface speed as card 400 is moved past the magnetic head 532. The rotational velocity of the shaft 538 is encoded by shaft encoder 540 which produces an output pulse train having a frequency representative of the velocity of the card blank 400 moving past the magnetic head 532. The output of the shaft encoder 540 is applied as an input of OR gate 542. The pulses produced by the shaft coder 540 are used for gating the DATA signal which is being recorded on the magnetic stripe 408 when the ENABLE signal is present as applied through OR gate 544. As a result, the DATA signal is applied by OR gate 536 to amplifier 534 where it is amplified and applied to the magnetic head 532 for recording on the magnetic stripe 408 with the timing of the recording process being controlled by the velocity feed back signal produced by the shaft encoder 540 as applied to the amplifier. Control circuit 546 may be the microprocessor controller in the encoder and/or the processor within the control terminal 120. The aforementioned recording process is conventional. During the recording process, power supply voltage is stored on capacitor C which is applied to the amplifier 534 through resistor R to provide electrical power to the amplifier to amplify the DATA signal to a recording level for recording purposes. The power supply 548 including the aforementioned power supply voltage stored on capacitor C is conventional.

A switch 550, under the control of the control circuit 546, is controlled to be in a closed state during the recording of the DATA signal on the magnetic stripe 408. The power supply voltage is maintained on the capacitor C to provide the correct level of electrical power to the amplifier 534 for recording.

The present invention achieves degaussing by the application of a pulse signal of alternating polarity as illustrated in FIG. 23 which decreases in magnitude over a time interval from an initial magnitude to zero to the magnetic head 534 for degaussing residual magnetism of the magnetic head caused by the aforementioned recording of the information data signal on a high coercivity magnetic stripe 408. During degaussing, the control circuit 546 opens the switch 550 and at the same time applies a constant frequency pulse signal, such as 1 KHz through OR gates 536 and 542 and a signal through OR gate 544 to the amplifier 534. The signal applied to the OR gate 544 by the control circuit 596 performs the function of the ENABLE signal during recording. The 1 KHz signal applied to OR gate 542 performs the same function as the CLOCK signal during recording. Finally, the 1 KHz signal of alternating polarity applied to OR gate 536 is the degaussing signal which is amplified by the amplifier 534 to a decreasing exponential magnitude which follows the discharge of the capacitance C after the switch 550 is opened as indicated in FIG. 24. Preferably, the switch 550 is synchronously opened after every recording of a magnetic stripe 408 with a DATA signal so as to insure that the next recording operation of the magnetic head 532 is always in a completely degaussed state produced by the decreasing magnitude of the alternating polarity pulse signal as illustrated in FIG. 23 from the power supply potential to zero.

FIG. 24 illustrates the power supply potential timed with the opening of the switch 550. As is illustrated, the power supply potential is maintained constant up to time during which the switch 550 opens which includes the time during which the magnetic head 532 is recording the DATA signal on the magnetic stripe 408. It should be noted that the decrease in magnitude of the alternating polarity pulse signal is exponential as indicated in FIG. 23 as a result of the discharge through the resistance R. However, the present invention is not limited to an exponential decay in magnitude of the alternating polarity pulses.

The degaussing system and method of operation of the present invention is simple to implement, is inexpensive and utilizes to a large extent the existing hardware of the encoder 422 which minimizes its expense while providing an effective method of degaussing which is highly desirable in current credit card processing operations in which high coercivity type magnetic stripes 408 are increasingly being used and will be more widely used in the future. However, because of the current prevalence of low coercivity type magnetic stripes 408 being used, it is highly desirable and necessary to use the same magnetic stripe encoder 422 to record both high and low coercivity type magnetic mediums on credit card blanks. Degaussing after every recording cycle insures that the necessary degaussing before the recording of a low coercivity stripe 408 directly after the recording of a high coercivity stripe occurs.

FIG. 25 illustrates an electrical block diagram of the system control 600 of the present invention for the embossing system configuration of FIGS. 4 and 5. The system controller 602 is a PC which is contained in the control terminal 190. The PC may use a Windows NT operating system to run application software. Various communication protocols may be used such as IBM 327x type A and 5256. The system controller 602 controls a series of modules which as illustrated are a first module 604 which includes the input hoppers of the card supply stations 110, a second module 606 which controls the magnetic stripe encoder 422, a third module 608 which controls a graphics printer, a fourth module 610 which controls the embosser 380, a fifth module 612 which controls the topper 430 and a sixth module 614 identified by the number n to signify that the number of modules is variable and could be anywhere from less than six modules to any higher number of modules. The last module 614 controls the output hoppers of the card collection stations 112. As has been described above, preferably each of the processing stations includes a card transport 180 which transports a card 114 from the infeed side 182 to the outfeed side 184 using at least the first card contacting element 198 as a card pushing mechanism or alternatively the first card contacting element 198 and the second card contacting element 200 to hold the cards in the carriage 196 to permit motion in both directions along the card transport path and optionally orthogonal thereto to produce movement along X and Y axes such as used with embosser 380. The aforementioned card transport mechanisms 180 each have infeed driver 222 and outfeed driver 224 and at least one drive mechanism as described below for controlling motion along at least one coordinate axis which are controlled by on board electronics under the overall control of the system controller 602. Additionally, the picker 126 and power driven rollers 152 are controlled by electronics associated with the card supply stations 110 under the overall control of the system controller 602 and the paddle 128 is controlled by electronics associated with the card collection stations 128 under the overall control of the system controller. Furthermore, each of the particular card processing functions which are performed at each of the card processing stations 106 is controlled by dedicated electronics associated with each station which is designed to support the unique card processing function performed at that card processing station and which are controlled by the system controller 602.

The system controller 602 connects to the individual module card processing station controllers 604, 606, 608, 610 and 612 via a four conductor cable 603 which allows serial communications between the system controller and the module card processing station controllers. The system controller 602 determines through interrogation what the configuration of the card processing system 100 is such that when operation starts the system controller through communications on the four conductor has determined precisely which card processing stations 106 are in the card processing system 100 and their position in the serial communications path.

The system controller 602 transmits commands to the module card processing station controllers to control the card transports and other devices related to each module as described above.

As sensor is associated with each of the first card contacting elements 198 to produce a signal when a card 114 contacts it to provide a signal to turn off the infeed conveyor 222. The outfeed conveyor 224 is turned on when the carriage 196 reaches the end of travel. The overall sequencing of cards through the card processing stations 106 is not part of the present invention.

While the invention has been described in terms of its preferred embodiments, it should be understood that numerous modifications may be made thereto without departing from the spirit and scope of the invention. It is intended that all such modifications fall within the scope of the appended claims.

We claim:

1. A card transport mechanism for transporting cards along a transport path comprising:

a pair of spaced apart channels, each channel engaging a different one of a pair of opposed edges of the cards;

a carriage for holding the cards at a fixed position relative to the carriage during motion along the transport path, the carriage having first and second card contacting elements spaced apart at different positions along the transport path and projecting into the transport path for contacting and holding a card in the fixed position during motion along the transport path, the first card contacting element being compliant to move orthogonally from within the transport path to permit movement of the card along the channels while the carriage is stationary prior to contact of the card by the second card contacting element and the second card contacting element being compliant along the transport path in response to contact with the card to produce contact and holding of the opposed edges of the card with the first and second card contacting elements in the fixed position; and a carriage support, connected to the carriage, for guiding the carriage along the transport path.

2. A card transport mechanism for transporting cards along a transport path comprising:
   a pair of spaced apart channels, each channel engaging a different one of a pair of opposed edges of the cards;
   a carriage for pushing the cards along the transport path, the carriage having a card contacting element spaced from the channels and projecting into the transport path for contacting and pushing one of the cards along the transport path, the card contacting element being compliant to move orthogonally from within the transport path to permit movement of the card along the channels while the carriage is stationary and then the card contacting element moving back into the transport path to contact a trailing edge of the card for pushing the card with the card contacting element along the transport path; and
   a carriage support, connected to the carriage, for guiding the carriage along the transport path.

3. A card transport mechanism in accordance with claim 1, wherein:
   the pair of spaced apart channels respectively comprise first and second elongated strips respectively containing a different one of the pair of channels therein with the channels being attached to the carriage support; and
   the carriage support comprises a guide which contacts the carriage with the carriage sliding along the guide during motion of the carriage along the transport path.

4. A card transport path mechanism in accordance with claim 3, wherein:
   one of the first and second elongated strips is fixed relative to the carriage support to provide a datum position for card processing operations; and
   another of the first and second elongated strips is moveable orthogonally to the fixed one of the first and second elongated strips; and
   a mechanism biasing the another of the first and second elongated strips toward the fixed one of the first and second elongated strips whereby an edge of the card held in the channels is forced toward the fixed one of the first and second elongated strips to position the card at the datum position for card processing operations.

5. A card transport mechanism in accordance with claim 2, wherein:
   the pair of spaced apart channels respectively comprise first and second elongated strips respectively containing a different one of the pair of channels therein with the channels being attached to the carriage support; and
   the carriage support comprises a guide which contacts the carriage with the carriage sliding along the guide during motion of the carriage along the transport path.

6. A card transport path mechanism in accordance with claim 5, wherein:
   one of the first and second elongated strips is fixed relative to the carriage support to provide a datum position for card processing operations; and
   another of the first and second elongated strips is moveable orthogonally to the fixed one of the first and second elongated strips; and
   a mechanism biasing the another of the first and second elongated strips toward the fixed one of the first and second elongated strips whereby an edge of the card held in the channels is forced toward the fixed one of the first and second elongated strips to position the card at the datum position for card processing operations.

7. A card transport mechanism in accordance with claim 1, wherein:
   the first card contacting element is pivotally attached to the carriage to provide pivoting of the first card contacting element around an axis perpendicular to the opposed edges of the card; and
   the first card contacting element has an edge which slopes toward the transport path and a tip, the tip extending into the transport path when the card is not moving in the channels past the first card contacting element, the tip rotating from extending into the transport path during movement of the card past the first card contacting element until after engagement by the second card gripping element with a leading edge of the card and then the tip rotating back into the transport path to cause a leading edge of the first card contacting element to contact the trailing edge of the card.

8. A card transport mechanism in accordance with claim 2, wherein:
   the card contacting element is pivotally mounted in the carriage to provide movement of the card contacting element around an axis perpendicular to the opposed edges; and
   the card contacting element has an edge which slopes toward the transport path and a tip, the tip extending into the transport path when the card is not moving in the channels past the card contacting element, the tip rotating from extending into the transport path during movement of the card past the card contacting element until the tip clears the trailing edge of the card and then the tip rotating back into the transport path to cause a leading edge of the card contacting element to push the trailing edge of the card during movement of the carriage along the transport path.

9. A card transport mechanism in accordance with claim 3, wherein:
   the first card contacting element is pivotally attached to the carriage to provide pivoting of the first card contacting element around an axis perpendicular to the opposed edges of the card; and
   the first card contacting element has an edge which slopes toward the transport path and a tip, the tip extending into the transport path when the card is not moving in the channels past the first card contacting element, the tip rotating from extending into the transport path during movement of the card past the first card contacting element until after engagement by the second card gripping element with a leading edge of the card and then the tip rotating back into the transport path to cause a leading edge of the first card contacting element to contact the trailing edge of the card.

10. A card transport mechanism in accordance with claim 4, wherein:
    the first card contacting element is pivotally attached to the carriage to provide pivoting of the first card contacting element around an axis perpendicular to the opposed edges of the card; and
    the first card contacting element has an edge which slopes toward the transport path and a tip, the tip extending into the transport path when the card is not moving in the channels past the first card contacting element, the tip rotating from extending into the transport path during movement of the card past the first card contacting element until after engagement by the second card gripping element with a leading edge of the card and then the tip rotating back into the transport path to cause a leading edge of the first card contacting element to contact the trailing edge of the card.

11. A card transport mechanism in accordance with claim 5, wherein:

the card contacting element is pivotally mounted in the carriage to provide movement of the card contacting element around an axis perpendicular to the opposed edges; and the card contacting element has an edge which slopes toward the transport path and a tip, the tip extending into the transport path when the card is not moving in the channels past the card contacting element, the tip rotating from extending into the transport path during movement of the card past the card contacting element until the tip clears the trailing edge of the card and then the tip rotating back into the transport path to cause a leading edge of the card contacting element to push the trailing edge of the card during movement of the carriage along the transport path.

12. A card transport mechanism in accordance with claim 6, wherein:

the card contacting element is pivotally mounted in the carriage to provide movement of the card contacting element around an axis perpendicular to the opposed edges; and the card contacting element has an edge which slopes toward the transport path and a tip, the tip extending into the transport path when the card is not moving in the channels past the card contacting element, the tip rotating from extending into the transport path during movement of the card past the card contacting element until the tip clears the trailing edge of the card and then the tip rotating back into the transport path to cause a leading edge of the card contacting element to push the trailing edge of the card during movement of the carriage along the transport path.

13. A card transport in accordance with claim 1, further comprising:

a cam disposed at a fixed position along the transport path;

the second card contacting element having a first pivot axis attached to the carriage for pivoting the second card contacting element to provide pivotal movement of the second card contacting element along the transport path after engagement with a leading edge of the opposed edges of the card; and the second card contacting element having a second pivot axis attached to the carriage for pivoting the second card contacting element orthogonally relative to the transport path for pivoting the second card contacting element from engaging the leading edge of the card in the transport path to a position out of the transport path in response to contact of a part of the carriage with the cam during movement of the carriage along the transport path to free the leading edge of the card from being contacted by the second card contacting element and to free the card for movement along the pair of channels past the second card contacting element.

14. A card transport in accordance with claim 3, further comprising:

a cam disposed at a fixed position along the transport path;

the second card contacting element having a first pivot axis attached to the carriage for pivoting the second card contacting element to provide pivotal movement of the second card contacting element along the transport path after engagement with a leading edge of the opposed edges of the card; and the second card contacting element having a second pivot axis attached to the carriage for pivoting the second card contacting element orthogonally relative to the transport path for pivoting the second card contacting element from engaging the leading edge of the card to a position out of the transport path in response to contact of a part of the carriage with the cam during movement of the carriage along the transport path to free the leading edge of the card from being contacted by the second card contacting element and to free the card for movement along the pair of channels past the second card contacting element.

15. A card transport mechanism in accordance with claim 1, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

16. A card transport mechanism in accordance with claim 2, further comprising:

an infeed driver disposed on an infeed side of the pair of channels for propelling the card along the transport path into engagement with the card contacting element;

an outfeed driver disposed on an outfeed side of the pair of channels for propelling the card along the card transport path after disengagement from the card contacting element;

a drive mechanism for propelling the carriage along the transport path between the infeed and outfeed sides to transport the card from the infeed side to the outfeed side and to return the carriage to the infeed side to position the carriage to contact another card with the card contacting element; and a controller for controlling activation of each the drivers and the drive mechanism.

17. A card transport mechanism in accordance with claim 3, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

18. A card transport mechanism in accordance with claim 4, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

19. A card transport mechanism in accordance with claim 5, further comprising:

an infeed driver disposed on an infeed side of the pair of channels for propelling the card along the transport path into engagement with the card contacting element;

an outfeed driver disposed on an outfeed side of the pair of channels for propelling the card along the card transport path after disengagement from the card contacting element;

a drive mechanism for propelling the carriage along the transport path between the infeed and outfeed sides to transport the one card from the infeed side to the outfeed side and to return the carriage to the infeed side to position the carriage to contact another card with the card contacting element; and a controller for controlling activation of each the drivers and the drive mechanism.

20. A card transport mechanism in accordance with claim 6, further comprising:

an infeed driver disposed on an infeed side of the pair of channels for propelling the card along the transport path into engagement with the card contacting element;

an outfeed driver disposed on an outfeed side of the pair of channels for propelling the card along the card transport path after disengagement from the card contacting element;

a drive mechanism for propelling the carriage along the transport path between the infeed and outfeed sides to transport the card from the infeed side to the outfeed side and to return the carriage to the infeed side to position the carriage to contact another card with the card contacting element; and a controller for controlling activation of each the drivers and the drive mechanism.

21. A card transport mechanism in accordance with claim 7, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

22. A card transport mechanism in accordance with claim 8, further comprising:

an infeed driver disposed on an infeed side of the pair of channels for propelling the card along the transport path into engagement with the card contacting element;

an outfeed driver disposed on an outfeed side of the pair of channels for propelling the card along the card transport path after disengagement from the card contacting element;

a drive mechanism for propelling the carriage along the transport path between the infeed and outfeed sides to transport the card from the infeed side to the outfeed side and to return the carriage to the infeed side to position the carriage to hold contact card with the card contacting element; and a controller for controlling activation of each the drivers and the drive mechanism.

23. A card transport mechanism in accordance with claim 9, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

24. A card transport mechanism in accordance with claim 10, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

25. A card transport mechanism in accordance with claim 11, further comprising:

an infeed driver disposed on an infeed side of the pair of channels for propelling the card along the transport path into engagement with the card contacting element;

an outfeed driver disposed on an outfeed side of the pair of channels for propelling the card along the card transport path after disengagement from the card contacting element;

a drive mechanism for propelling the carriage along the transport path between the infeed and outfeed sides to transport the card from the infeed side to the outfeed side and to return the carriage to the infeed side to position the carriage to contact another card with the card contacting element; and a controller for controlling activation of each the drivers and the first drive mechanism.

26. A card transport mechanism in accordance with claim 12, further comprising:

an infeed driver disposed on an infeed side of the pair of channels for propelling the card along the transport path into engagement with the card contacting element;

an outfeed driver disposed on an outfeed side of the pair of channels for propelling the card along the card transport path after disengagement from the card contacting element;

a drive mechanism for propelling the carriage along the transport path between the infeed and outfeed sides to transport the card from the infeed side to the outfeed side and to return the carriage to the infeed side to position the carriage to contact another card with the card contacting element; and a controller for controlling activation of each the drivers and the first drive mechanism.

27. A card transport mechanism in accordance with claim 13, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

28. A card transport mechanism in accordance with claim 14, further comprising:

an infeed driver disposed on an infeed side of the pair of channels for propelling the card along the transport path into engagement with the first and second card contacting elements;

an outfeed driver disposed on an outfeed side of the pair of channels for propelling the card along the card transport path after disengagement from the second card contacting element;

a drive mechanism for propelling the carriage along the transport path between the infeed and outfeed sides to transport the card from the infeed side to the outfeed side and to return the carriage to the infeed side to position the carriage to hold another card with the first and second card contacting elements; and a controller for controlling activation of each the drivers and the drive mechanism.

29. A card transport mechanism in accordance with claim 15, further comprising:

another drive mechanism for moving the carriage and the pair of spaced apart channels orthogonally to the transport path; and the controller also controls activation of the another drive mechanism to selectively move the carriage holding the card along the transport path and orthogonally to the transport path.

30. A card transport mechanism in accordance with claim 17, further comprising:

another drive mechanism for moving the carriage and the pair of spaced apart channels orthogonally to the transport path; and the controller also controls activation of the another drive mechanism to selectively move the carriage holding the card along the transport path and orthogonally to the transport path.

31. A card transport mechanism in accordance with claim 18, further comprising:

another drive mechanism for moving the carriage and the pair of spaced apart channels orthogonally to the transport path; and the controller also controls activation of the another drive mechanism to selectively move the carriage holding the card along the transport path and orthogonally to the transport path.

32. A card transport mechanism in accordance with claim 29, further comprising:

an embosser having first and second rotatable wheels, the first wheel carrying characters and the second wheel carrying characters and the channels being disposed in a plane between the wheels; and wherein the controller controls movement of the carriage engaging the card along the transport path and orthogonal thereto to position the card at selected card positions to emboss characters using the first and second wheels and activation of the embosser to rotate the first and second wheels to a selected rotary position and to emboss selected characters carried by the first and second wheels at selected positions on the card.

33. A card transport mechanism in accordance with claim 30, further comprising:

an embosser having first and second rotatable wheels, the first wheel carrying characters and the second wheel carrying characters and the channels being disposed in a plane between the wheels; and wherein the controller controls movement of the carriage engaging the card along the transport path and orthogonal thereto to position the card at selected card positions to emboss characters using the first and second wheels and activation of the embosser to rotate the first and second wheels to a selected rotary position and to emboss selected characters carried by the first and second wheels at selected positions on the card.

34. A card transport mechanism in accordance with claim 31, further comprising:

an embosser having first and second rotatable wheels, the first wheel carrying characters and the second wheel carrying characters and the channels being disposed in a plane between the wheels; and wherein the controller controls movement of the carriage engaging the card along the transport path and orthogonal thereto to position the card at selected card positions to emboss characters using the first and second wheels and activation of the embosser to rotate the first and second wheels to a selected rotary position and to emboss selected characters carried by the first and second wheels at selected positions on the card.

35. A transport mechanism in accordance with claim 15, further comprising:

a magnetic encoder having a magnetic head facing a portion of an area between the pair of channels for magnetically recording information on a magnetic medium contained on the card as the card moves along the transport path; and the drive mechanism moves the card past the magnetic encoder during recording on the magnetic medium and in an opposite direction to permit reading of the information recorded on the card; and wherein the controller controls activation of the encoder and the drive mechanism during recording and reading of information recorded on the recording medium.

36. A transport mechanism in accordance with claim 18, further comprising:

a magnetic encoder having a magnetic head facing a portion of an area between the pair of channels for magnetically recording information on a magnetic medium contained on the card as the card moves along the transport path; and the drive mechanism moves the card past the magnetic encoder during recording on the magnetic medium and in an opposite direction to permit reading of the information recorded on the card; and wherein the controller controls activation of the encoder and the drive mechanism during recording and reading of information recorded on the recording medium.

37. A card transport mechanism in accordance with claim 16, further comprising:

a topper fixed in position with respect to the pair of channels and having a supply of topping material which is transported orthogonally to the transport path and facing a side of the card having embossed raised characters on the side to which the topping material is to be applied; and the controller also controls application of topping material to the raised characters while the card engages the card contacting element and transporting of the topping material orthogonally with respect to the card transport path.

38. A card transport mechanism in accordance with claim 15, wherein:

the infeed and outfeed drivers move the card in only one direction along the transport path.

39. A card transport mechanism in accordance with claim 16, wherein:

the infeed and outfeed drivers move the card in only one direction along the transport path.

40. A card transport mechanism in accordance with claim 17, wherein:

the infeed and outfeed drivers move the card in only one direction along the transport path.

41. A card transport mechanism in accordance with claim 18, wherein:

the infeed and outfeed drivers move the card in only one direction along the transport path.

42. A card transport mechanism in accordance with claim 38, wherein:

the infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side.

43. A card transport in accordance with claim 39, wherein:

the infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side.

44. A card transport in accordance with claim 40, wherein:

the infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side.

45. A card transport in accordance with claim 41, wherein:

the infeed driver comprises a first roller which is mounted above the transport path and has a rolling surface which engages a first side of the card at the infeed side and a second roller which is mounted below the transport path and has a rolling surface which engages a second side of the card at the infeed side; and the outfeed driver comprises a first roller which is mounted above the transport path and has a rolling surface which engages the first side of the card on the outfeed side and a second roller which is mounted below the transport path and has a rolling surface which engages the second side of the card on the outfeed side.

46. A card transport in accordance with claim 42, wherein:

each driver comprises a one way clutch for rotationally driving at least one of the first and second rollers to move the card in the one direction and preventing movement in an opposite direction while the rollers contact the card.

47. A card transport mechanism in accordance with claim 43, wherein:

each driver comprises a one way clutch for rotationally driving at least one of the first and second rollers to move the card in the one direction and preventing movement in an opposite direction while the rollers contact the card.

48. A card transport mechanism in accordance with claim 44, wherein:

each driver comprises a one way clutch for rotationally driving at least one of the first and second rollers to move the card in the one direction and preventing movement in an opposite direction while the rollers contact the card.

49. A card transport mechanism in accordance with claim 45, wherein:

each driver comprises a one way clutch for rotationally driving at least one of the first and second rollers to move the card in the one direction and preventing movement in an opposite direction while the rollers contact the card.

50. A method for transporting cards along a transport path comprising:

engaging opposed edges of a card in a pair of spaced apart channels;

moving the card along the pair of spaced apart channels to engage the card within a carriage at a fixed position relative to the carriage with first and second card contacting elements spaced apart at different positions along the transport path and projecting into the transport path for contacting and holding a card at the fixed position during motion along the transport path, the first card contacting element being compliant to move orthogonally from within the transport path to permit movement of the card along the channels while the carriage is stationary prior to contact of the card by the second card contacting element and the second card contacting element being compliant along the transport path in response to contact with the card to produce contact and holding of the opposed edges of the card with the first and second card contacting elements in the fixed position; and holding the card in the fixed position with the first and second card contacting elements while moving the carriage along the transport path.

51. A method for transporting cards along a transport path comprising:

engaging opposed edges of a card in a pair of spaced apart channels;

moving the card along the pair of spaced apart channels to engage the card with a card contacting element within a carriage, the card contacting element being spaced from the channels and projecting into the transport path for contacting and pushing one of the cards along the transport path, the card contacting element being compliant to move orthogonally from within the transport path to permit movement of the card along the channels while the carriage is stationary and then the card contacting element moving back into the transport path to contact a trailing edge of the card for pushing the card with the card contacting element along the transport path; and pushing the one card along the pair of spaced apart channels by moving the carriage along the transport path.

52. A method in accordance with claim 50, further comprising:

mounting one of channels at a fixed position relative to the carriage to provide a datum position for card processing operations;

mounting another of the channels at a position which is moveable orthogonal to the one of the channels; and causing the another of the channels to apply a force orthogonal to the transport path to an edge of the card to position an edge of the card at the datum position.

53. A method in accordance with claim 51, further comprising:

mounting one of channels at a fixed position relative to the carriage to provide a datum position for card processing operations;

mounting another of the channels at a position which is moveable orthogonal to the one of the channels; and causing the another of the channels to apply a force orthogonal to the transport path to an edge of the card to position an edge of the card at the datum position.

54. A method in accordance with claim 50, wherein:

the first card contacting element is pivotally attached to the carriage to provide pivoting of the first card contacting element around an axis perpendicular to the opposed edges of the card;

the first card contacting element has a edge which slopes toward the transport path and a tip, the tip extending into the transport path when the card is not moving in the channels past the first card contacting element, the tip rotating from extending into the transport path during movement of the card past the first card contacting element until after engagement by the second card contacting element with a leading edge of the card and then the tip rotating back into the transport path to cause a leading edge of the first contacting element to contact the trailing edge of the card.

55. A method in accordance with claim 51, wherein:

the card contacting element is pivotally attached to the carriage to provide pivoting of the card contacting element around an axis perpendicular to the opposed edges of the card; and the card contacting element has a edge which slopes toward the transport path and a tip, the tip extending into the transport path when the card is not moving in the channels past the card contacting element, the tip rotating from extending into the transport path during movement of the card past the card contacting element during which the tip contacts a face of the card and then rotating back into the transport path to cause a leading edge of the card contacting element to contact a trailing edge of the card.

56. A method in accordance with claim 50, further comprising:

mounting a cam at a fixed position along the transport path;

pivoting the second card contacting element around a first pivot axis attached to the carriage to provide pivotal movement of the second card contacting element along the transport path after engagement with a leading edge of one of the opposed edges of the card;

pivoting the second card contacting element around a second pivot axis attached to the carriage for pivoting the second card contacting element orthogonally relative to the transport path from engaging the leading edge of the card to a position out of the transport path in response to contact of a part of the carriage with the cam during movement of the carriage along the transport path to free the card from being contacted by the second contacting element and to free the card for movement along the pair of channels past the second card contacting element;

moving the carriage along the transport path to contact the cam to free the leading edge of the opposed edges of the card from contact with the second card contacting element; and moving the card along the transport path by contact with the first card contacting element.

57. A method in accordance with claim 52, further comprising:

mounting a cam at a fixed position along the transport path;

pivoting the second card contacting element around a first pivot axis attached to the carriage to provide pivotal movement of the second card contacting element along the transport path after engagement with a leading edge of one of the opposed edges of the card;

pivoting the second card contacting element around a second pivot axis attached to the carriage for pivoting the second card contacting element orthogonally relative to the transport path from engaging the leading edge of the card to a position out of the transport path in response to contact of a part of the carriage with the cam during movement of the carriage along the transport path to free the card from being contacted by the second contacting element and to free the card for movement along the pair of channels past the second card contacting element;

moving the carriage along the transport path to contact the cam to free the leading edge of the opposed edges of the card from contact with the second card contacting element; and moving the card along the transport path by contact with the first card contacting element.

58. A method in accordance with claim 54, further comprising:

mounting a cam at a fixed position along the transport path;

pivoting the second card contacting element around a first pivot axis attached to the carriage to provide pivotal movement of the second card contacting element along the transport path after engagement with a leading edge of one of the opposed edges of the card;

pivoting the second card contacting element around a second pivot axis attached to the carriage for pivoting the second card contacting element orthogonally relative to the transport path from engaging the leading edge of the card to a position out of the transport path in response to contact of a part of the carriage with the cam during movement of the carriage along the transport path to free the card from being contacted by the second contacting element and to free the card for movement along the pair of channels past the second card contacting element;

moving the carriage along the transport path to contact the cam to free the leading edge of the opposed edges of the card from contact with the second card contacting element; and moving the card along the transport path by contact with the first card contacting element.

59. A method in accordance with claim 50, further comprising:

propelling the card along the transport path into engagement with the first and second card contacting elements with an infeed driver disposed on an infeed side of the transport path;

propelling the card along the card transport path after disengagement from the second card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to hold another card with the first and second card contacting elements with a drive mechanism.

60. A method in accordance with claim 51, further comprising:

propelling the card along the transport path into engagement with the card contacting element with an infeed driver disposed on an infeed side of the transport path;

propelling the card along the card transport path after disengagement from the card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to contact another card with the card contacting element with a drive mechanism.

61. A method in accordance with claim 52, further comprising:

propelling the card along the transport path into engagement with the first and second card contacting elements with an infeed driver disposed on an infeed side of the transport path;

propelling the card along the card transport path after disengagement from the second card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to hold another card with the first and second card contacting elements with a drive mechanism.

62. A method in accordance with claim 53, further comprising:

propelling the card along the transport path into engagement with the card contacting element with an infeed driver disposed on an infeed side of the transport path;

propelling the card along the card transport path after disengagement from the card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to contact another card with the card contacting element with a drive mechanism.

63. A method in accordance with claim 54, further comprising:

propelling the card along the transport path into engagement with the first and second card contacting elements with an infeed driver disposed on an infeed side of the transport path;

propelling the card along the card transport path after disengagement from the second card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to hold another card with the first and second card contacting elements with a drive mechanism.

64. A method in accordance with claim 55, further comprising:

propelling the card along the transport path into engagement with the card contacting element with an infeed driver disposed on an infeed side of the transport path;

propelling the card along the card transport path after disengagement from the card contacting element with an outfeed driver disposed on an outfeed side of the transport path; and propelling the carriage along the transport path between the infeed and outfeed sides to transport the card from the infeed side to the outfeed side and to return the carriage to the infeed side to position the carriage to contact another card with the card contacting element with a drive mechanism.

65. A method in accordance with claim 59, further comprising:

moving the carriage and the pair of spaced apart channels orthogonal to the transport path with another drive mechanism; and controlling activation of the another drive mechanism to selectively move the carriage holding the card along the transport path and orthogonally to the transport path.

66. A method in accordance with claim 65 further comprising:

an embosser having first and second rotatable wheels which are rotated with the first wheel carrying characters and the second wheel carrying characters and the channels being disposed in a plane between the first and second wheels; and wherein controlling movement of the carriage along the transport path and orthogonal thereto and activation of the embosser to rotate the first and second wheels to a rotary position to emboss selected characters carried by the first and second wheels at selected card locations on the card with a controller.

67. A method in accordance with claim 59, further comprising:

a magnetic encoder fixed in position with respect to the pair of channels and having a magnetic head facing a portion of an area between the pair of channels for magnetically recording information on a magnetic medium contained on the card as the card moves along the pair of channels along the transport path; and a drive mechanism for moving the card past the magnetic encoder during recording on the magnetic medium and in an opposite direction to permit reading of information recorded on the card; and wherein controlling activation of the encoder and the drive mechanism during the recording and reading of information recorded on the recording medium with a controller.

68. A method in accordance with claim 60, further comprising:

a topper fixed in position with respect to the pair of channels and having a supply of topping material which is transported orthogonally to the transport path and facing a side of the card which has embossed raised characters on the one side to which the topping material is to be applied; and controlling application of topping material to the raised characters while the card engages the card contacting element and transporting of the topping material orthogonal to the transport path with a controller.

\* \* \* \* \*